US007866769B2

(12) United States Patent  (10) Patent No.: US 7,866,769 B2
Ahlgrim et al.  (45) Date of Patent: Jan. 11, 2011

(54) STORAGE AND ORGANIZATION SYSTEM AND COMPONENTS THEREOF

(75) Inventors: Dirk Ahlgrim, Cambridge, MA (US); Douglas Dayton, Harvard, MA (US); Angie Kim, Cambridge, MA (US); Monica Kuznik, Padova (IT); Samuel Palmer, Arlington, MA (US); David Weissburg, Lexington, MA (US); Gretchen Wustrack, San Francisco, CA (US)

(73) Assignee: Target Brands, Inc., Minneapolis, MN (US)

( * ) Notice: Subject to any disclaimer, the term of this patent is extended or adjusted under 35 U.S.C. 154(b) by 596 days.

(21) Appl. No.: 11/851,165

(22) Filed: Sep. 6, 2007

(65) Prior Publication Data

US 2008/0074013 A1  Mar. 27, 2008

Related U.S. Application Data

(60) Provisional application No. 60/842,469, filed on Sep. 6, 2006, provisional application No. 60/941,503, filed on Jun. 1, 2007.

(51) Int. Cl.
 *A47B 87/00* (2006.01)
(52) U.S. Cl. .................... 312/108; 312/111; 312/265.5; 312/263
(58) Field of Classification Search ................. 312/107, 312/108, 111, 263, 265.1–265.6; 220/590, 220/549, 545, 544, 553, 532, 529
 See application file for complete search history.

(56) References Cited

U.S. PATENT DOCUMENTS 1,076,116 A * 10/1913 Hatfield .................... 312/111

1,694,487 A   12/1928 Ringer
1,799,831 A *  4/1931 Pauls ......................... 220/541
2,121,190 A    6/1938 Fellowes
2,299,766 A   10/1942 Rosenthal (Continued)

FOREIGN PATENT DOCUMENTS

| AU | B69962/91 | 10/1991 |
| DE | 3020836 A | 12/1981 |
| DE | 3302105 | 7/1983 |
| DE | 3933611 | 4/1991 |
| DE | 4313330 | 9/1994 |

(Continued)

OTHER PUBLICATIONS

"iCube, my cube, my spaceTM", materials publicly provided in an offer to sell the associated product at least as early as Apr. 23, 2008, 22 pages.

(Continued)

*Primary Examiner*—Janet M Wilkens
*Assistant Examiner*—Dan Rohrhoff
(74) *Attorney, Agent, or Firm*—Griffiths & Seaton PLLC

(57) ABSTRACT

A storage system includes a shell having a plurality of walls and a plurality of rails. The plurality of walls are coupled to one another to form a storage chamber therebetween and to define a plurality of intersection edges. Each of the plurality of intersection edges is formed at a corresponding boundary of two adjacent ones of the plurality of walls. The plurality of rails each extend outwardly from a corresponding one of the plurality of intersection edges with an angled orientation relative to each of the two adjacent ones of the plurality of walls. A cross-sectional thickness of each of the plurality of rails increases as each of the plurality of rails extends away from one of the plurality of intersection edges. Related storage and organization systems, pillows, accessories and methods are also disclosed and provide additional advantages.

34 Claims, 77 Drawing Sheets

U.S. PATENT DOCUMENTS

| | | | |
|---|---|---|---|
| 2,364,083 A * | 12/1944 | Lindsay | 52/280 |
| D158,479 S | 5/1950 | Long | |
| 3,027,045 A | 5/1961 | Wilson | |
| D197,311 S | 1/1964 | Spaak | |
| 3,170,594 A | 2/1965 | Nascher | |
| 3,254,440 A | 6/1966 | Duggar | |
| 3,254,786 A | 6/1966 | Melville | |
| 3,279,873 A | 10/1966 | Gronquist | |
| 3,421,656 A | 1/1969 | Asenbauer | |
| 3,468,591 A | 9/1969 | Wodli | |
| 3,506,321 A | 4/1970 | Hampel | |
| 3,552,579 A | 1/1971 | Simon et al. | |
| 3,563,624 A | 2/1971 | Stice | |
| 3,583,780 A | 6/1971 | Berkowitz | |
| 3,655,065 A | 4/1972 | Yellin | |
| 3,661,434 A | 5/1972 | Alster | |
| D225,815 S | 1/1973 | Torrey | |
| 3,722,704 A | 3/1973 | Piretti | |
| 3,722,971 A | 3/1973 | Zeischegg | |
| 3,743,372 A | 7/1973 | Ruggerone | |
| 3,822,924 A | 7/1974 | Lust | |
| D232,812 S | 9/1974 | Ogle et al. | |
| 3,836,217 A | 9/1974 | Shiina | |
| 3,836,218 A | 9/1974 | Hallal | |
| 3,853,367 A | 12/1974 | Jamison et al. | |
| 3,856,147 A | 12/1974 | Piretti | |
| 3,874,753 A | 4/1975 | Naito et al. | |
| 3,885,845 A | 5/1975 | Krieks | |
| D238,051 S | 12/1975 | Fier, Jr. | |
| 3,975,877 A | 8/1976 | Walton | |
| 4,047,773 A | 9/1977 | Semany | |
| 4,050,604 A | 9/1977 | Flanders | |
| D246,872 S | 1/1978 | White | |
| D251,480 S | 4/1979 | Cherry | |
| 4,192,562 A | 3/1980 | Bishoff et al. | |
| 4,196,948 A | 4/1980 | Gavel et al. | |
| D256,196 S | 8/1980 | Kates | |
| 4,261,627 A | 4/1981 | Felsenthal | |
| D268,622 S | 4/1983 | Wolters et al. | |
| 4,403,554 A | 9/1983 | Valentine et al. | |
| 4,448,463 A | 5/1984 | Amos | |
| 4,470,647 A | 9/1984 | Bishoff et al. | |
| D278,663 S | 5/1985 | Zeischegg et al. | |
| D279,945 S | 8/1985 | Zeischegg et al. | |
| 4,704,313 A | 11/1987 | Maier | |
| 4,707,038 A | 11/1987 | Voegeli | |
| 4,717,214 A | 1/1988 | Moore et al. | |
| 4,742,931 A * | 5/1988 | Bennett | 220/23.86 |
| 4,782,637 A * | 11/1988 | Eriksson et al. | 52/280 |
| 4,863,222 A | 9/1989 | Posso | |
| D323,296 S | 1/1992 | Schoenthaler | |
| D326,345 S | 5/1992 | Mandell et al. | |
| 5,119,610 A | 6/1992 | Birkeland et al. | |
| 5,147,120 A * | 9/1992 | Ray | 312/111 |
| D330,161 S | 10/1992 | Schuh | |
| 5,176,435 A | 1/1993 | Pipkens | |
| D349,646 S | 8/1994 | Dickinson | |
| 5,356,031 A * | 10/1994 | Jondelius | 220/610 |
| 5,357,728 A | 10/1994 | Duncanson | |
| D358,328 S | 5/1995 | Huerto et al. | |
| D360,898 S | 8/1995 | Huerto et al. | |
| D361,203 S | 8/1995 | Regnier | |
| 5,464,295 A | 11/1995 | Daillot | |
| 5,466,058 A | 11/1995 | Chan | |
| 5,477,594 A | 12/1995 | LePage | |
| 5,486,041 A | 1/1996 | Sykes | |
| 5,492,399 A | 2/1996 | Tillack | |
| D368,162 S | 3/1996 | Miller | |
| 5,497,888 A | 3/1996 | Michaels et al. | |
| D376,259 S | 12/1996 | Dickinson et al. | |
| 5,584,412 A * | 12/1996 | Wang | 220/500 |
| 5,588,726 A | 12/1996 | Lee | |
| 5,647,649 A | 7/1997 | Kao | |
| 5,680,744 A | 10/1997 | Kramedjian et al. | |
| D387,559 S | 12/1997 | Williamson | |
| 5,716,116 A | 2/1998 | Carlson et al. | |
| 5,720,547 A | 2/1998 | Baird | |
| 5,775,046 A | 7/1998 | Fanger et al. | |
| D404,571 S | 1/1999 | Evans | |
| 5,902,025 A | 5/1999 | Yu | |
| 5,913,580 A | 6/1999 | Liu | |
| 5,921,646 A | 7/1999 | Hwang | |
| 5,941,616 A * | 8/1999 | Billingham | 312/111 |
| 6,024,626 A | 2/2000 | Mendelsohn | |
| D421,678 S | 3/2000 | Levy | |
| 6,039,202 A * | 3/2000 | Olstad et al. | 220/533 |
| D427,769 S | 7/2000 | Zimmerman | |
| 6,113,203 A | 9/2000 | Chen | |
| D431,907 S | 10/2000 | Andujar et al. | |
| D437,706 S | 2/2001 | Alcala et al. | |
| 6,209,976 B1 | 4/2001 | Shear | |
| D454,454 S | 3/2002 | Hamilton et al. | |
| 6,352,323 B1 * | 3/2002 | Rives | 312/324 |
| D455,292 S | 4/2002 | Hardy et al. | |
| 6,488,346 B2 | 12/2002 | Chen | |
| 6,508,021 B2 | 1/2003 | Ong | |
| 6,536,856 B2 | 3/2003 | Pelizzari et al. | |
| 6,557,955 B2 | 5/2003 | Saravis | |
| 6,698,853 B2 | 3/2004 | Chen et al. | |
| D495,248 S | 8/2004 | Krebs et al. | |
| 6,820,950 B1 * | 11/2004 | Sun | 312/108 |
| 6,848,758 B1 | 2/2005 | Yeh et al. | |
| 6,938,966 B1 | 9/2005 | Rouwhorst | |
| 6,942,306 B2 | 9/2005 | Youngs et al. | |
| RE38,836 E | 10/2005 | Krause et al. | |
| 6,962,262 B2 | 11/2005 | Toma | |
| 6,971,529 B1 | 12/2005 | Shapiro | |
| 6,991,115 B2 | 1/2006 | Chow et al. | |
| 7,048,346 B2 | 5/2006 | Saravis | |
| D540,039 S | 4/2007 | van Beuningen | |
| 7,231,740 B2 | 6/2007 | Jirele | |
| 7,507,136 B2 | 3/2009 | Patton | |
| D594,657 S | 6/2009 | McAlpine | |
| 7,588,162 B2 * | 9/2009 | Dube et al. | 220/552 |
| 2002/0093272 A1 | 7/2002 | Saravis | |
| 2002/0185941 A1 | 12/2002 | Ferraro et al. | |
| 2003/0193274 A1 | 10/2003 | Saravis | |
| 2003/0222545 A1 | 12/2003 | Stravitz | |
| 2004/0164653 A1 | 8/2004 | Winkless | |
| 2004/0217677 A1 | 11/2004 | Durand et al. | |
| 2005/0006991 A1 | 1/2005 | Saravis | |
| 2005/0077805 A1 | 4/2005 | Dalebout et al. | |
| 2005/0088068 A1 | 4/2005 | Chang | |
| 2005/0104483 A1 | 5/2005 | Saravis | |
| 2005/0168116 A1 | 8/2005 | Chuang | |
| 2006/0080928 A1 | 4/2006 | Kichijo et al. | |
| 2006/0244348 A1 | 11/2006 | Richied et al. | |
| 2006/0250052 A1 | 11/2006 | Davis et al. | |
| 2008/0011697 A1 | 1/2008 | Berg | |
| 2008/0017596 A1 | 1/2008 | Brock | |

FOREIGN PATENT DOCUMENTS

| | | |
|---|---|---|
| DE | 19735185 | 2/1999 |
| DE | 19949849 | 2/2001 |
| DE | 20309712 U | 8/2003 |
| EP | 0270495 | 6/1988 |
| EP | 0614017 | 9/1994 |
| EP | 0801912 | 10/1997 |
| FR | 2316679 | 1/1977 |
| FR | 2376677 | 8/1978 |
| FR | 2862356 | 5/2005 |
| GB | 2101202 A | 1/1983 |
| GB | 2206280 | 1/1989 |

| | | | |
|---|---|---|---|
| GB | 2231820 A | 11/1990 | |
| GB | 2355672 | 5/2001 | |
| GB | 2370239 A | 6/2002 | |
| WO | 8700406 | 1/1987 | |
| WO | 9920153 | 4/1999 | |
| WO | 0127395 | 4/2001 | |

OTHER PUBLICATIONS

Shopwiki, "Organizer Bins-Lookers-Locker Organizers-Magnetic Storage Bins," http://www.shopwiki.com/_Organizer+Bins+-+Lookers+-++Locker+Organizers+-+Magnetic+Storage+Bins, printed on Aug. 2, 2009, 2 pages.

Egan Visual, Inc., "Modular Storage . . . configured to your requirements," 2004, 2 pages.

Egan Visual, Inc., "Finish Schedule," Price and Specification Guide, Jul. 2002, 11 pages.

Egan Visual, Inc., "Finish Schedule," Price and Specification Guide, Jul. 2002, 3 pages.

Egan Visual, Inc., "Mobile Task Carts & Lockers - Product Design Rationale," 2004, 2 pages.

Moduline Modular Aluminum Cabinets, "Moduline Pro-Series Combinations - Trailer Cabinets Organize With Style! - Modular Aluminum Storage Cabinets," printed from www.modulinecabinets.com in May 2006, 3 pages.

"elfa® Platinum Garage System," printed from www.organize.com in May 2006, 2 pages.

"The Cube Storage System," printed from www.organize.com in May 2006, 2 pages.

"Storage Cubes: a Unique 5 Piece Modular Storage System - Cherry," printed from www.organize.com in May 2006, 2 pages.

"elfa® Basic 9' Double Hang Closet," printed from www.organize.com in May 2006, 2 pages.

"Closits Modular Furniture System - Maple," printed from www.target.com in May 2006, 3 pages.

"QBO Storage Solution," www.topdeq.com/topdeq/product.do@catid=us_75&prodid=pp_QBO, printed in May 2006, 2 pages.

"Cubo Modular Storage," www.topdeq.com/topdeq/product.do@catid=us_75&prodid=pp_CUBIC, printed in May 2006, 3 pages.

Storage Member publicly available in IKEA stores at least as early as Jan. 2000.

* cited by examiner

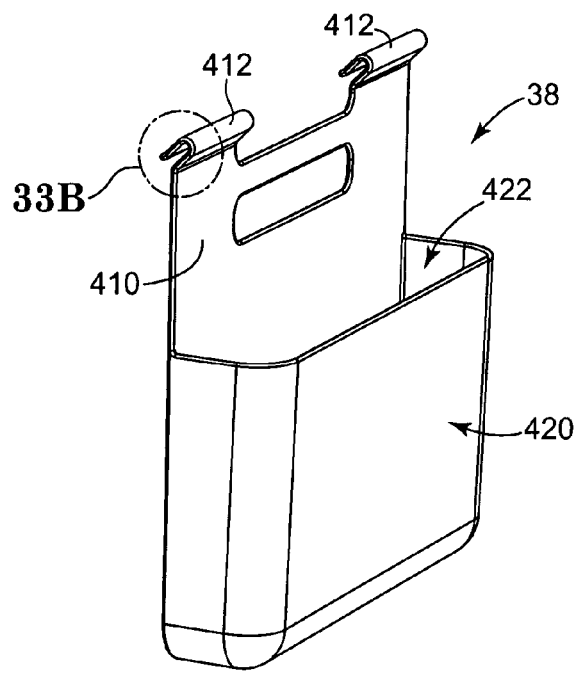
Fig. 33A
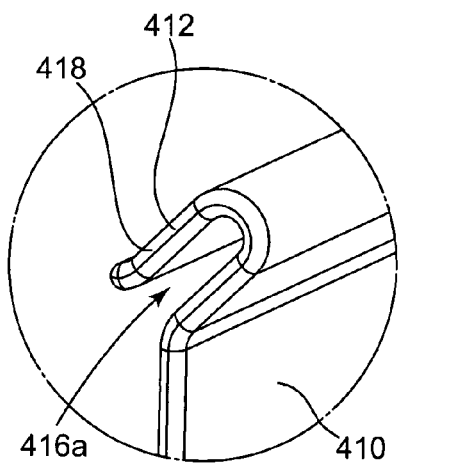 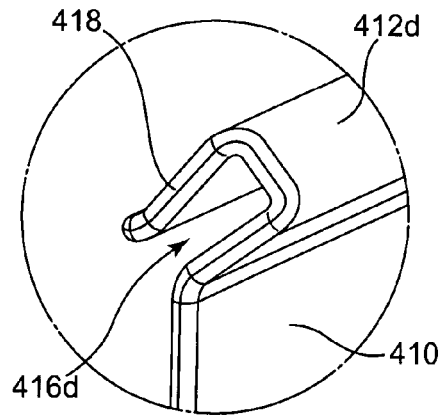
Fig. 33B    Fig. 33C

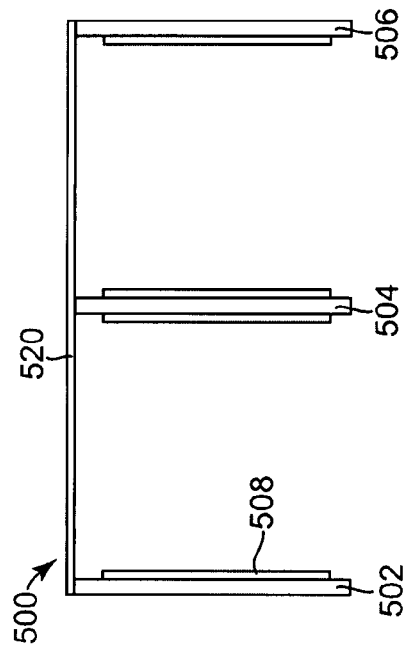
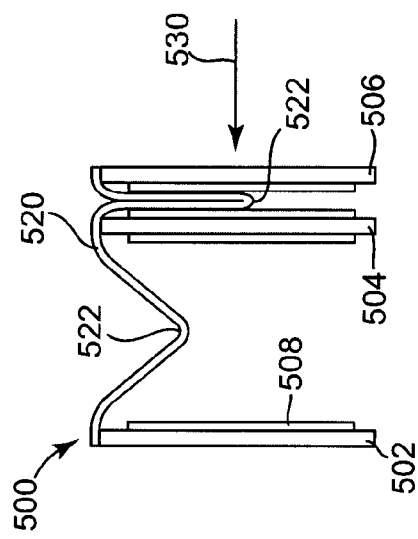
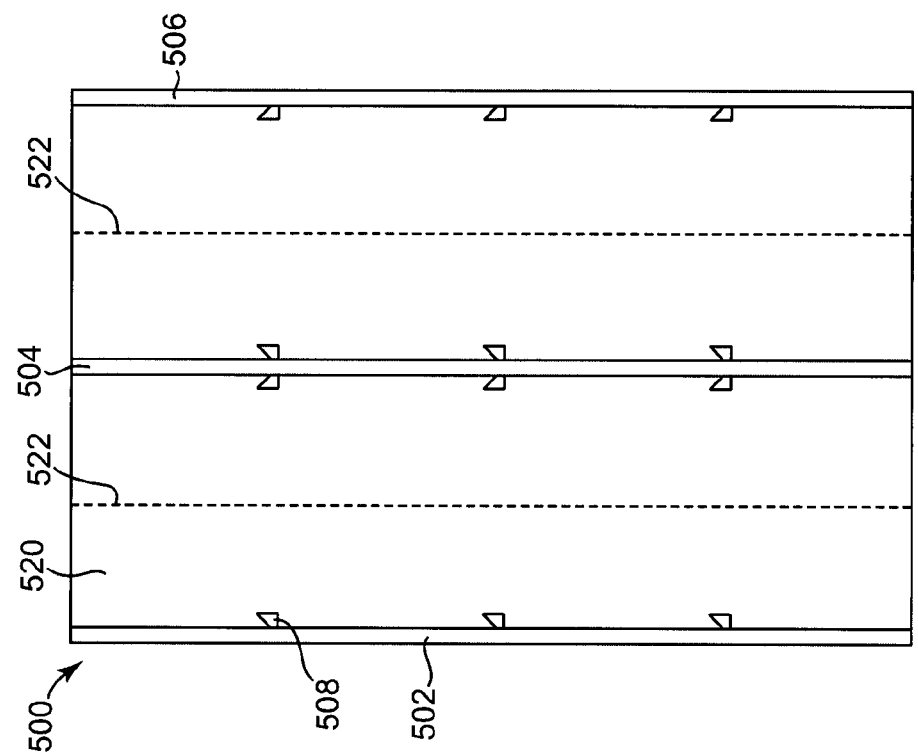

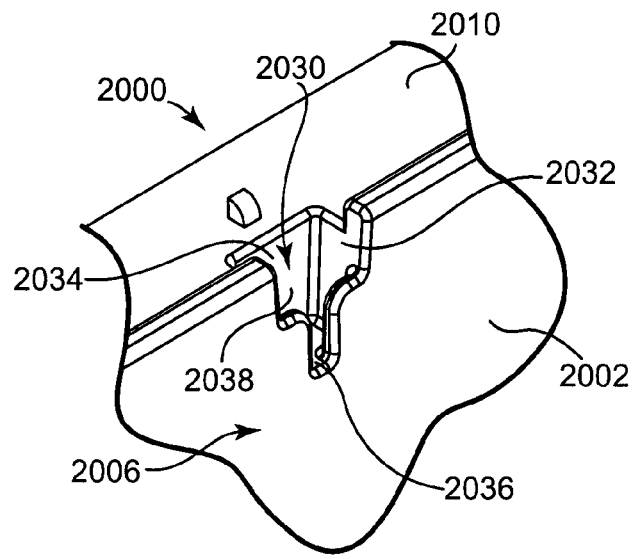
Fig. 80
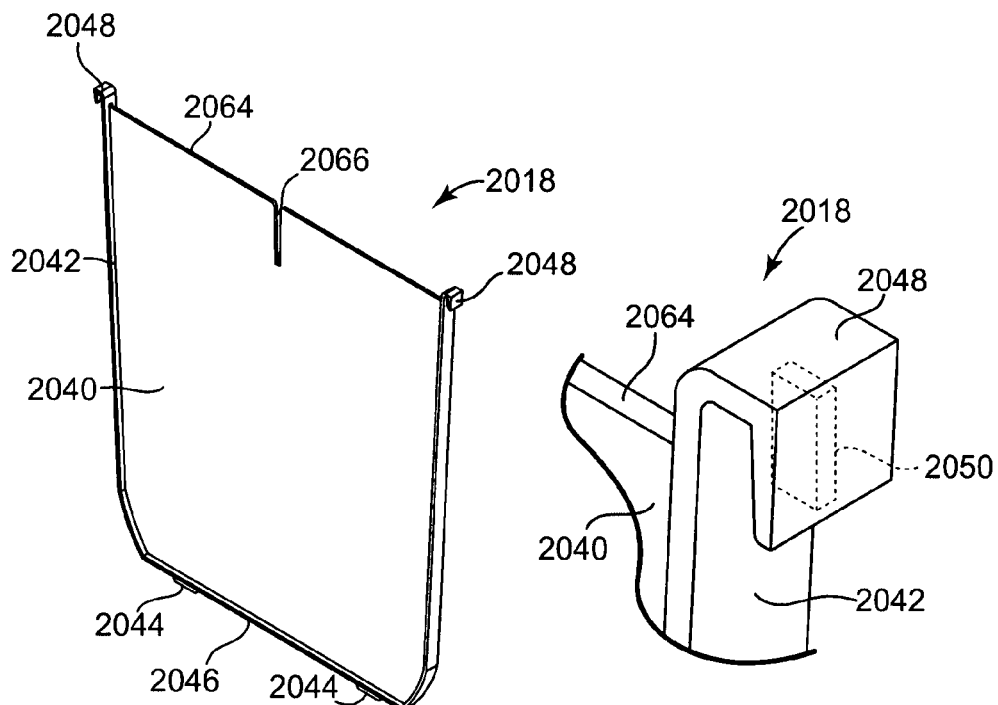
Fig. 81
Fig. 82

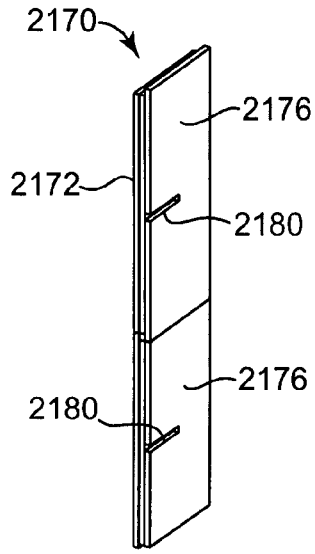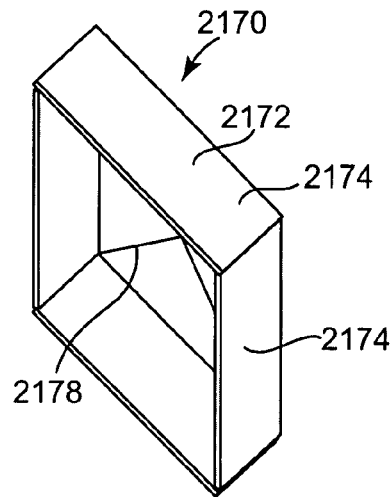
Fig. 94   Fig. 95
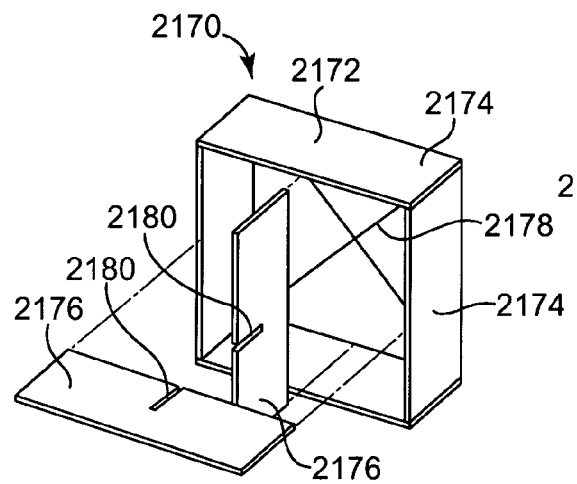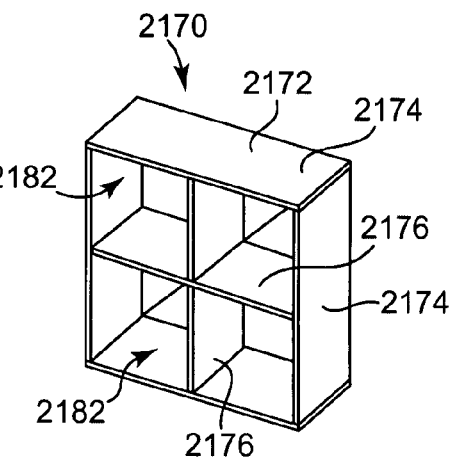
Fig. 96   Fig. 97

STORAGE AND ORGANIZATION SYSTEM AND COMPONENTS THEREOF

CROSS-REFERENCE TO RELATED APPLICATION

This application is claims priority under 35 U.S.C. §119(e) to U.S. Provisional Patent Application 60/842,469 entitled "Storage and Organization System," having a filing date of Sep. 6, 2006, and U.S. Provisional Patent Application 60/941,503 entitled "Storage and Organization System," having a filing date of Jun. 1, 2007, both of which are incorporated herein by reference.

BACKGROUND OF THE INVENTION

Many organization and storage items and systems are available to assist consumers in their quest to store and organize their belongings. However, in general, consumers continually accumulate items and/or transfer items from one location in a home to another. Accordingly, a storage and organization system that may function well for a consumer at one point in time may gradually become ill-suited for the consumer's needs at a subsequent time. In order to adapt to their changing needs, consumers often discard and replace old organization systems with new, more suitable systems. In this manner, as the needs of a consumer continue to evolve, a cycle of implementing and replacing organization systems often occurs. This cycle, which may seem to be never ending, can leave a consumer frustrated and distraught with attempts to organize the typically increasing inventory of belongings according to the consumer's evolving use of such belongings.

SUMMARY OF THE INVENTION

One aspect of the present invention relates to a storage system including a shell having a plurality of walls and a plurality of rails. The plurality of walls are coupled to one another to form a storage chamber therebetween and to define a plurality of intersection edges. Each of the plurality of intersection edges is formed at a corresponding boundary of two adjacent ones of the plurality of walls. The plurality of rails each extend outwardly from a corresponding one of the plurality of intersection edges with an angled orientation relative to each of the two adjacent ones of the plurality of walls. A cross-sectional thickness of each of the plurality of rails increases as each of the plurality of rails extends away from one of the plurality of intersection edges. Related products, systems, components and methods are also disclosed and provide additional advantages.

BRIEF DESCRIPTION OF THE DRAWINGS

Embodiments of the invention will be described with respect to the figures, in which like reference numerals denote like elements, and in which:

FIG. 33A illustrates a perspective view of a hanging accessory, according to one embodiment of the present invention.

FIG. 33B illustrates a detailed view of a portion of the hanging accessory of FIG. 33A, according to one embodiment of the present invention.

FIG. 33C illustrates a detailed view of a portion of the hanging accessory of FIG. 33A, according to one embodiment of the present invention.

FIG. 36A illustrates a front view of a support assembly of a storage and organization system in a use position, according to one embodiment of the present invention.

FIG. 36B illustrates a top view of the support assembly of FIG. 36A in a use position, according to one embodiment of the present invention.

FIG. 36C illustrates a top view of the support assembly of FIG. 36A in a partially collapsed position, according to one embodiment of the present invention.

FIG. 80 illustrates a detail view of a portion of the bin of FIG. 76.

FIG. 81 illustrates a perspective view of a divider for use with the bin of FIG. 76, according to one embodiment of the present invention.

FIG. 82 illustrates a detail perspective view of a hook of the divider of FIG. 81.

FIG. 94 illustrates a perspective view of a collapsed support assembly, according to one embodiment of the present invention.

FIG. 95 illustrates a perspective view of an expanded external box of the support assembly of FIG. 94, according to one embodiment of the present invention.

FIG. 96 illustrates an exploded perspective view of the support assembly of FIG. 94 when partially assembled, according to one embodiment of the present invention.

FIG. 97 illustrates a perspective view of the support assembly of FIG. 94 when fully assembled, according to one embodiment of the present invention

FIG. 111 illustrates a cross-sectional view of a coupling between the side wall with the coupling device of FIG. 110 and a shelf, according to one embodiment of the present invention.

FIG. 112 illustrates a side view of a coupling between a shelf and a side wall, according to one embodiment of the present invention.

FIG. 113 illustrates a side view of a shelf to a side wall, according to one embodiment of the present invention.

FIG. 114 illustrates a side view of a collapsed shell including separate hinges, according to one embodiment of the present invention.

FIG. 115 illustrates a perspective view of a hinge in a closed position, according to one embodiment of the present invention.

FIG. 116 illustrates a perspective view of a hinge of FIG. 115 in an open position, according to one embodiment of the present invention.

FIG. 117 illustrates a side view of a collapsed shell with beveled edges, according to one embodiment of the present invention.

FIG. 118 illustrates a perspective view of a partially collapsed shell with beveled edges, according to one embodiment of the present invention.

FIG. 119 illustrates a perspective view of an assembled shell with beveled edges, according to one embodiment of the present invention.

FIG. 120 illustrates a detailed perspective view of an inside of the assembled shell of FIG. 119, according to one embodiment of the present invention.

FIG. 121 illustrates a side view of a partially collapsed shell with squared edges, according to one embodiment of the present invention.

FIG. 122 illustrates a perspective view of the shell of FIG. 121 in an assembled position, according to one embodiment of the present invention.

Figure 123:
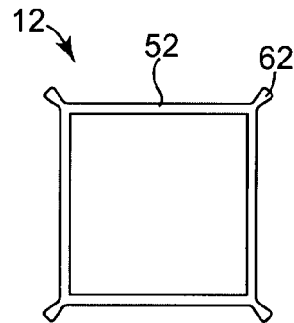

FIG. 123 illustrates a top view of a shell, according to one embodiment of the present invention.

Figure 124:
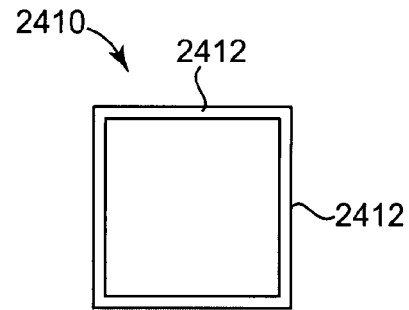

FIG. 124 illustrates a top view of a shell, according to one embodiment of the present invention.

Figure 125:
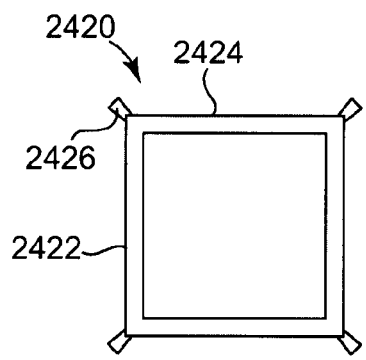

FIG. 125 illustrates a top view of a shell, according to one embodiment of the present invention.

Figure 126:
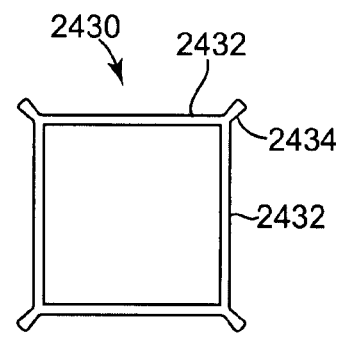

FIG. 126 illustrates a top view of a shell, according to one embodiment of the present invention.

Figure 127:
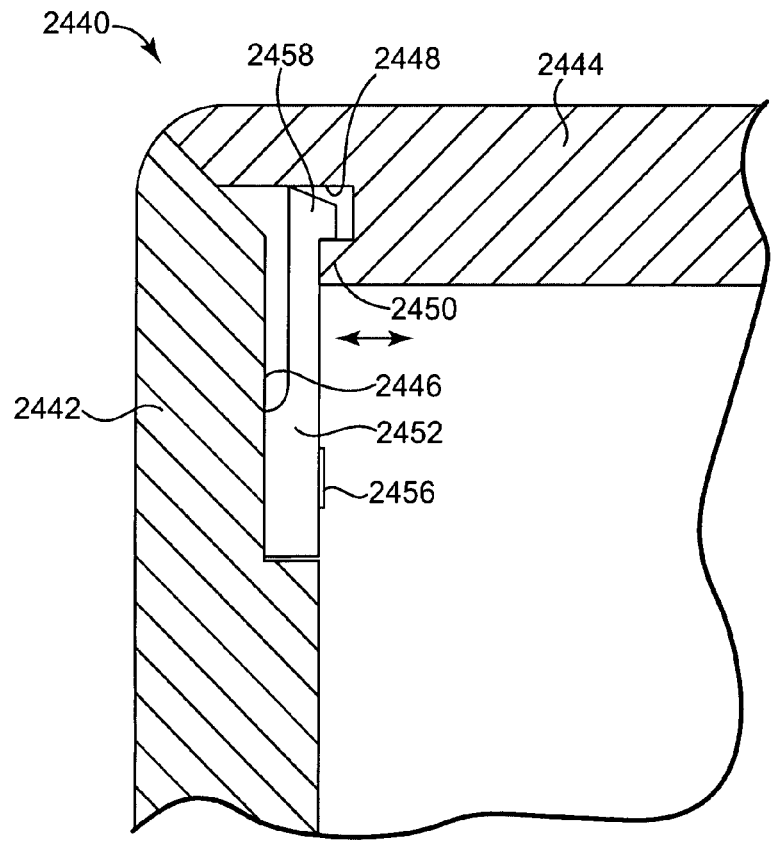

FIG. 127 illustrates a cross-sectional view of a portion of a shell, according to one embodiment of the present invention.

Figure 128:
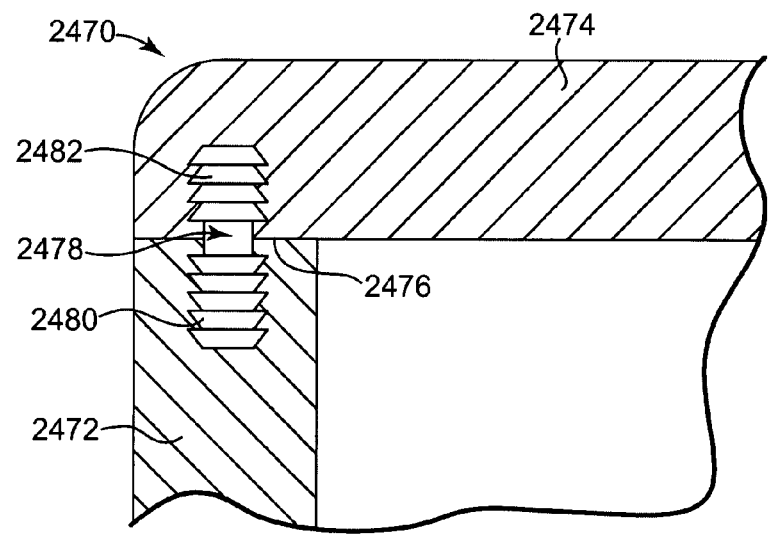

FIG. 128 illustrates a cross-sectional view of a portion of a shell, according to one embodiment of the present invention.

Figure 129:
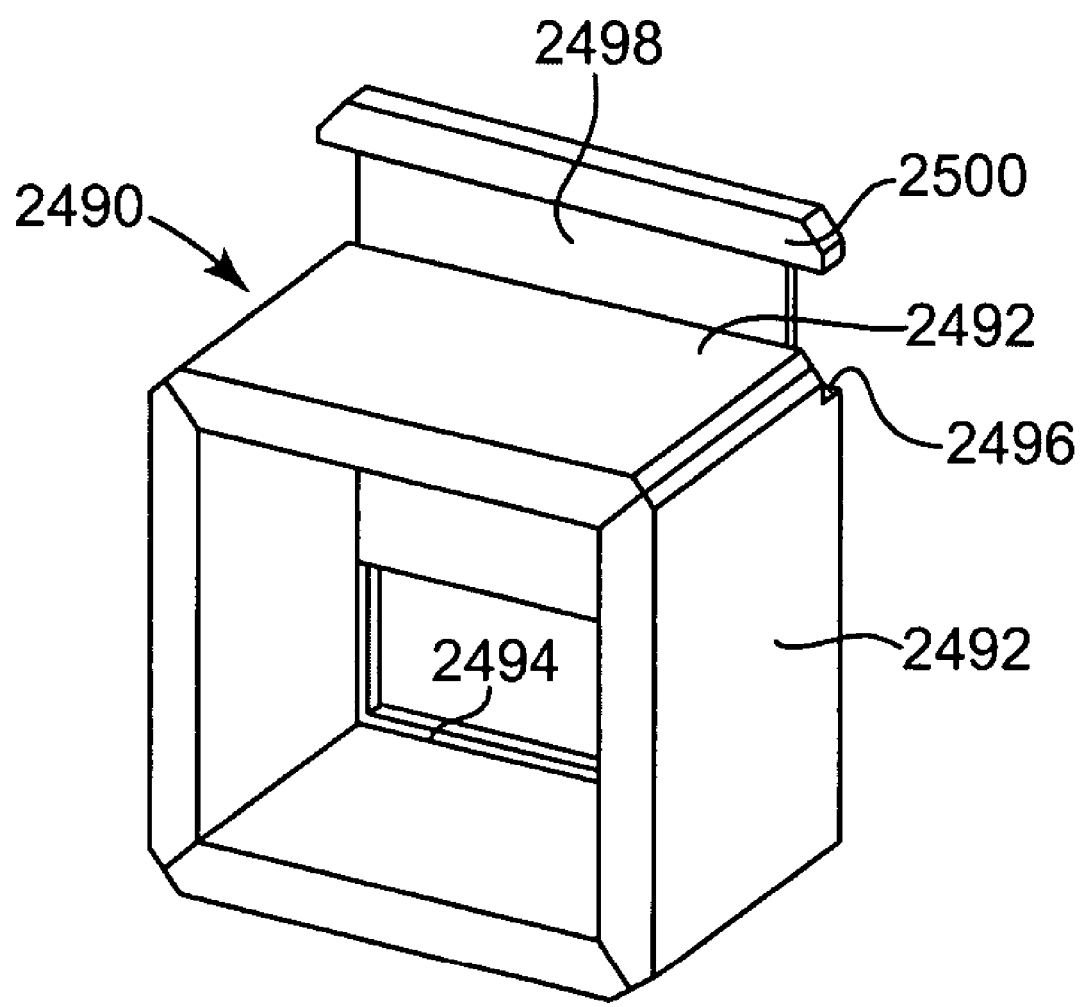

FIG. 129 illustrates a perspective view of a shell with a slide-in back panel, according to one embodiment of the present invention.

Figure 130:
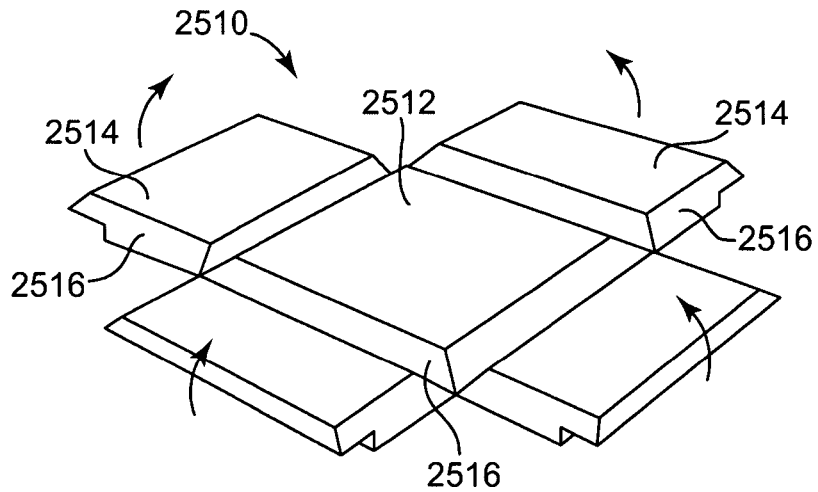

FIG. 130 illustrates a perspective view of a collapsed shell, according to one embodiment of the present invention.

Figure 131:
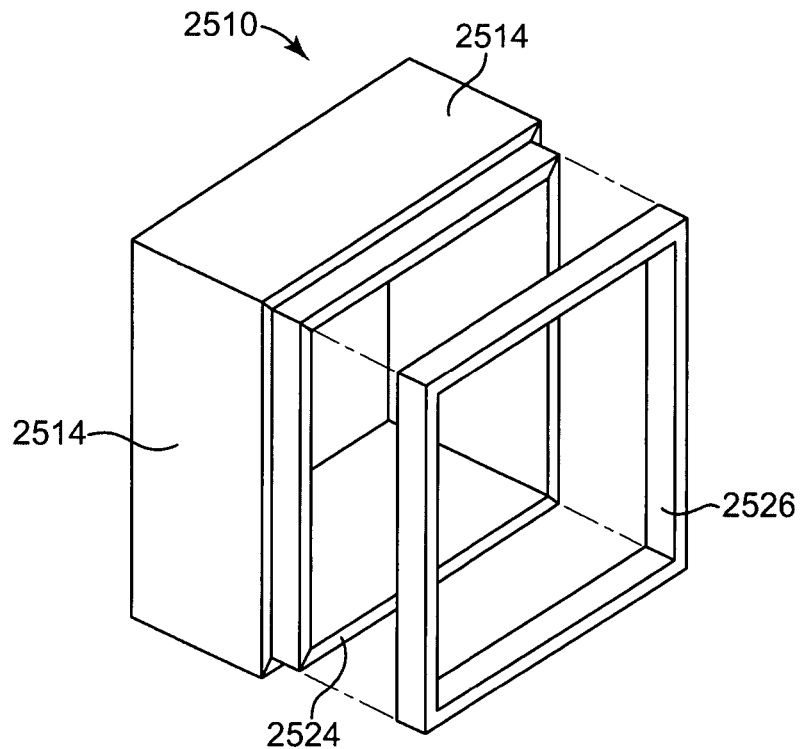

FIG. 131 illustrates an exploded perspective view of the shell of FIG. 130 with a frame, according to one embodiment of the present invention.

Figure 132:
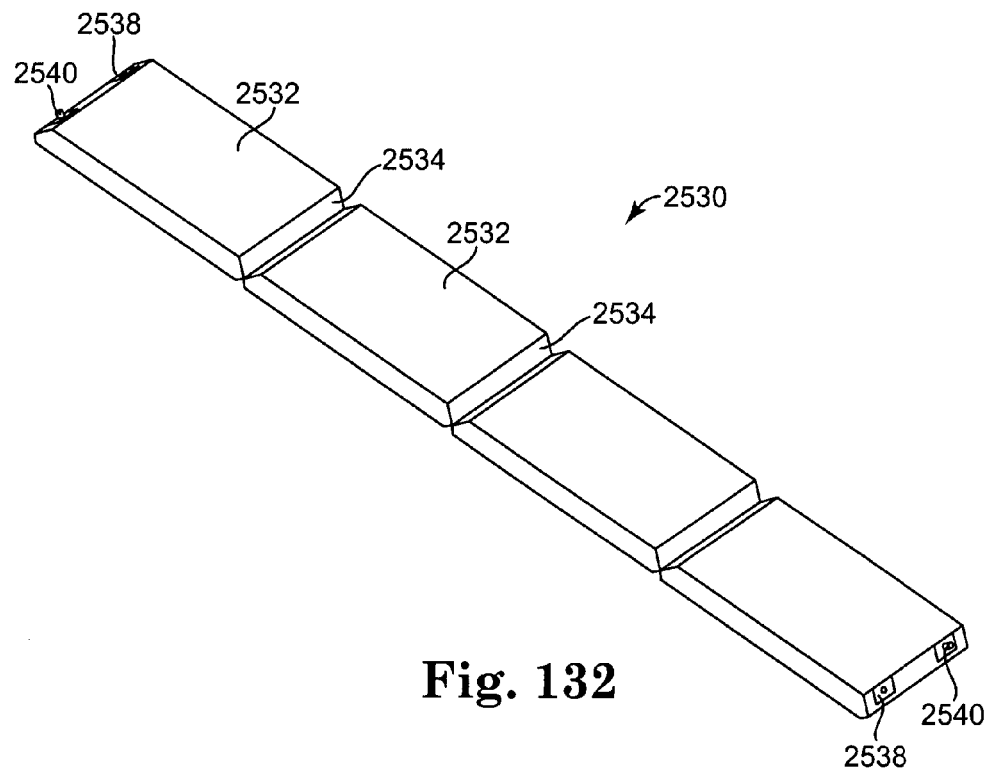

FIG. 132 illustrates a perspective view of a collapsed shell with fabric hinges, according to one embodiment of the present invention.

Figure 133:
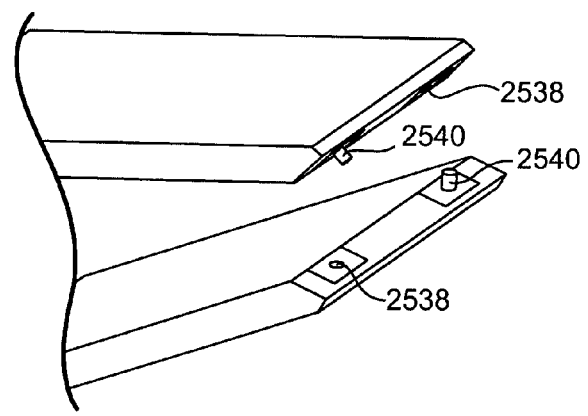

FIG. 133 illustrates a detailed perspective view of a wall-to-wall coupling of the shell of FIG. 132, according to one embodiment of the present invention.

Figure 134:
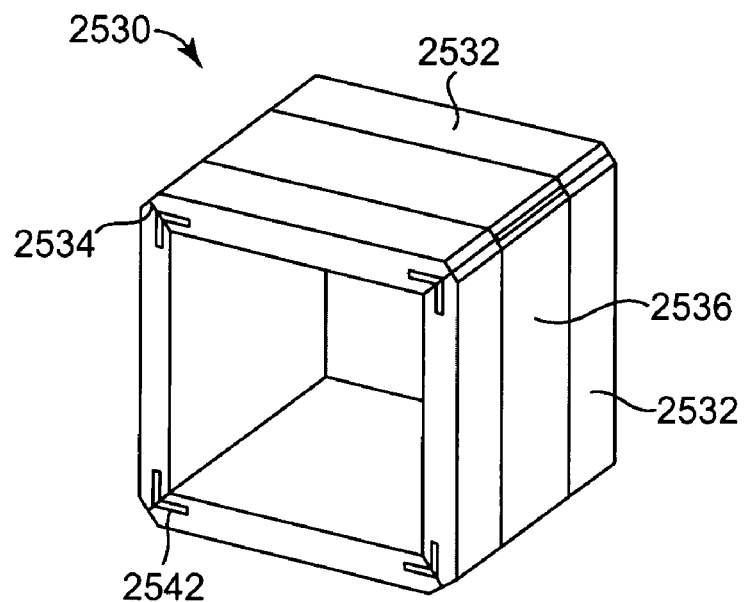

FIG. 134 illustrates a perspective view of the shell of FIG. 132 in an assembled position, according to one embodiment of the present invention.

Figure 135:
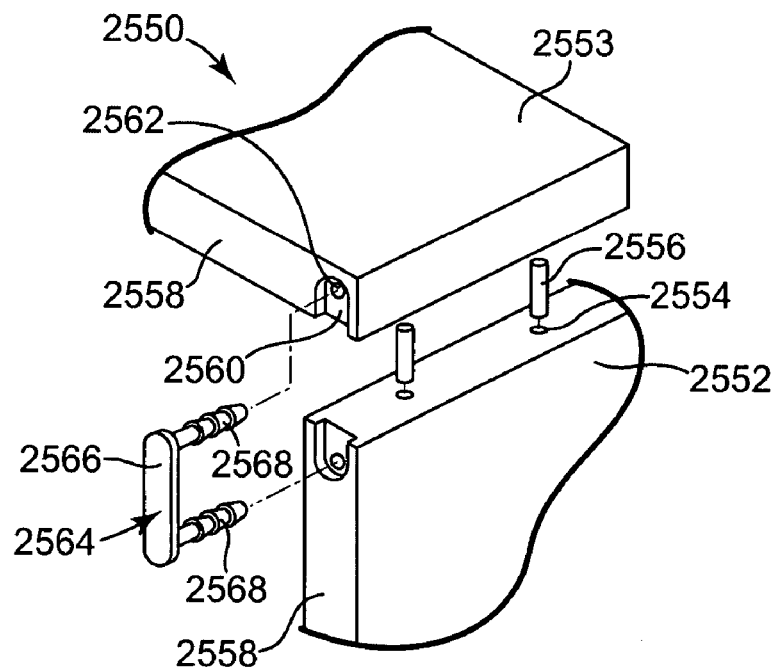
Figure 136:
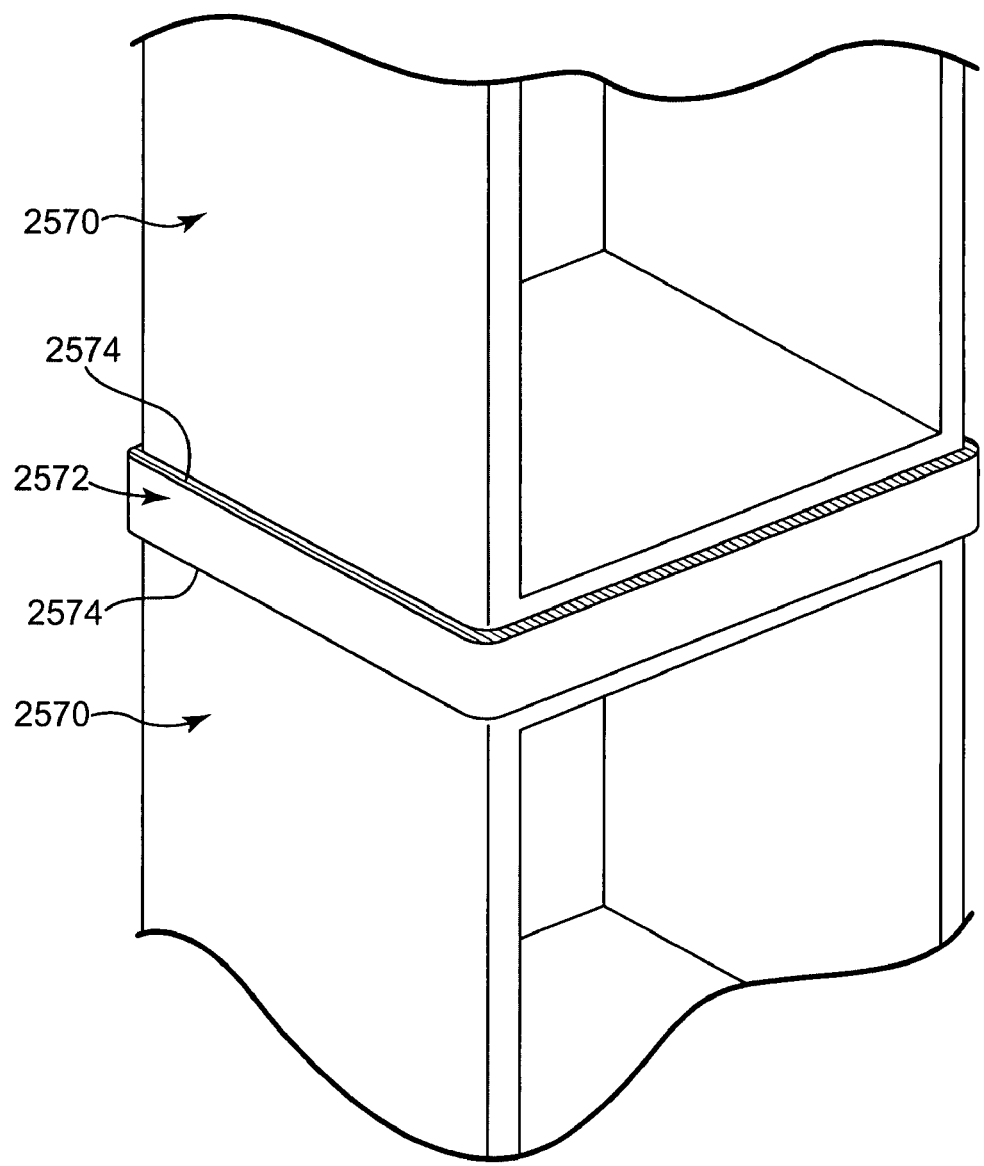

FIG. 135 illustrates an exploded perspective view of a wall-to-wall coupling of a shell, according to one embodiment of the present invention FIG. 136 illustrates a stack of shells using a pillow to facilitate stacking, according to one embodiment of the present invention.

Figure 137:
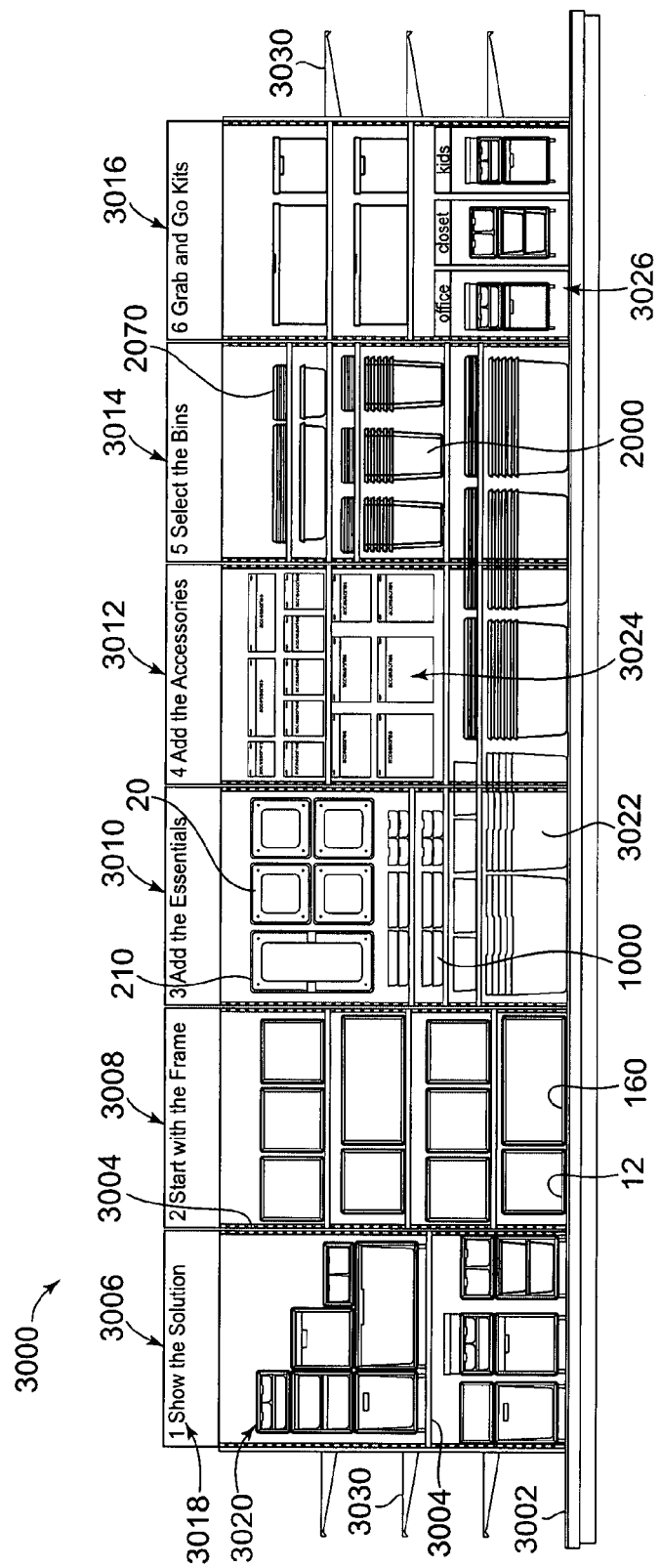

FIG. 137 illustrates an example display system for displaying components of storage and organization systems, according to one embodiment of the present invention.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A storage and organization system according to the embodiments described herein is configured to store a plurality of goods, such as a consumer's belongings, and to be easily reconfigured to evolve with the changing needs of the consumer. In one example, the system described herein is configured to be assembled without permanency while still providing a sturdy and aesthetically pleasing assembly. In one embodiment, although the general components of the system are configured for a plurality of purposes, additional accessory and other components are provided and configured to interface with the general components to personalize the system for use in a particular area of the home, at a particular time in a consumer's life, etc., based on the needs of the consumer. As such, in one example, the storage and organization system is an adaptable, aesthetically pleasing alternative to the plurality of mismatched organizational units generally available in the prior art. In the description below, similar reference numerals, for example, 62, 62a, 62b, 62c and 62d, refer to parts that are substantially similar except where specifically enumerated.

Figure 1:
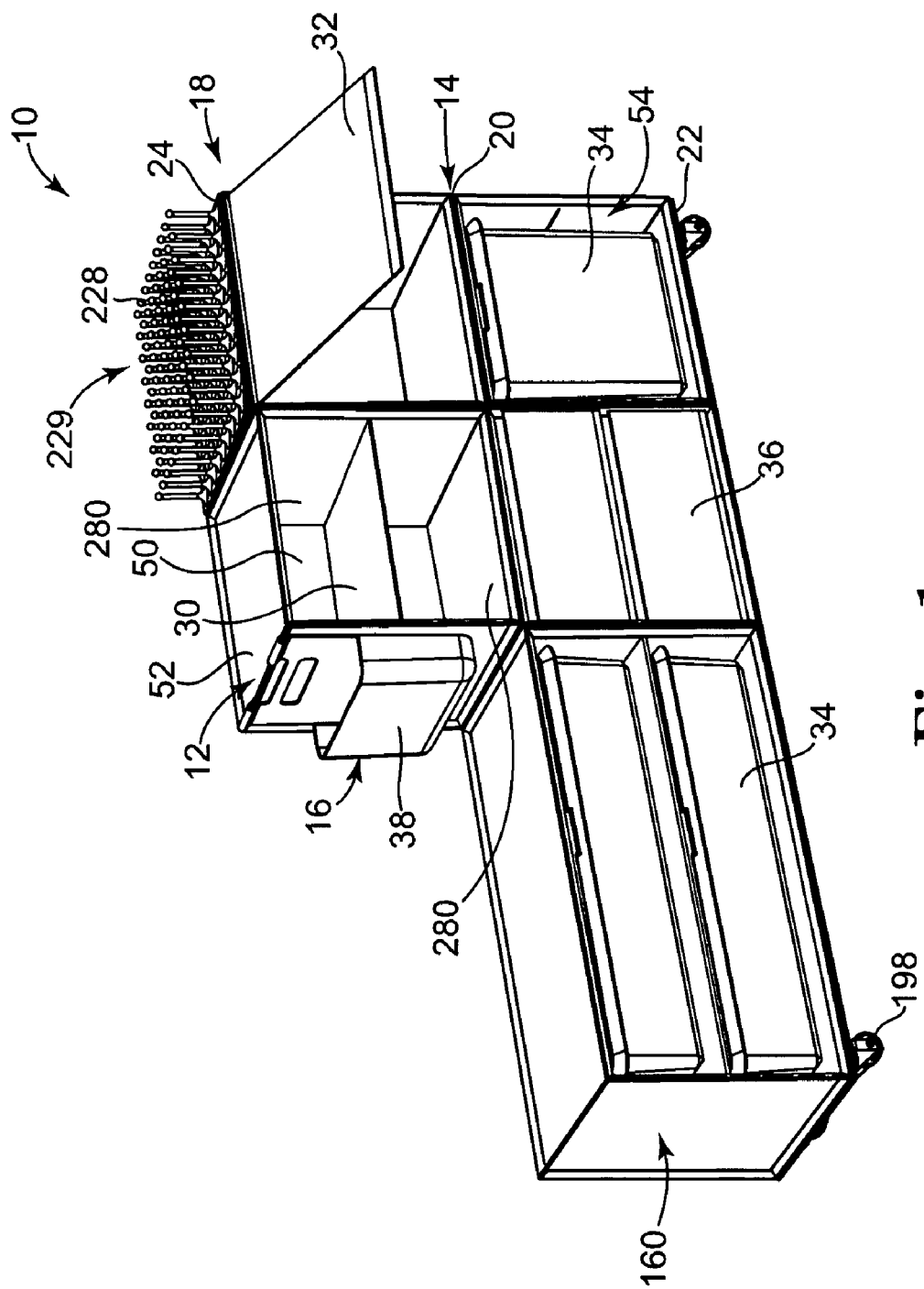
FIG. 1 illustrates a perspective view of a storage and organization system, according to one embodiment of the present invention.

Turning to the figures, FIG. 1 generally illustrates one embodiment of a storage and organization system 10. Storage and organization system 10 includes any suitable combination of a plurality of components such as, for example, shells 12, pillows 14 and accessories 16. The components 12, 14 and 16 are assembled into any one of a plurality of possible configurations 18 depending upon the needs and desired use of a consumer who purchases all or part of storage and organization system 10.

Shells 12 generally provide the overall structure of any configuration 18. Shells 12 may be formed of any variety of sizes and are generally configured to be selectively coupled to each other with pillows 14, more specifically with a connection pillow 20. Other types of pillows, for example, base pillows 22 and/or top pillows 24 can be added to lift and provide support to the system 10 and to finish off a top of and increase functionality of the system 10, respectively, as will be described in detail below.

Figure 34:
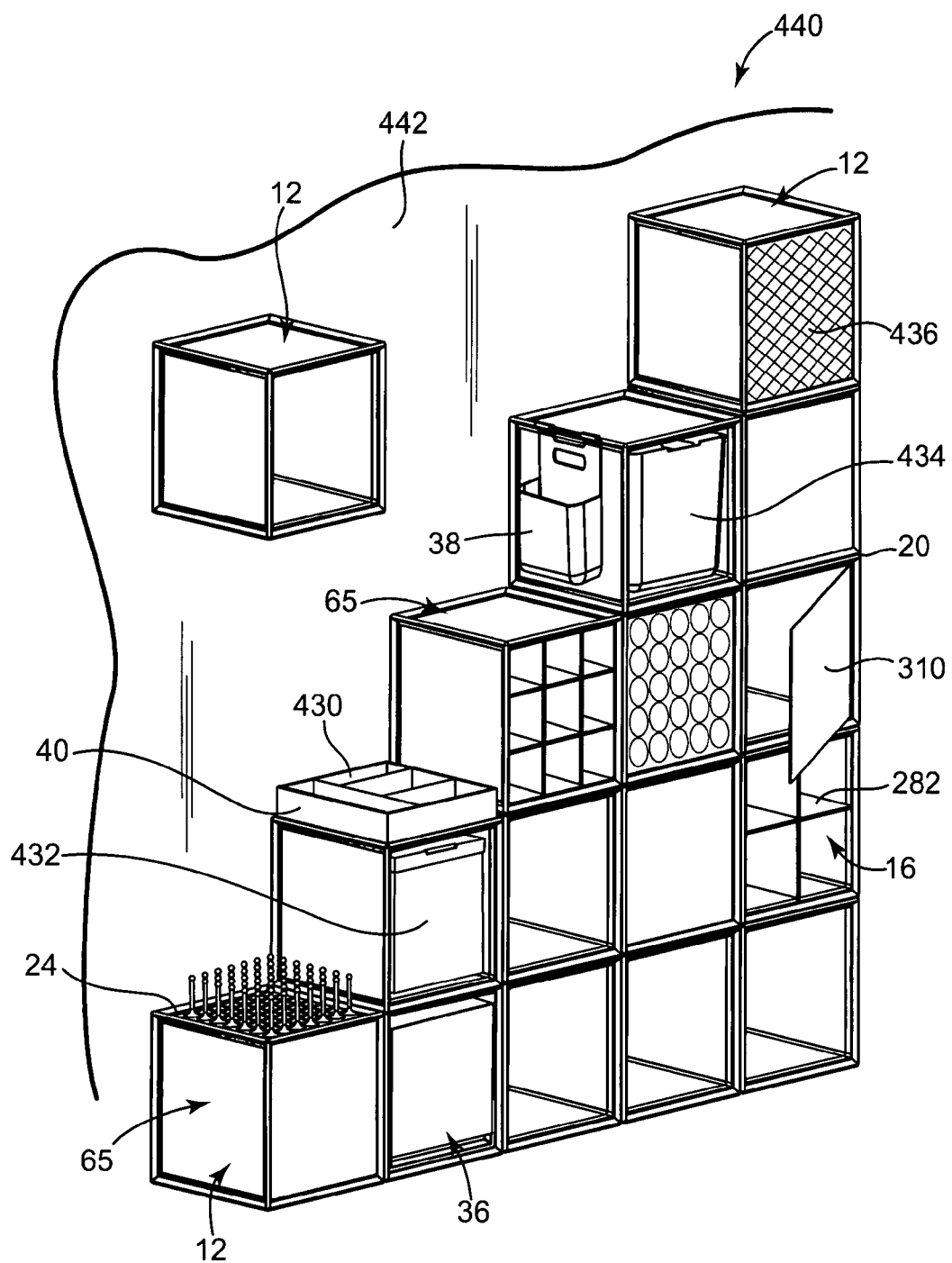
FIG. 34 illustrates a perspective view of a storage and organization system configuration, according to one embodiment of the present invention.

Accessories 16 are added to shells 12 as desired to further personalize storage and organization system 10 and to further define the use of each shell 12 included therein. For example, accessories 16 may include inserts 30, doors 32, bins 34, drawers 36, hangers 38 and trays 40 (FIG. 34). Shells 12, pillows 14 and accessories 16 are adapted to be coupled to one another in a manner that easily provides for uncoupling and reconfiguration of at least a portion of the shells 12, pillows 14 and accessories 16 and/or the addition or subtraction of shells 12, pillows 14 and/or accessories 16 of configuration 18. Accordingly, storage and organization system 10 is configured to evolve with the storage and organizational needs of the consumer.

Shells

As described above, shells 12 provide the basic building blocks of storage and organization system 10. In general, referring to FIG. 2, each shell 12 includes a rear panel or wall 50 (FIG. 1) and a plurality of side panels or walls 52. In one embodiment, rear wall 50 is rectangular and four side walls 52 each extend from a perimeter edge of rear wall 50 and between two of the other four side walls 52 to form a storage chamber 54 therebetween and an opening 56 between side walls 52 opposite rear wall 50. In one embodiment, walls 50 and 52 are arranged to form shell 12 as a parallelepiped (i.e., a six-faced polyhedron all of whose faces are substantially parallelograms lying in pairs of substantially parallel planes) with opening 56 being an open face thereof. In one example, each of walls 50 and 52 is a substantially square wall. The arrangement of walls 50 and 52 define an intersection edge 58 (indicated generally in FIG. 2) along the junction of each side wall 52 with another wall 50 or 52. In addition, four generally linear opening edges 60 are defined around opening 56.

Figure 2:
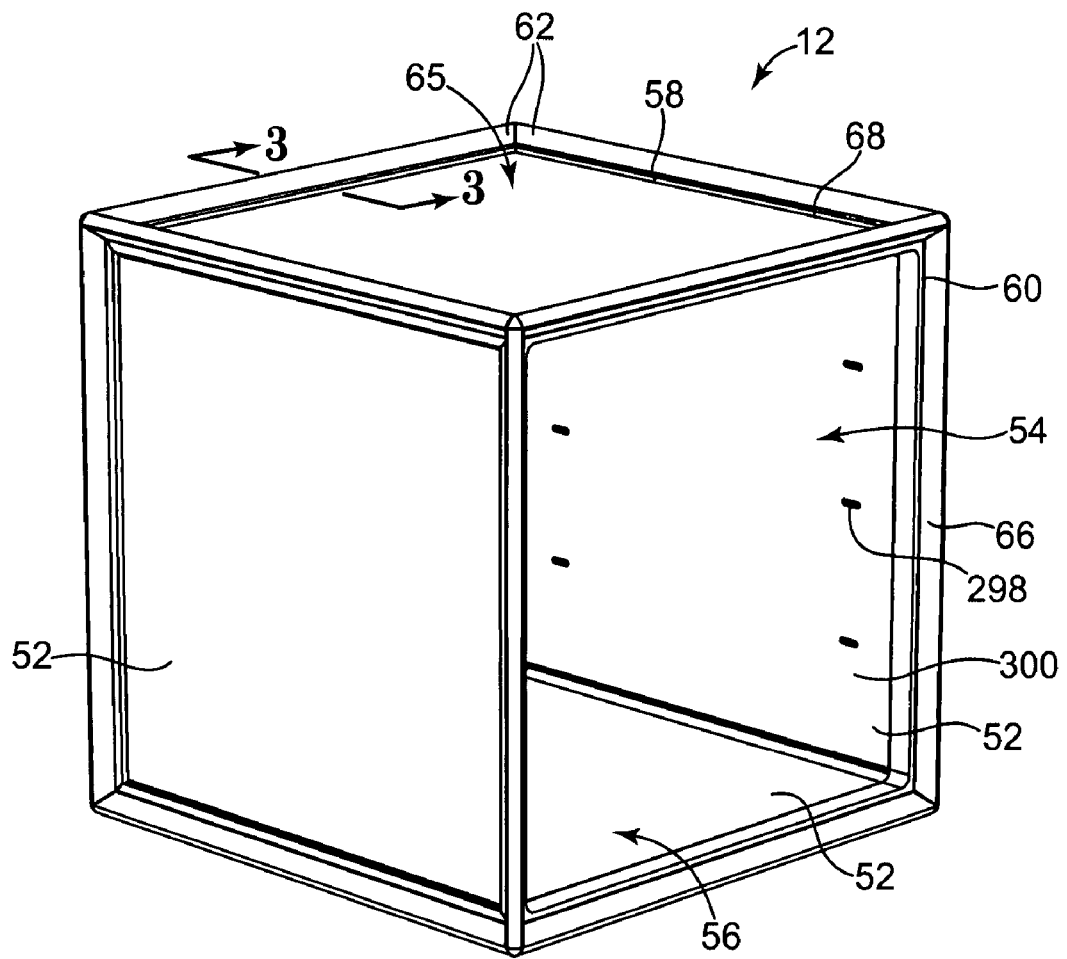
FIG. 2 illustrates a perspective view of a shell of the storage and organization system of FIG. 1, according to one embodiment of the present invention.

In one embodiment, each shell 12 includes a plurality of rails 62. Each rail 62 extends outwardly (i.e., away from storage chamber 54) from an associated intersection edge 58. Additionally referring to the cross-sectional view of FIG. 3A, in one example, each rail 62 extends from an intersection edge 58 with an angle θ measured between a center line 64 of rail 62, for example, rail 62a illustrated in FIG. 3A, and an outer surface of an adjacent wall 50 and/or 52 between about 130° and about 140°. In one embodiment where each rail 62 extends with an angle θ of about 135°, rails 62 are symmetrically positioned vertically and horizontally such that the particular orientation of shells 12 (for example, which side wall 52 is positioned as the lower wall) is of little consequence. Referring to FIG. 2, in one example, a front rail 66 similar to rails 62 extends from each open edge 60 of opening 56. In this manner, rails 62 and 66 define an external recess 65 of shell 12 adjacent each of walls 50 and 52. As will further be described below, rails 62 and recess 65 are configured to interface with and at least partially receive pillows 14, respectively, to selectively position multiple shells 12 relative to one another and/or are configured to receive other accessories 16.

Figure 3B:
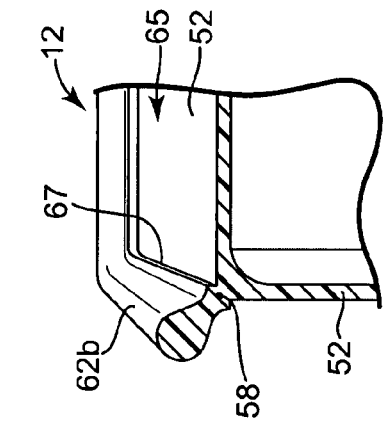
FIG. 3B illustrates a cross-sectional view of the shell taken along the line 3-3 of FIG. 2, according to one embodiment of the present invention.
Figure 3D:
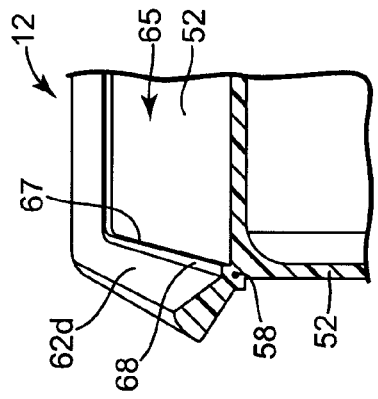
FIG. 3D illustrates a cross-sectional view of the shell taken along the line 3-3 of FIG. 2, according to one embodiment of the present invention.
Figure 3A:
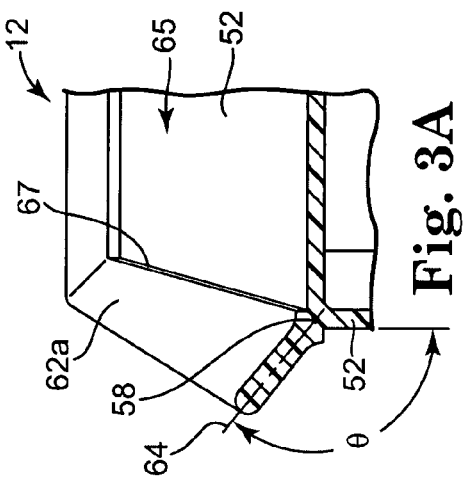
FIG. 3A illustrates a cross-sectional view of the shell taken along the line 3-3 of FIG. 2, according to one embodiment of the present invention.

As shown in the cross-sectional views of FIGS. 3A-3D, the cross-sectional shape of rails 62 may take any one of a variety of forms. For example, as illustrated in FIG. 3A, rail 62a has a slim, substantially rectangular or linear cross-sectional shape with a rounded edge. As such, rail 62a has a consistent thickness throughout its extension from an intersection edge 58 of shell 12. In one embodiment, as illustrated in FIG. 3B, each rail 62b has a bulbous cross-sectional shape such that a thickness off each rail 62b varies as each rail 62b extends from adjacent side walls 52.

Figure 3C:
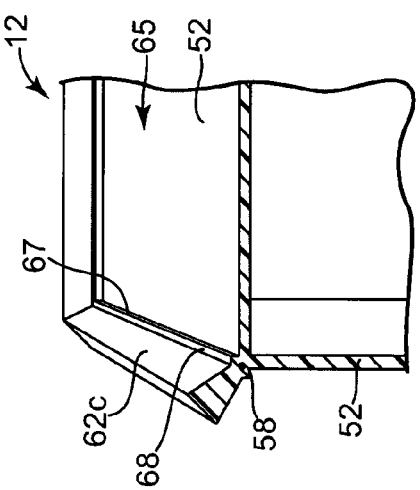
FIG. 3C illustrates a cross-sectional view of the shell taken along the line 3-3 of FIG. 2, according to one embodiment of the present invention.

As illustrated in FIG. 3C, in one embodiment, each rail 62c extends with a substantially triangular shape such that a thickness of rail 62c gradually increases as each rail 62c extends from an intersection edge 58. In another embodiment, as illustrated in FIG. 3D, each rail 62d is similar to rails 62c (FIG. 3C), however, each rail 62d is more rounded at the outer edges thereof. The tapered configuration of rails 62c and 62d and to some extent of rail 62b contributes to the overall strength of shell 12 by providing additional structural framing material about an outer portion thereof. In addition, as will be further described below, the tapered configuration of rails 62b, 62c and 62d also provides a more stable interface for receiving and maintaining accessories 16, such as hangers 38 as shown in FIG. 1. It should be noted that while embodiments described herein may illustrate use of one of rails 62a-62d, generally any of rails 62a-62d or other suitable rails 62 can be substituted for the described and illustrated rails 62a-62d. Front rails 66 may be formed similar to any one of rails 62a-62d or any other shaped rail 62. In one embodiment, all rails 62 and 66 of shell 12 are similarly formed.

In one example, as illustrated with reference to FIGS. 2 and 3A-3D, a lip or offset 67 is defined where each wall 50 and 52 transitions to a rail 62 or 66. In one embodiment, lip 67 extends outwardly (i.e., away from storage chamber 54) from rear wall 50 or side wall 52 with an orientation substantially perpendicular to the respective side or rear wall 50 or 52, thereby forming a step-like transition from each wall 50 or 52 to a corresponding rail 62 or 66. In one embodiment, such as that illustrated with respect to rail 62d in FIG. 3D, a ledge 68 extends from lip 67 toward rail 62d. In one example, ledge 68 extends with a substantially perpendicular orientation relative to lip 67. Lips 67 and ledges 68 add to the structural rigidity of shell 12 and also facilitate substantially stable receipt of pillows 14 (FIG. 1) as will be further described below.

Each shell 12 can be manufactured of any suitable material such as, for example, polypropylene, other plastics, acrylic, wood, metal, cardboard, paperboard, woven materials, structural foam or a composite thereof. In addition, shells 12 can be formed in any variety of configurations to provide the strength and aesthetic attributes for a particular use or range of uses as desired by a consumer. In one embodiment, each shell 12 is configured to collapse for substantially flat storage and/or packaging. As described in further detail below, a variety of shell constructions such as a parallelogram construction, a handshake construction, a modular construction, or any other suitable construction can be used to achieve the flat storage and packaging of shell 12.

Parallelogram Construction

Figure 4A:
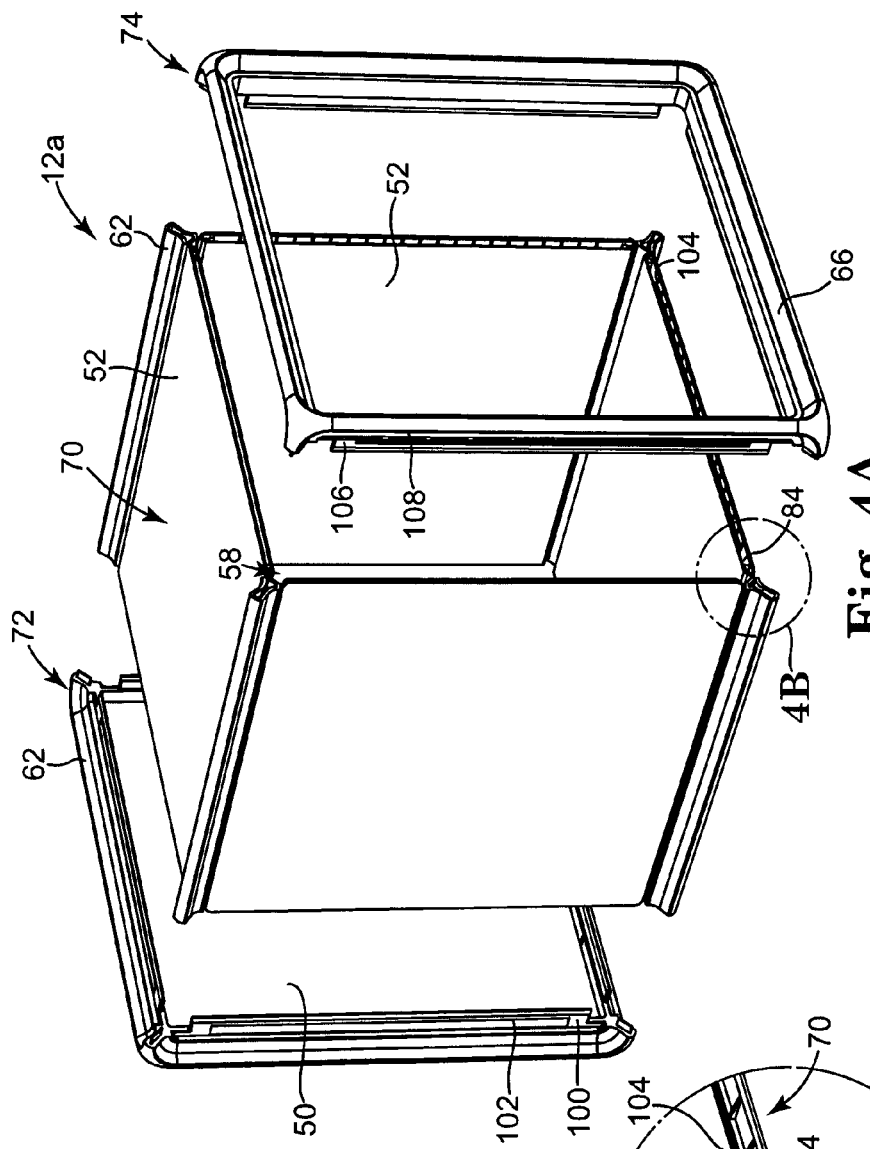
FIG. 4A illustrates an exploded perspective view of the shell of FIG. 2, according to one embodiment of the present invention.

As illustrated in FIGS. 4A and B, in one embodiment, a shell 12a is formed in parallelogram construction. In parallelogram construction, shell 12a is provided to a consumer in a plurality of pieces configured to be easily snapped, pressed, or otherwise coupled together generally without the use of tools or separate fasteners, such as rivets, screws, bolts, nails, pegs, glue, etc. More specifically, in one embodiment, shell 12a includes a main body 70, a rear member 72 and a front frame 74. Main body 70 includes side walls 52 and rails 62 extending from intersection edge 58 (generally indicated in FIG. 4A) formed by the intersection of two adjacent side walls 52. Rear member 72 includes rear wall 50 and rails 62 extending around a perimeter thereof. Front frame 74 includes front rails 66. In general, rear member 72 and front frame 74 are each configured to be snap fit, press fit, or otherwise coupled to main body 70 opposite one another.

Figure 4B:
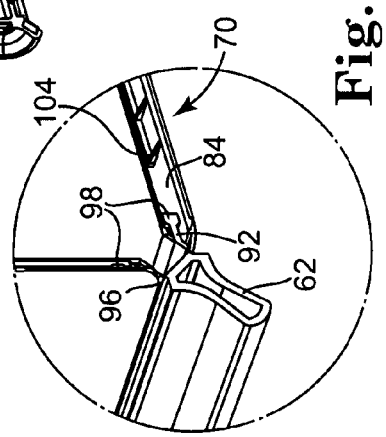
FIG. 4B illustrates a detailed view of a portion of the shell of FIG. 4A, according to one embodiment of the present invention.
Figure 5:
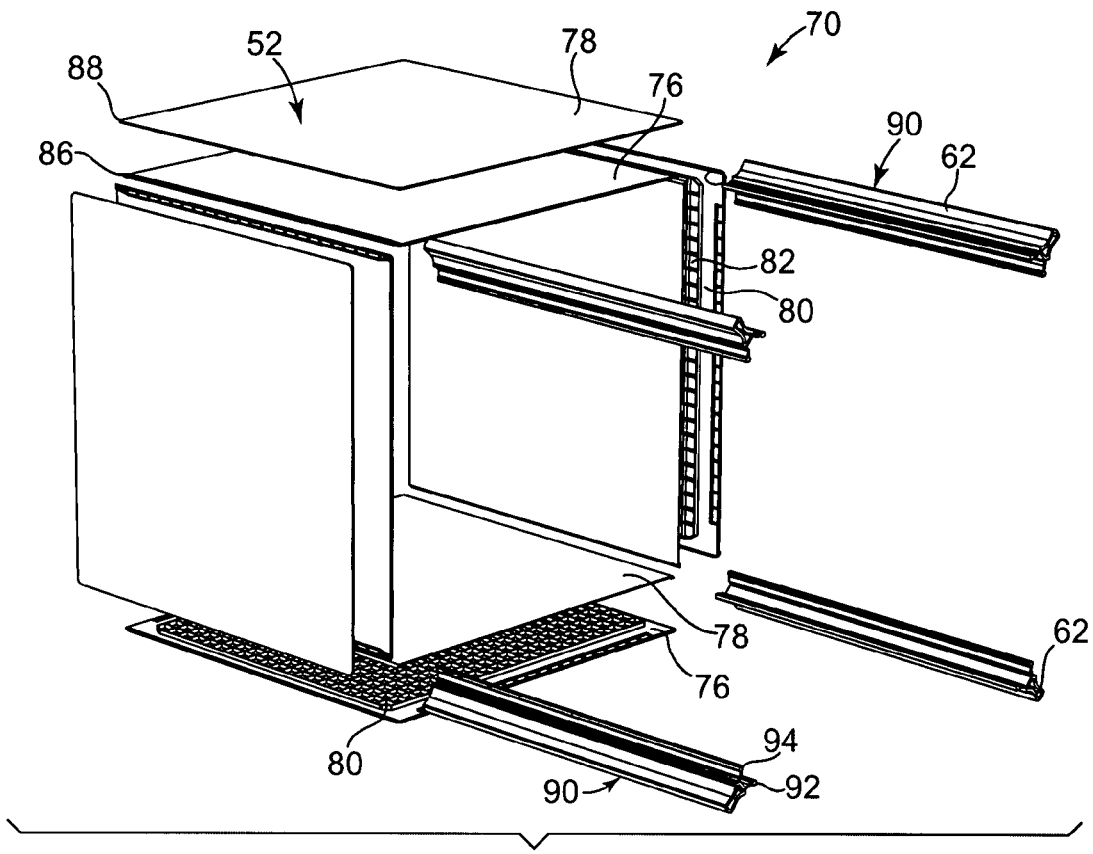
FIG. 5 illustrates an exploded, perspective view of a main body of the shell of FIG. 4A, according to one embodiment of the present invention.

Additionally referring to FIG. 5, in one embodiment, main body 70 is formed as a composite of members. In one example, each side wall 52 is formed of an internal panel 76 and an external panel 78. In one embodiment, at least one of panels 76 and 78, for example, external panel 78, includes a web structure 80 protruding from an inner surface thereof. Web structure 80 defines a plurality of voids 82 throughout. As such, web structure 80 is configured to add to the structural rigidity and integrity of main body 70 while decreasing the amount of material that would otherwise be required if side walls 52 were solid. Web structure 80 has a smaller outer dimension than panels 76 and 78. With this in mind, panels 76 and 78 are coupled to each other such that web structure 80 is interposed therebetween. As such, additionally referring to FIG. 4B, upon construction of a side wall 52, cavities 84 are formed about a perimeter of side wall 52 between panels 76 and 78. In one embodiment, respective edges 86 and 88 of panels 76 and 78 are tapered or angled toward each other near the perimeter of side wall 52 to partially close off each cavity 84.

In one example, main body 70 includes hinge members 90. Additionally, referring to the end view illustration of FIG. 6, each hinge member 90 includes a rail 62 and coupling extensions 92 and 94 each extending from rail 62. In one embodiment, rails 62 are substantially hollow while in other embodiments, rails 62 may be solid. Each coupling extension 92 and 94 extends along a substantial entirety of a length of rail 62 and is configured to couple with a side wall 52. In general, a flex line or boundary line 96 is formed between rail 62 and each extension 92 and 94. The material defining hinge member 90 is substantially thinner at and/or near boundary line 96 than at other portions of hinge member 90 such that extensions 92 and 94 are configured to bend or effectively rotate relative to rail 62.

Referring back to FIGS. 4A, 4B and 5, each hinge member 90 is coupled with two adjacent side walls 52. In one example, hinge member 90 additionally defines an elongated bead 98 on each coupling extension 92 and 94 opposite boundary line 96. Each elongated bead 98 is positioned and secured within a cavity 84 of an adjacent side wall 52. In one embodiment, elongated bead 98 is ultrasonically welded, adhered, or otherwise secured within cavity 84 of side wall 52.

Upon assembly of the four side walls 52 with the four hinge members 90, a tube-like structure is created. The flexibility of hinge members 90 at boundary lines 96 allows main body 70 to collapse or to be substantially flattened as generally shown in the schematic illustration of FIG. 7. The collapsed configuration of main body 70 facilitates flat packing, shipping and storage of shell 12a. In particular, rear member 72 and front frame 74 can be stacked on flattened main body 70 to form a substantially flat arrangement of the members of shell 12a for packaging, shipping and storage. Accordingly, the spaced needed for packaging, shipping, storing, etc. packaged shells 12 is greatly reduced.

As illustrated in FIG. 4A, rear member 72, as described above, includes rear wall 50 and four rails 62 extending about a perimeter thereof. In addition, in one embodiment, rear member 72 includes connection flanges 100 each extending from one of rails 62 away from rear wall 50. In one example, each connection flange 100 includes an indentation 102 extending along at least a portion of a length of connection flange 100. Each connection flange 100 is configured to fit between internal panel 76 and external panel 78, more particularly, within cavity 84 along the rear edges of side walls 52. In one example, one of panels 76 and 78, such as external panel 78, defines a boss or ramp-like feature 104 extending into cavity 84 near each of the front edge and the rear edge of main body 70. Boss 104 is sized to correspond with the size and position of indentation 102 such that boss 104 engages indentation 102 when flange 100 is inserted into cavity 84.

Rear member 72 is configured to interface with main body 70 such that connection flanges 100 are positioned within corresponding cavities 84, and bosses 104 are received by the corresponding indentations 102 of flanges 100. Accordingly, main body 70 and rear member 72 are connected to one another via a snap connection or press fit generally characterized by an absence of separate fastening agents such as screws, rivets, nails, staples, adhesive, etc.

Front frame 74 is formed similar to rear member 72 but without a solid face (such as rear wall 50) thereof. As such, front frame 74 defines connection flanges 100 extending from front rails 66 toward main body 70 where each connection flange 100 of front frame 74 includes an indentation 102 configured to receive a boss 104 defined near front edge of main body 70. Accordingly, front frame 74 is coupled via snap or press fit with front edge of main body 70 in a similar manner as rear member 72 is coupled with rear edge of main body 70. In one embodiment, main body 70, rear member 72 and frame 74 are each fully assembled as illustrated in FIG. 4A, but not to each other, during manufacturing prior to being provided to a consumer. As such, upon purchase, a consumer need only snap main body 70, rear member 72 and frame 74 together to construct shell 12a. Other suitable methods of coupling main body 70, rear member 72 and frame 74 together are also contemplated.

Handshake Construction

Figure 8:
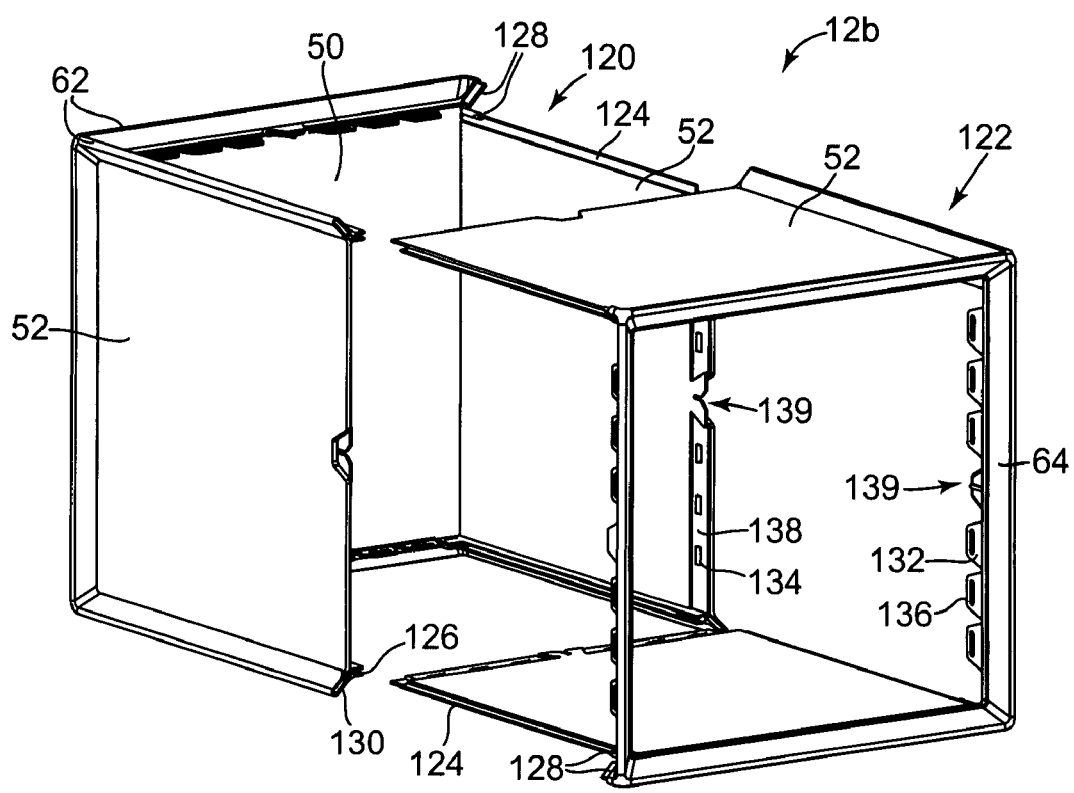
FIG. 8 illustrates a partially exploded, perspective view of the shell of FIG. 2, according to one embodiment of the present invention.

As illustrated in FIG. 8, in one embodiment, a shell 12b is formed in a handshake construction. Shell 12b includes a first shell member 120 and a second shell member 122. Each shell member 120 and 122 includes two opposing side walls 52. First shell member 120 also includes rear wall 50 and rails 62 extending therefrom. Second shell member 122 includes front rails 66 and, in on example, at least one of rails 62. First and second shell members 120 and 122 are configured to slidably interface with each other to assemble shell members 120 and 122 together with a snap or press fit or other suitable coupling. Although shown in FIG. 8 as generally "U"-shaped members, in one example, shell members 120 and 122 are each configured to fold about or near rails 62 and/or 66 to lay in a substantially flat configuration (not shown).

In one example, first and second shell members 120 and 122 are coupled to one another using a series of flanges 124, tracks 126, protrusions 128, receptacle cavities 130, tabs 132 and/or bosses 134. More specifically, each edge of side walls 52 that is not adjacent a rail 62 in the respective shell member 120 or 122 defines an elongated flange 124 extending along the exposed side edge of the corresponding side wall 52. Each side rail 62 extends from one of side walls 52 and defines an elongated track 126 extending substantially perpendicularly therefrom. Each track 126 defined by one of shell members 120 and 122 is configured to receive a corresponding flange 124 of the other shell member 120 or 122. Accordingly, upon assembly, shell members 120 and 122 are aligned such that all flanges 124 are aligned with one of tracks 126. Shell members 120 and 122 slide together such that flanges 124 travel within tracks 126 until each side wall 52 is positioned adjacent both a rail 62 adjacent rear wall 50 and a front rail 66.

In one example, shell members 120 and 122 additionally or alternatively define protrusions 128 at corners thereof configured to interact with receptacle cavities 130 of the opposite shell member 120 or 122 to further encourage proper alignment and coupling of shell members 120 and 122. In one embodiment, each shell member 120 and 122 additionally or alternatively includes a plurality of tabs 132 collectively extending between the opposing side walls 52 included therewith. Each tab 132 extends toward the other shell member 120 and 122 and defines an opening or indentation 136 therein. Further, each shell member 120 and 122 also defines a reception area 138 configured to receive tabs 132 of the other shell member 120 or 122. In particular, each reception area 138 includes a plurality of bosses 134 each configured to fit within opening or indentation 136 of the other shell member 120 or 122 upon coupling of the two shell members 120 and 122 with each other to effectively lock the two shell members 120 and 122 together with a snap fit connection. Other features such as features 139, etc. may additionally or alternatively be included on shell members 120 and 122 to facilitate coupling of shell members 120 and 122 together to form shell 12b. In one embodiment, all the coupling features of shell members 120 and 122 are configured such that the internal and external surfaces of shell 12b upon assembly are presented as substantially flat or planar surfaces.

Modular Construction

Figure 9:
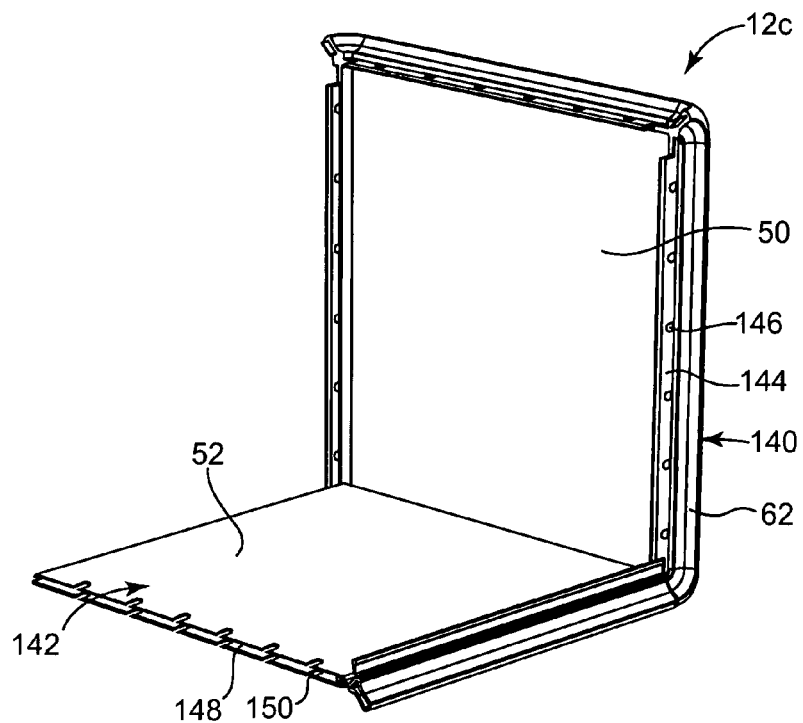
FIG. 9 illustrates a perspective view of a portion of the shell of FIG. 2, according to one embodiment of the present invention.

Referring to FIG. 9, in one embodiment, a shell 12c is formed of a rear member 140, four side members 142 (of which only one exemplary side member 142 is illustrated for clarity) and front rails 66 (FIG. 2). Base member 140 includes rear wall 50 and four rails 62 extending around the perimeter thereof. Each side member 142 includes one side wall 52 and one adjacent rail 62. Base member 140 is configured to be coupled via snap fit or other coupling to all four side members 142.

In one embodiment, base member 140 defines a flange 144 extending generally perpendicular to rear wall 50 and includes a plurality of bosses 146 extending substantially perpendicular to the remainder of flange 144 and linearly spaced from one another on flange 144. Each side member 142 includes a groove 148 configured to receive flange 144 along each of the two edges extending substantially perpendicular to the rail 62 included thereon. Each groove 148 includes a plurality of cutouts 150 linearly spaced along edges of groove 148 and configured to each receive a boss 146. As such, side member 142 is coupled to rear member 140 by a snap-fit connection in which a flange 144 is placed in a corresponding groove 148 and/or bosses 146 are placed in corresponding cutouts 150. The other side members 142 (not shown) are similarly coupled with rear member 140 and are also configured to couple with adjacent rails 62 defined by adjacent side members 142 (not shown) to define cavity 54 between members 140 and 142.

In one embodiment, front rails 66 (FIG. 2) are all coupled end-to-end to one another similar to front frame 74 (FIG. 4A) and are configured to be coupled with four side members 142 in a similar manner as described with respect to the coupling of side members 142 with rear member 140. In this configuration, shell 12c is formed of six separately formed pieces coupled together. In one embodiment, rails 62 and 66 may be provided entirely separate from each other and walls 50 and 52 such that rails 62 and 66 and walls 50 and 52 are all snap fit or otherwise coupled to one another by the consumer after purchase of shell 12c. Other configurations for relatively easy assembly of a modularly constructed shell 12 are also contemplated.

Figure 10:
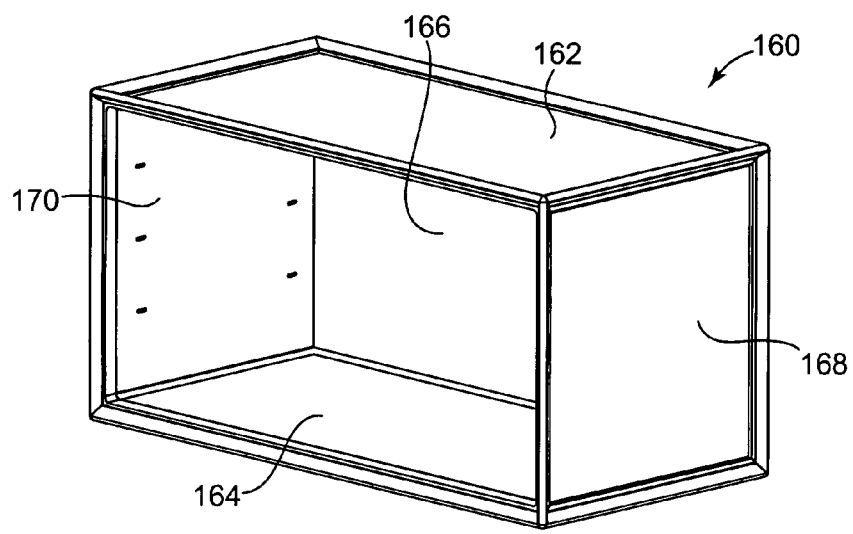
FIG. 10 illustrates a perspective view of a shell, according to one embodiment of the present invention.

Although each construction described above refers to shell 12, such as shell 12a, 12b, or 12c, being a cube with substantially square shaped walls 50 and 52, shell 12 can be any other suitable configuration such as a rectangular shaped shell 160 as illustrated in FIG. 10. Shell 160 includes elongated rectangular shaped top, bottom and rear walls 162, 164 and 166, respectively, and smaller side walls 168 and 170 extending therebetween opposite one another. In one embodiment, rectangular shaped shell 160 is configured to be easily configured or stacked with shells 12. Accordingly, in one example, shell 160 is at least twice as wide as shell 12 as will be further described below. Other configurations for shells are also contemplated and will be apparent to those of skill in the art upon reading this application.

Pillows

Referring to FIG. 1, in one embodiment, pillows or coupling members 14 are configured to selectively couple two or more shells 12 and/or 160 relative to one another and/or to otherwise add functional or aesthetic components to storage and organization system 10. In one embodiment, pillows 14 are available in different types including standard connection pillows 20, base pillows 22 and top pillows 24.

Connection Pillows

Figure 11:
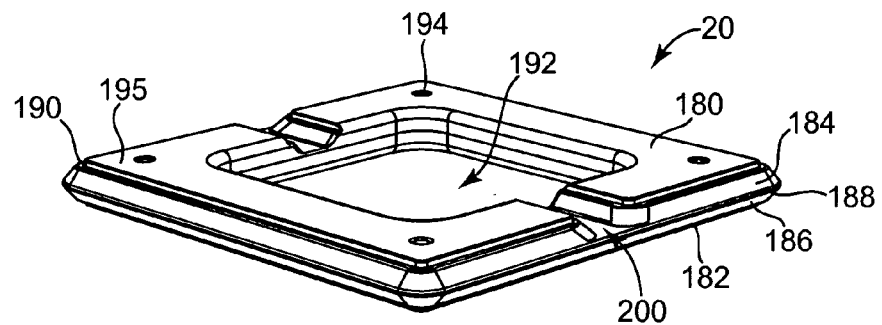
FIG. 11 illustrates a perspective view of a pillow of the storage and organization system of FIG. 1, according to one embodiment of the present invention.
Figure 12:
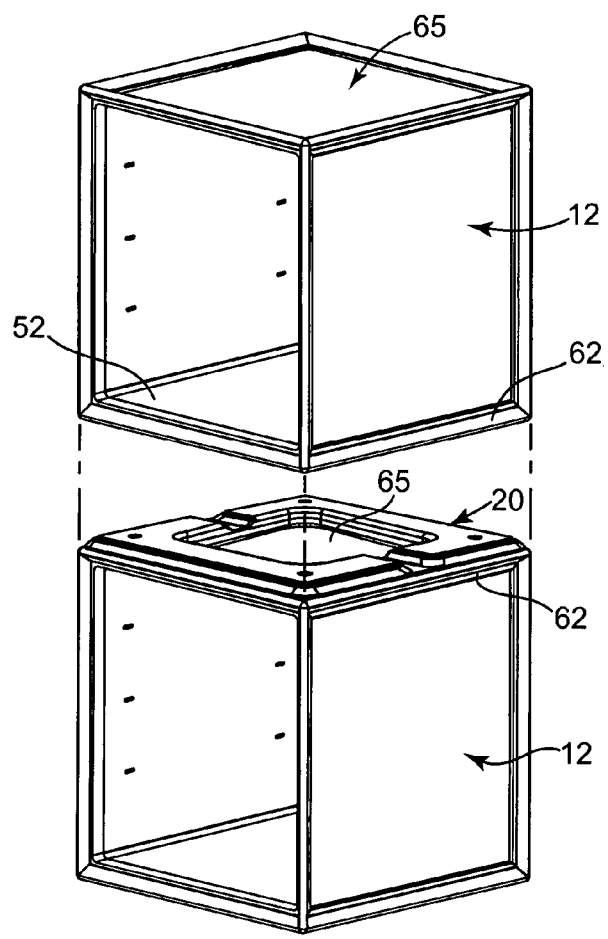
FIG. 12 illustrates a partially exploded perspective view of a storage and organization system configuration, according to one embodiment of the present invention.

Connection pillows 20 are configured for selectively coupling two or more shells 12 and/or 160 to one another. FIGS. 11 and 12 illustrate one embodiment of a connection pillow 20 configured for stacking two shells 12 in a vertical arrangement. Connection pillow 20 is sized and shaped to correspond to the size and shape of shell 12, more particularly, to recess 65 (FIG. 2) such that pillow 20 snuggly fits or nests at least partially within adjacent recesses 65 of stacked shells 12. In one example, connection pillow 20 is substantially rectangular or square depending on a shape of recess 65. In one embodiment, connection pillow 20 defines a first surface 180, a second surface 182 opposite first surface 180, a first tapered edge 184, a second tapered edge 186 and a perimeter edge 188.

First and second surfaces 180 and 182 are sized similarly to one another and, in one embodiment, are each substantially planar. First tapered edge 184 generally extends around and outwardly from first surface 180. More specifically, that first tapered edge 184 generally extends from first surface 180 with an angle dependent on and corresponding to angle θ of rails 62 and 66 (FIGS. 2 and 3A) as will become clear in the description below. Second tapered edge 186 generally extends around and outwardly from second surface 182 at least partially toward first surface 180 in a manner similar to how first tapered edge 184 extends from first surface 180. In one example, perimeter edge 188 extends between first and second tapered edges 184 and 186 opposite the respective surfaces 180 and 182. In one embodiment, perimeter edge 188 is oriented substantially perpendicular to first and second surfaces 182 and 184.

In one embodiment, rather than tapered edges 184 and 186 directly interfacing with surfaces 180 and 182, respectively, a setback feature 190 is defined around the perimeter of each surface 180 and 182. Setback feature 190 is sized, shaped and positioned to correspond with lip 67 and ledge 68 of shell 12 (FIGS. 2 and 3A-3D). In this manner, setback feature 190 has a height similar to the height of lip 67 and a width similar to a width of ledge 68.

In one example, connection pillow 20 includes a hole 192 extending through the center thereof. Hole 192 is provided to decrease the amount of material used to form connection pillow 20. In one embodiment, hole 192 does not substantially decrease the strength of a resulting storage and organization configuration such as configuration 18 (FIG. 1) since most of the stresses caused by assembly and loading of shells 12 are primarily concentrated near the perimeter portions of connection pillow 20 and/or corresponding shells 12 thereof that correspond with pillow portions outside of hole 192.

Connection pillow 20 may include any number of additional features to contribute to the versatility of connection pillow 20. In one example, connection pillow 20 includes a plurality of apertures 194 each positioned through a corner portion 195 of connection pillow 20. Each aperture 194 is configured to receive a connection pin or post of an accessory such a support leg 196 (FIG. 15) or a caster 198 (FIG. 1) as will further be described below.

In one embodiment, connection pillow 20 also includes a slot 200 extending across a depth or width thereof and, therefore, across hole 192. Slot 200 is configured to receive a rail 62 of each of two adjacent shells (not shown) that are equal to or less than half a width of shell 12. As such, connection pillow 20 is configured to stack two similarly sized shells 12 as shown in FIG. 12. In one embodiment, where a slot 200 is defined through each of surfaces 180 and 182, pillow 20 may be used to stack two adjacent smaller sized shells on top of two other adjacent smaller sized shells or on one shell 12 such as shells 270 in FIG. 22.

As illustrated in FIG. 12, connection pillow 20 is configured to be placed relative to shells 12 such that first surface and second surfaces 180 and 182 each interface with a side wall 52 of an adjacent shell 12. More specifically, connection pillow 20 is at least partially received by two recesses 65 corresponding to the two stacked shells 12 facing one another. More specifically, additionally referring to FIG. 11 in view of FIGS. 2 and 3A-3D, connection pillow 20 is positioned such that first surface 180 interfaces with a side wall 52, setback feature 190 interfaces with lip 67 and ledge 68 around side wall 52, and that first tapered edge 184 generally interfaces with of rails 62 extending around side wall 52 to snuggly position pillow 20 with recess 65 of an adjacent shell 12. The opposing side (i.e. the side associated with second surface 182) of connection pillow 20 similarly interfaces with the other one of the two shells 12.

Since connection pillow 20 is sized and shaped to be snuggly positioned within each recess 65, connection pillow 20 selectively couples the stacked shells 12 to one another. In one embodiment, perimeter edge 188 is sized to regulate spacing of shells 12. In general, the taller perimeter edge 188 the further two adjacent shells 12 will be spaced from one another upon stacking or other coupling. Coupling of shells 12 with connection pillow 20 is beneficial since, in general, no external fastening agents, such as screws, nails, rivets, stapes, adhesives, etc. need be used. Therefore, a consumer can easily decoupled and/or to otherwise reconfigure shells 12 in a manner allowing shells 12 and connection pillow 20 to be reused.

In one embodiment, connection pillow 20, or other pillow 14, includes additional components, such as hooks 202 (FIG.

23), extending from perimeter edge 188. More specifically, hooks 202 are positioned such that when connection pillow 20 is interposed between two stacked shells 12, hooks 202 extend outwardly from connection pillow 20 between the two stacked shells 12. As such, connection pillow 20 may add functionality to the storage and organization system 10 in addition to coupling shells 12 to one another.

Figure 13:
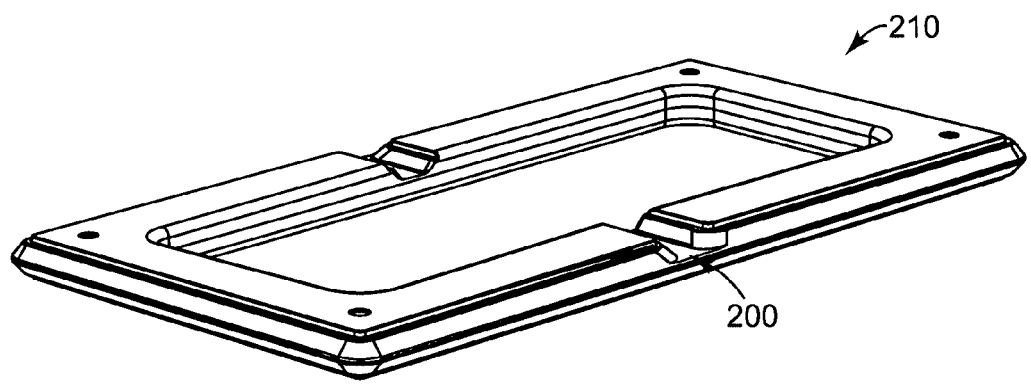
FIG. 13 illustrates a perspective view of a pillow of the storage and organization system of FIG. 1, according to one embodiment of the present invention.
Figure 14:
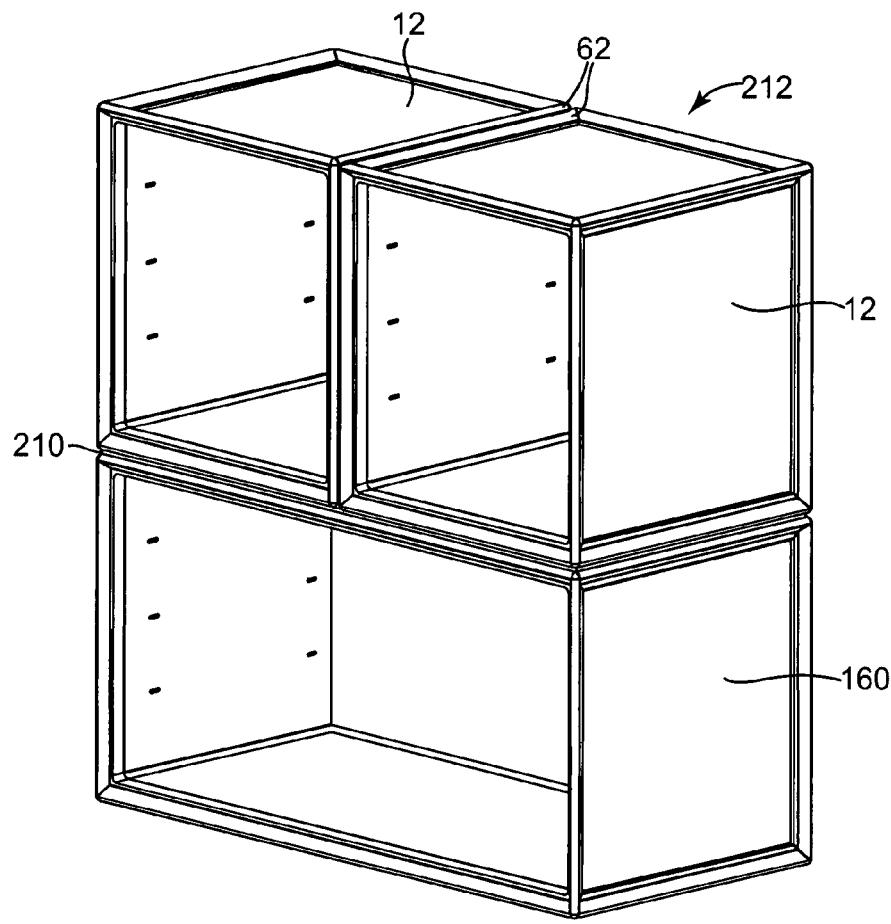
FIG. 14 illustrates a perspective view of a storage and organization system configuration, according to one embodiment of the present invention.

FIG. 13 illustrates one embodiment of a connection pillow at 210, similar to connection pillow 20. However, connection pillow 210 is elongated rather than square in shape and sized to rather tightly interface with shell 160 of FIG. 10 rather than shell 12 of FIG. 2. FIG. 14 illustrates a configuration 212 of one shell 160 and two shells 12 coupled by connection pillow 210. In configuration 212, two rails 62 of the two shells 12 each are maintained within slot 200 of connection pillow 210 and serve not only to selectively couple shells 12 to one another and shell 160, but also to space side-by-side shells 12 from one another in a lateral direction. In another configuration, side-by-side shells 12 may be replaced with a second shell 160.

Base Pillows

Figure 15:
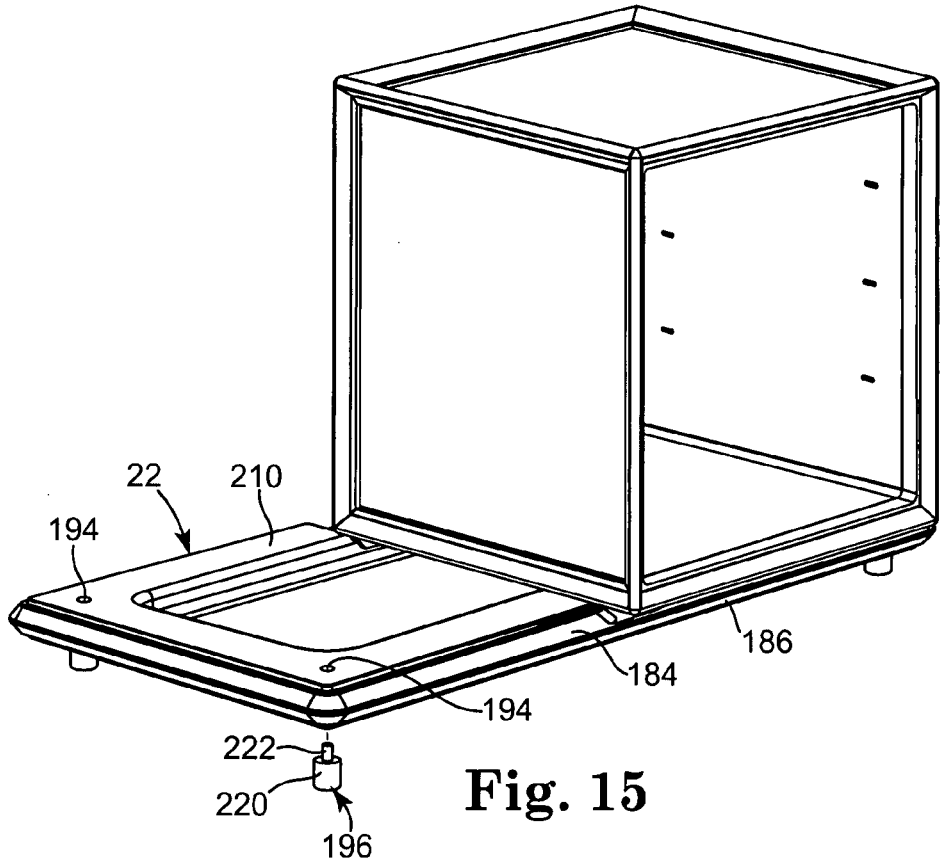
FIG. 15 illustrates a perspective view of a shell and a base pillow, according to one embodiment of the present invention.

Referring to FIGS. 1 and 15, in general, base pillows 22 are any pillows 14 configured to be used as a base, support, stand, or similar component of a storage and organization configuration. As such, base pillows 22 are configured to provide additional functionality or at least provide for clearance or additional aesthetic appeal of any configuration utilizing one or more base pillows 22. In one embodiment, additional components such as legs 196 and/or casters 198 can be added to connection pillow 20 (FIG. 11) or connection pillow 210 to convert such connection pillows 20 and 210 into a base pillow 22. For example, as illustrated in FIG. 15, legs 196 each include a main portion 220 and a pin or peg 222 extending upwardly therefrom. Main portion 220 may be any suitable size and shape, and pin 222 is sized to be received within an aperture 194 of pillow 210 to couple pillow 210 with leg 196. As generally shown in FIG. 1, casters 198 may include a similar pin (not shown) and may be similarly attached to any base pillow 22. In this manner, legs 196 or casters 198 are one example of means for elevating corresponding components from a support surface (not shown) such as a floor. Following coupling of legs 196 or casters 198 to base pillow 22, shells 12 or other shells may be stacked thereon as shown in FIG. 15.

In other embodiments, base pillows 22 may be specifically manufactured to serve as base pillows 22 rather than as connection pillows 20 and 210. In such embodiments, legs 196 or casters 198 may be permanently coupled with base pillow 22. In one such embodiment, base pillow 22 only includes a tapered edge 184 on a top side thereof and second tapered edge 186 may be eliminated. Other changes to pillows to act solely as base pillows 22 rather than connection pillows 20 will be apparent to those of skill in the art upon reading this application.

Top Pillows

Figure 16:
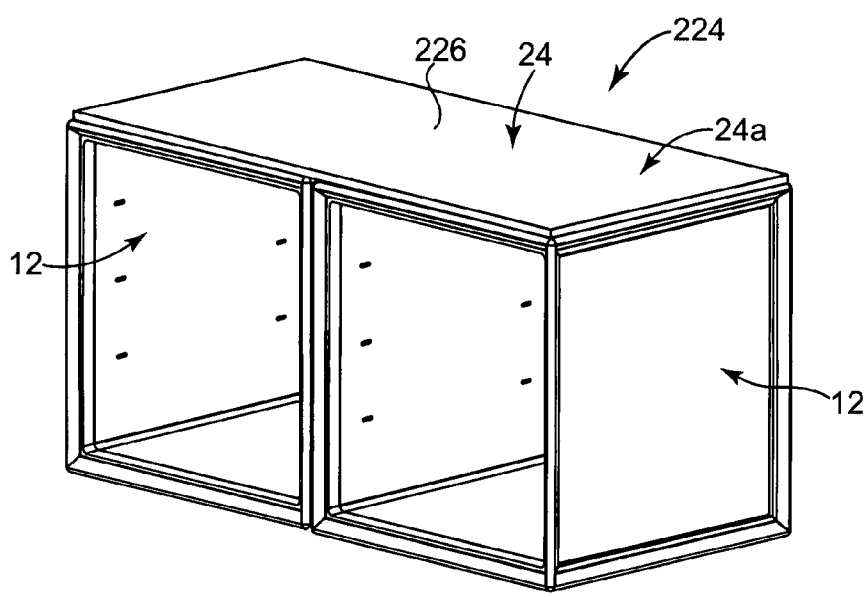
FIG. 16 illustrates a perspective view of two shells and a top pillow, according to one embodiment of the present invention.

Top pillows 24 (FIG. 1 and FIG. 16) are configured to be received by the top shells 12, 160 and/or 270 in a given storage and organization configuration such as configuration 224 illustrated in FIG. 16. Top pillows 24 similar to connection pillows 20 are configured to be received within the top recesses 65 (FIG. 2) of shells 12 and/or 160. More specifically, top pillows 24 may include second tapered edge 186, etc. to facilitate stacking of top pillow 24 on and with recess 65 of shells 12, 160 and/or 1270. However, the top portion of each top pillow 24 provides a functional component that is accessible for general interaction with a consumer rather than first tapered edge 184 of connection pillow 20. For instance, top pillow 24a illustrated in FIG. 16 provides a substantially flat work surface 226. Top pillows 24 may include any variety of functional components to facilitate a consumer in personalizing any storage and organizational configuration for particular purposes. For instance, a top pillow 24 may include pegs 228 of a mail organizer 229 as illustrated in FIG. 1, vases, containers, trays, racks (such as compact disc racks or ridges for receiving compact discs), etc.

Other Connection Devices

Referring to FIG. 1, in one embodiment, it is generally desired to space side-by-side shells 12 a similar distance apart as vertically stacked shells 12 are spaced to maintain clean and uniform appearance. For example, rail-to-rail connection clips 230 (FIGS. 17 and 18), pillow-to pillow connector 232 (FIG. 19), clamps 234 (FIG. 20), zip connectors 236 (FIG. 21), or other additional connection devices may be provided.

Rail-to-Rail Connection Clip

Figure 17:
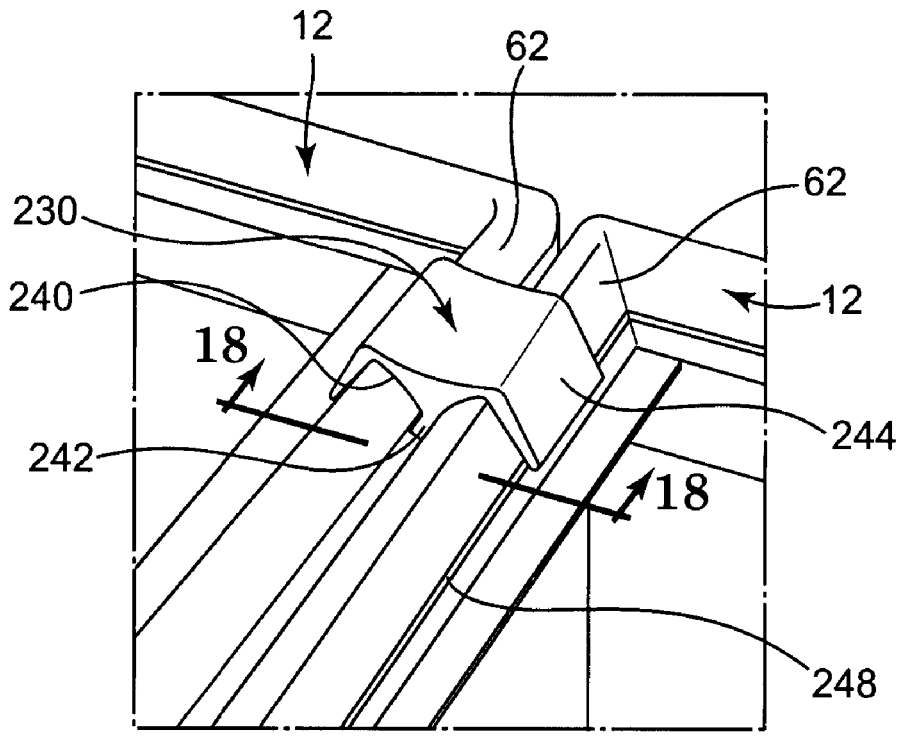
FIG. 17 illustrates a perspective view of adjacent shells and a rail-to-rail connection clip, according to one embodiment of the present invention.
Figure 18:
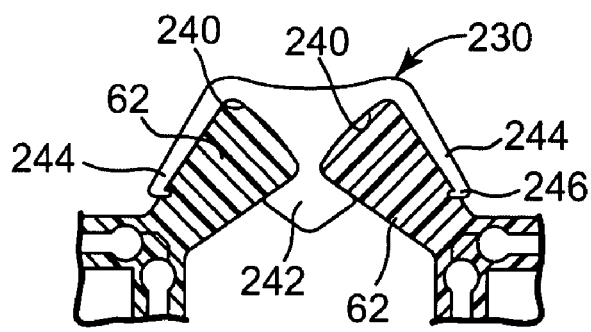
FIG. 18 illustrates a cross-sectional view taken along line 18-18 of FIG. 17, according to one embodiment of the present invention.

FIGS. 17 and 18 illustrate one embodiment of rail-to-rail connection clip 230. Rail-to-rail connection clip 230 is configured to receive two adjacent rails 62 of side-by-side shells 12. Rail-to-rail connection clip 230 is an at least partially elastomeric member defining two cavities 240 each configured to receive a rail 62 of adjacent shells 12. A center portion 242 of rail-to-rail connection clip 230 extends between rails 62 and is configured to at least partially maintain the lateral spacing of shells 12 from each other. In one embodiment, the two cavities 240 are symmetrically positioned on either side of center portion 242.

Outer portions 244 of rail-to-rail connection clip 230 extend over each rail 62 opposite center portion 242. Since rails 62 are at least partially surrounded by rail-to-rail connection clip 230, rail-to-rail connection clip 230 not only serves to laterally position shells 12 relative to one another but also stabilizes shells 12 from rotating relative to one another due to various loads that may be applied thereto during use. To further facilitate stabilization of shells 12 and coupling of rail-to-rail connection clip 230 to shells 12, in one embodiment, rail-to-rail connection clip 230 additionally includes a longitudinal rib 246 inwardly extending from outer portion 244 to interface with one of rails 62. In one example, rail 62 includes a corresponding longitudinal groove 248 configured to receive rib 246. Although illustrated as having a rib 246 on only one of outer portions 244, in one embodiment, a rib 244 is included on each of outer portions 244, and each rib 246 extends inwardly therefrom to interface with one of two adjacent rails 62.

Rail-to-rail connection clip 230 may be formed of any suitable material. In one embodiment, rail-to-rail connection clip 230 is formed of an elastomeric material to allow rail-to-rail connection clip 230 to be selectively coupled to and uncoupled from adjacent rails 62 thereby further contributing to the ability of storage and organization system 10 (FIG. 1) to evolve or be reconfigured due to a change of use or of consumer needs.

Pillow-to-Pillow Connector

Figure 19:
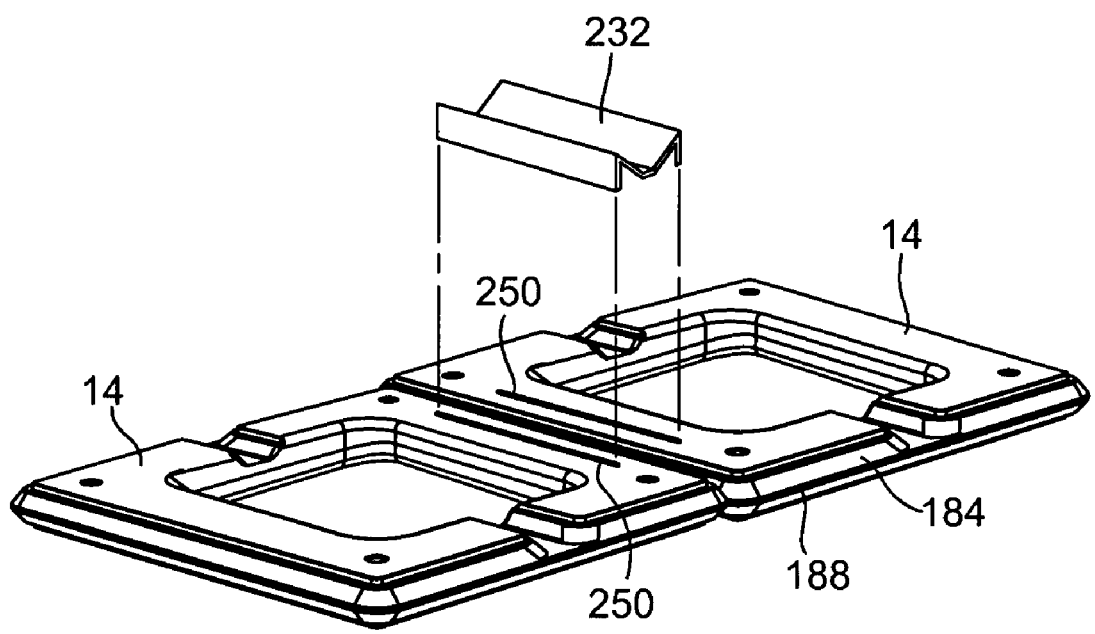
FIG. 19 illustrates a partially exploded, perspective view of adjacent pillows and a pillow-to-pillow connection clip, according to one embodiment of the present invention.

As illustrated in FIG. 19, in one embodiment, a pillow-to-pillow connector 232 is included in storage and organization system 10 (FIG. 1) to tie two side-by-side adjacent pillows 14 together. To facilitate use of pillow-to pillow connector 232, each pillow 14 includes a hole or slot 250 therethrough relatively near each perimeter edge 188 (FIG. 11). Pillow-to pillow connector 232 is generally "M"-shaped. The outer legs are configured to fit into two adjacent holes 250 of pillows 14, and the inner legs are configured to interface with tapered edges 184 and perhaps even perimeter edge 188 portions of pillows 14 positioned adjacent to each other. In this manner, pillow-to pillow connector 232 is configured to facilitate maintenance of lateral pillow-to-pillow spacing and to generally decrease rotation of pillows 14 relative to one another. Other pillow-to pillow connectors are also contemplated.

Clamp Connector

Figure 20:
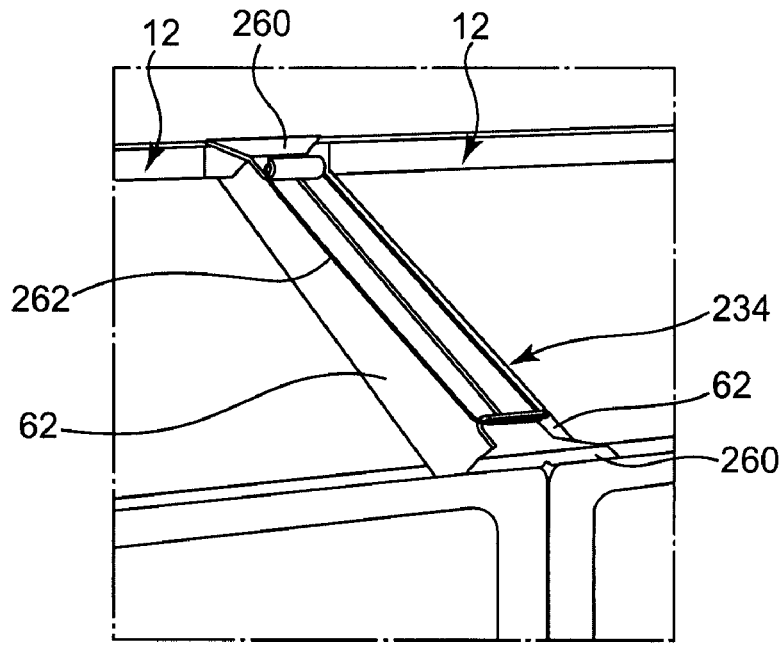
FIG. 20 illustrates a partial perspective view of adjacent shells and a connection clamp, according to one embodiment of the present invention.

FIG. 20 illustrates one embodiment of a clamp connector 234 coupled with rails 62 of two adjacent shells 12. In general, clamp connector 234 includes two hooks 260, which are each configured to engage side-by-side shells 12, and a resilient, elastomeric band 262 or other tension applying member. In one embodiment, hooks 260 are generally V-shaped. Each hook 260 is placed and suitably secured at an edge interface between two adjacent shells 12. Elastomeric band 262 is placed within each hook 260 and extends therebetween along opposing sides of two adjacent rails 62 of adjacent shells 12. In this manner, elastomeric band 262 holds rails 62 relatively tight to one another in the side-by-side configuration. Use of other suitable tension-based connectors is also contemplated.

Zip Connector

Figure 21:
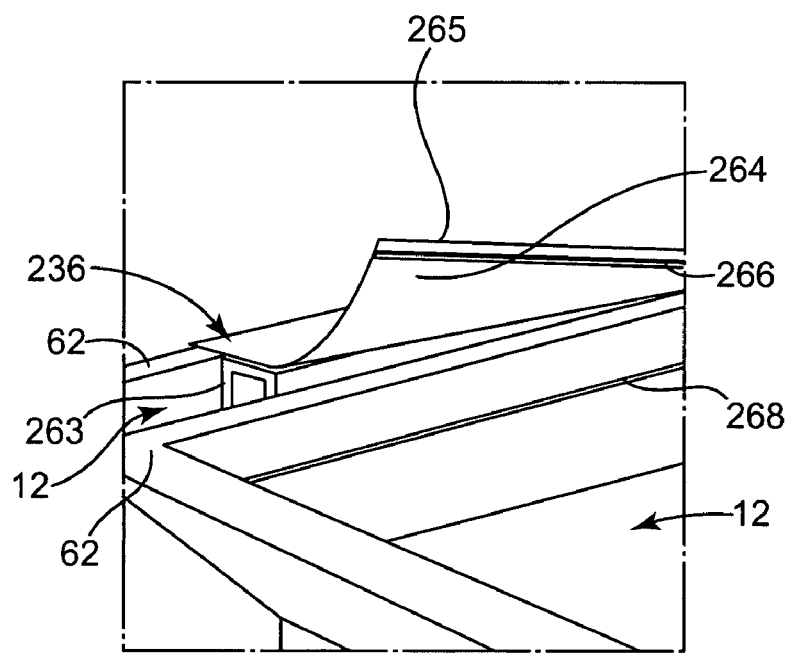
FIG. 21 illustrates a partial perspective view of adjacent shells and a zip connection, according to one embodiment of the present invention.

FIG. 21 illustrates one embodiment of zip connector 236 configured to interface with side-by-side shells 12. Zip connector 236 includes a spacer 263 and a connection strip 264. Spacer 263 is an elongated block or any other suitable spacer configured to be placed between rails 62 of adjacent shells 12 to maintain the lateral spacing thereof. Connection strip 264 extends across a top portion of spacer 263 such that spacer 263 and connection strip 264 collectively define a "T"-shaped configuration. In one embodiment, connection strip 264 is coupled with a top surface of spacer 263.

Connection strip 264 has a width configured to allow connection strip 264 to interface with an inner surface of adjacent rails of separate shells 12. In particular, connection strip 264 defines an elongated rib 266 near outer edges 265 of connection strip 264. In one embodiment, rib 266 is formed with a substantially wedge shaped cross-section; however, rib 266 may be formed in any suitable configuration. Each corresponding rail 62 defines an elongated groove 268 configured to engage with rib 266 of connection strip 264. As such, connection strip 264 is initially positioned at least partially over rail 62 in a manner aligning rib 266 with groove 268.

Subsequently, pressure is applied to connection strip 264 over rib 266 forcing rib 266 into groove 268 in a "zip" manner similar to the sealing of a recloseable sandwich bag. A similar process is performed with respect to rail 62 of the adjacent shell 12. As such, upon coupling connection strip 264 with each rail 62, adjacent shells 12 including rails 62 are coupled to one another with a spacing dictated by a size of spacer 263. In one embodiment, zip connector 236 is configured to be uncoupled from rails 62 by pulling connection strip 264 away from rails 62 to disengage rib 266 from within groove 268. Connection devices other than rail-to-rail connection clips 230 (FIGS. 17 and 18), pillow-to pillow connector 232 (FIG. 19), clamp connectors 234 (FIG. 20), zip connectors 236 (FIG. 21) are also contemplated for use to supplement shell 12 coupling with pillows 14.

Figure 22:
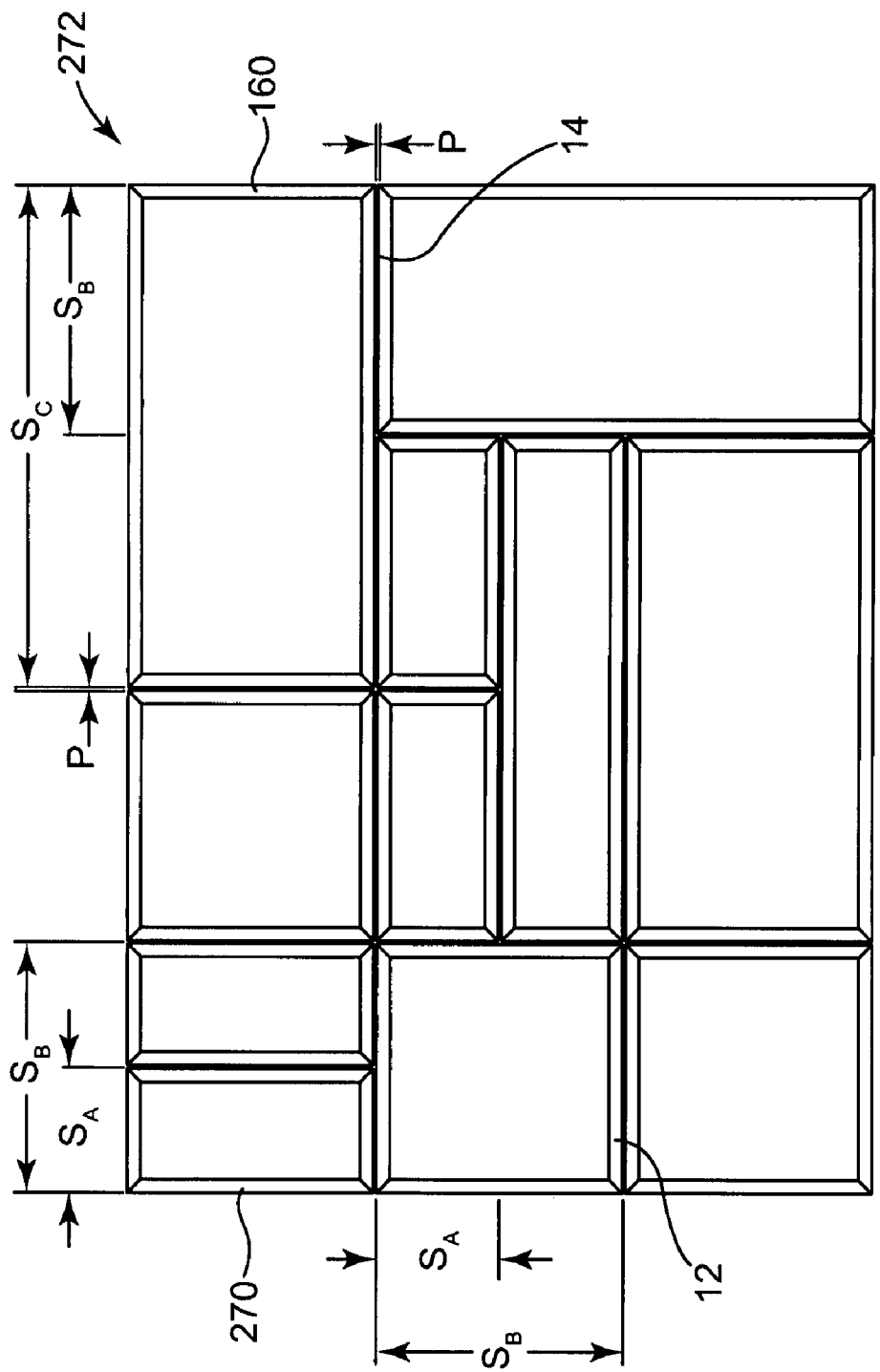
FIG. 22 illustrates a front view of a storage and organization system configuration, according to one embodiment of the present invention.

In one embodiment, no matter what pillow 14 and/or connection device is used, multiple sized rectangular shells 12, 160 and 270 may be used together to define a storage and organization configuration, for example, configuration 272 illustrated in FIG. 22. In general, it is desirable that the vertical spacing of shells 12, 160 and 270 is similar to the lateral spacing of shells 12, 160 and 270. Therefore, where a portion of perimeter edge 188 (FIG. 1) of pillows 14 that is revealed between two adjacent shells 12, 160 and/or 270 has a height of P, then shells 12, 160 and 270 are configured to be positioned to have a lateral spacing between them a distance equal to the height P such that all shells 12, 160 and/or 270 whether stacked or positioned next to one another are consistently spaced from each other.

Keeping the above spacing objectives in mind, the plurality of shell sizes are provided to complement one another. For instance, shells 270 have a width of $S_A$, shells 12 have a width of $S_B$, and shells 160 have a width of $S_C$ where width $S_A$ is less than width $S_B$ and width $S_B$ is less than width $S_C$. More specifically, width $S_B$ of shell 12 is less than half width $S_C$ of shell 160. As such, two shells 12 can be stacked on, under, or beside one of shells 160. In particular, the size of shells 12 relative to shells 160 is at least partially dependent on the size of pillows 14 used to couple shells 12, 160 and 270 to one another. For example, in one embodiment where the reveal of pillow 14 between adjacent/stacked shells 12, 160 and 270 has a height of P, then $$S_B = (S_C - P)/2$$

In this manner, the overall width of two shells 12 and any spacing or pillow 14 therebetween is equal to the width of shell 160. As such, a neat overall perimeter appearance of storage and organization configuration 272 is achieved. Notably, the same reasoning holds true for shells 12 and 270. Specifically, similar reasoning provides that $$S_A = (S_B - P)/2$$

as will be apparent to those of skill in the art upon reading this application.

The coordinating sizes and shapes of shells 12, 160 and 270 and the selective coupling of shells 12, 160, 270 allow for easy reconfiguration of shells as desired by the consumer. For example, referring to FIGS. 1 and 23, in one example, shells 12 of FIG. 1 can be removed from configuration 18 and added to a new configuration 278 illustrated in FIG. 23. For example, the lower right hand shell 12 of configuration 18 can be removed therefrom and placed on a new base pillow 22 in configuration 278 and so on and so forth. Similar accessories 16 such as hanger 38 may also be moved from configuration 18 to configuration 278. New accessories such as new insert 282 may be incorporated while other accessories such as insert 30 may not be incorporated in configuration 278. Other mixing of shells 12, pillows 14 and accessories 16 will be apparent to one of skill in the art upon reading the present application.

Accessories

Whether or not various sized shells 12, 160 and 270 are used, various accessories 16 are provided for use in storage and organization configurations. For example, as shown in the storage and organization configurations of FIGS. 1 and 23 accessories 16 may include inserts 30, doors 32, bins 34, drawers 36, hangers 38, trays 40 (FIG. 34). While the accessories 16 are described below primarily with respect to shells 12, it should be understood that similar accessories are also contemplated for shells of all sizes, such as shells 160 and 270.

Inserts

Referring to FIG. 1, inserts 30 are configured to be placed within shells 12 to divide shell 12 into multiple compartments 280 or to otherwise configure the shell 12 for a particular storage or other functional purpose. Insert 30 illustrated in FIG. 1 is a substantially planar shelf, however, other inserts are also contemplated, for example, insert 282 of FIG. 23 divides shell 12 into four compartments 280. In one embodiment, insert 282 is configured to form compartments 280 sized for a particular purpose, such as to store compact discs, to store shoes, to receive a box of a certain size, to receive wine or other bottles, etc.

Figure 24:
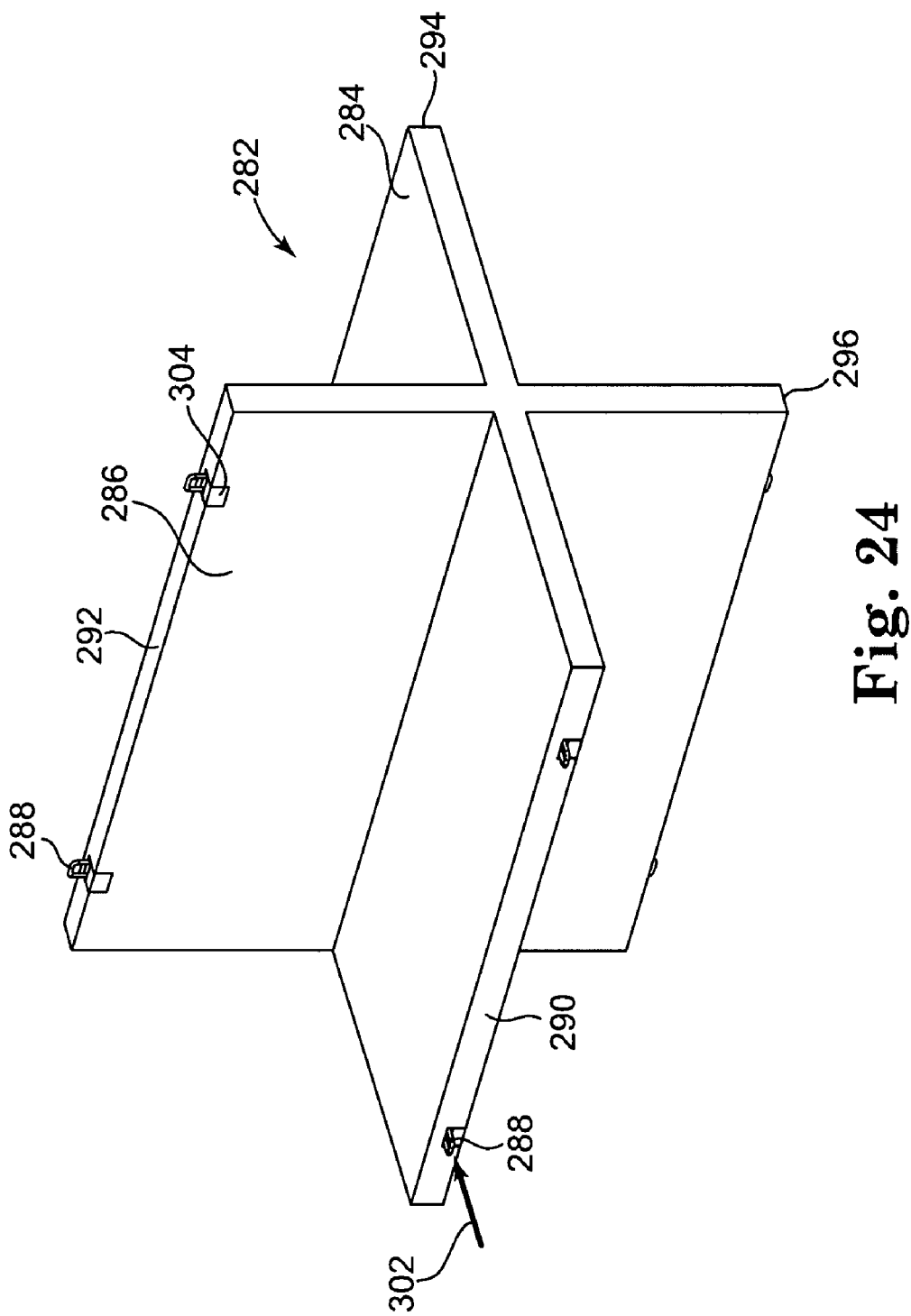
FIG. 24 illustrates a perspective view of a shell insert, according to one embodiment of the present invention.

FIG. 24 illustrates one embodiment of insert 282. Insert 282 includes a horizontal divider 284 and a vertical divider 286 extending through a center portion of horizontal divider 284 to form a general "X" or "T" shape. In one embodiment, horizontal divider 284 has a perpendicular orientation relative to vertical divider 286. In one example, insert 282 includes connection clips or protrusions 288 configured to interact with shell 12 to at least partially maintain insert 282 in place relative to shell 12. Clips 288 extend outwardly from one or more of exposed edges 290, 292, 294 and 296 of insert 282. In one embodiment, clips 288 are configured to be received by grooves or notches 298 formed in internal surfaces 300 of shell 12 as generally indicated in FIG. 2, thereby coupling insert 288 to shell 12. In one example, clips 288 are spring loaded such that clips 288 retract when inward pressure, as generally indicated by arrow 302 of FIG. 24, is applied to clip 288, such as a clip extending from edge 290. Clip 288 extends back out from edge 290 when the pressure 302 is removed. In one embodiment, a portion 304 of clip 288 is accessible via a side surface of the respective divider 284 or 286 such that a consumer can interact with portion 304 of clip 288 to manually trigger clip retraction and extension. The retractable nature of clips 288 facilitates positioning of the associated insert 288 within shell 12. Use of suitable inserts other than inserts 30 and 288 is also contemplated.

Doors

In one embodiment, doors such as clip-on door 32 (FIGS. 1 and 25A), hinge door 310 (FIG. 26), overhead storage door 312 (FIGS. 27A and 27B), pull-out door 314 (FIG. 29), etc. may be included in storage and organization system 10 (FIG. 1) to cover shell openings 56 (FIG. 25A) to conceal the associated storage chamber 54 and any item(s) stored therein. Doors can be coupled to shell 12 in any number of configurations. In one embodiment, doors are provided to consumers for purchase separate from shells 12. In one example, shells 12 are configured to receive doors if desired by the consumer such that a door can generally be added to any shell 12.

Clip-On Door

Figure 25A:
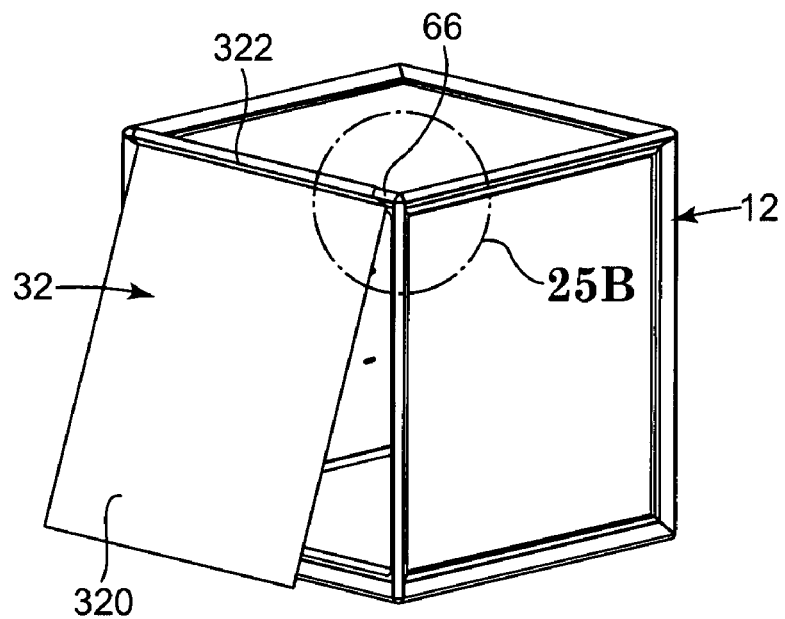
FIG. 25A illustrates a perspective view of a shell with a clip-on door, according to one embodiment of the present invention.
Figure 25B:
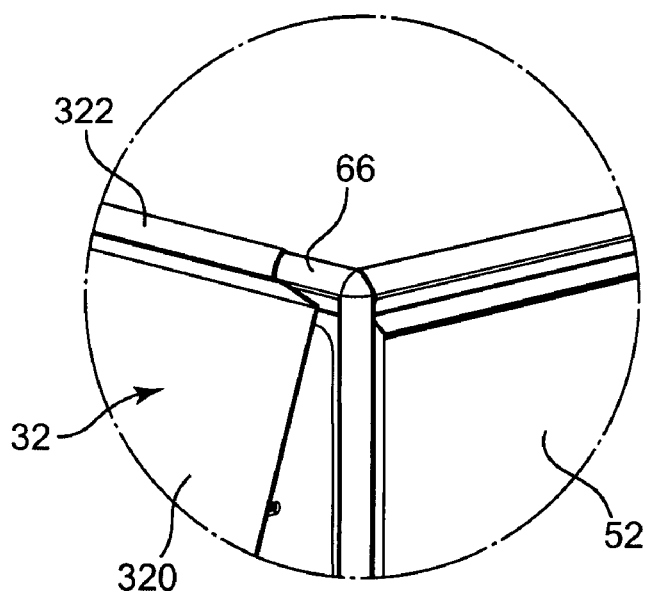
FIG. 25B illustrates a detailed view of a portion of the shell and clip-on door of FIG. 25A, according to one embodiment of the present invention.

FIGS. 25A and 25B illustrate one embodiment of clip-on door 32. Clip-on door 32 is configured to be coupled with shell 12 via one front rail 66 of shell 12 and is configured to rotate about the one front rail 66 to open and close opening 56 of shell 12. Clip-on door 32 includes a substantially planar panel 320 and a hook or connection member 322. Panel 320 is rectangular, for example, is square, and is configured to substantially cover opening 56 of shell 12. Hook 322 extends from a linear edge 324 of panel 320. Hook 322 is generally "U"-shaped and specifically configured to fit over front rail 66 of shell 12 in a manner allowing rotation of clip-on door 32 about front rail 66. For instance, hook 322 may be sized slightly larger than front rail 66 to allow movement of clip-on door 32 relative to front rail 66. In one embodiment, hook 322 is configured to deform slightly to permit rotation of clip-on door 32 about front rail 66. Other configurations of clip-on door 32 configured to interact with and rotate about front rail 66 are also contemplated.

Hinge Door

Figure 26:
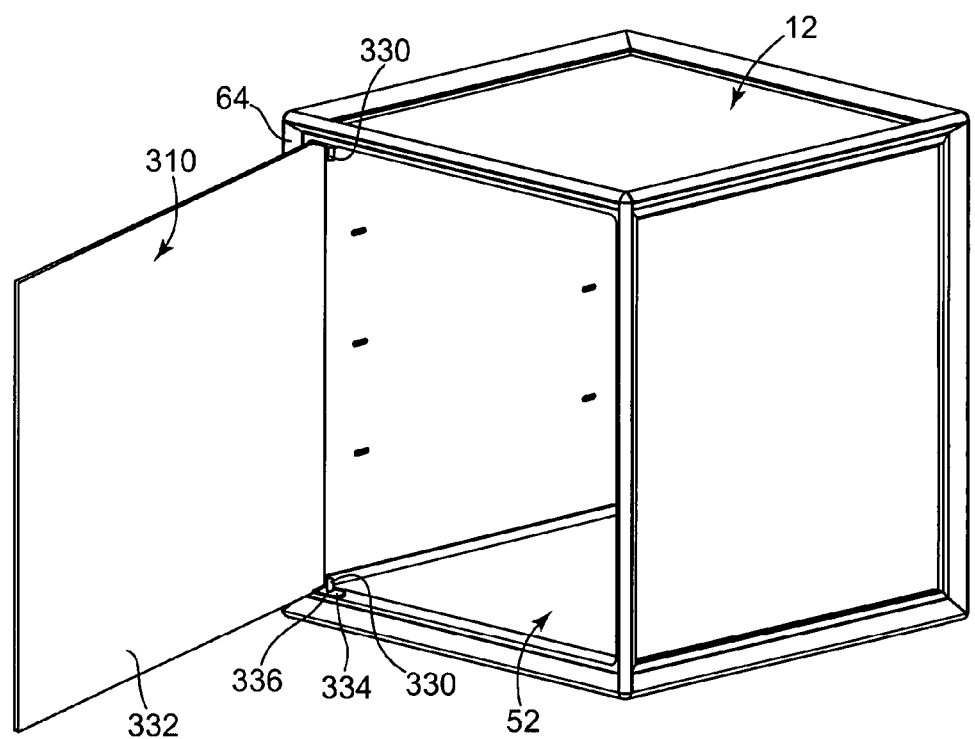
FIG. 26 illustrates a perspective view of a shell with a hinged door, according to one embodiment of the present invention.

FIG. 26 illustrates shell 12 with hinge door 310 rotatably coupled thereto. In particular, shell 12 additionally defines pegs 330. Each peg 330 extends inwardly from a front rail 66 or a portion of shell 12 adjacent thereto toward an opposite front rail 66. Pegs 330 may be formed integral with shell 12 or, in one embodiment, shell 12 includes a cavity configured to receive a separately formed peg 330 configured to be added to shell 12 with hinge door 310.

Hinge door 310 generally defines a main panel 332 and two flanges 334. Main panel is sized to substantially cover opening 56 of shell 12. Each flange 334 extends generally perpendicular to main panel 332 from opposite edges of main panel 332. Each flange 334 defines an aperture 336 extending therethrough and sized to receive one of pegs 330.

In one embodiment, flanges 334 each have sufficient flexibility to allow manipulation of flanges 334 while flanges 334 are being positioned to each receive a different peg 330 through the corresponding aperture 340 thereof. Once pegs 330 are seated through apertures 340 of flanges 334, hinge door 310 is configured to rotate about an axis axially defined through the pegs 330. Other methods of attaching a rotating door to shell 12 such as with an actual hinge mechanism, etc. are also contemplated.

Overhead Storage Door

Figure 27A:
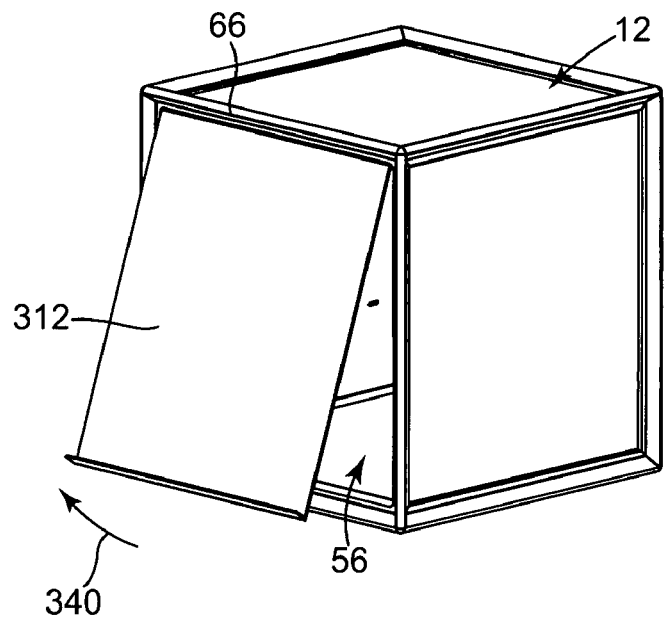
FIG. 27A illustrates a perspective view of a shell with a partially open overhead storage door, according to one embodiment of the present invention.
Figure 27B:
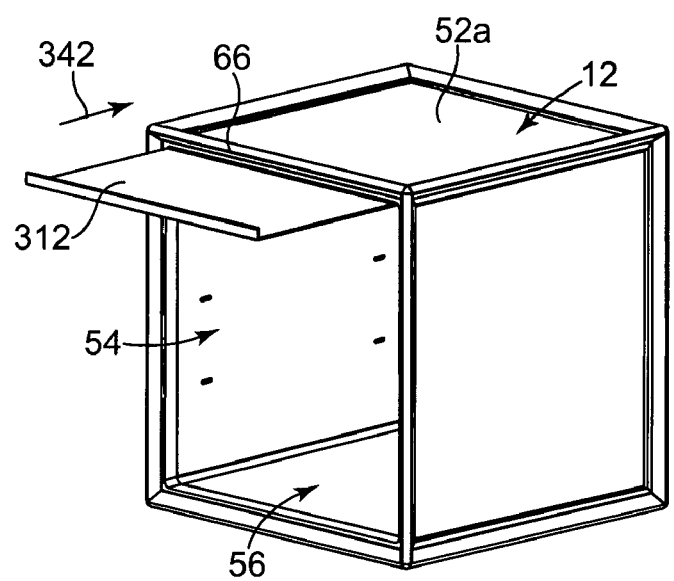
FIG. 27B illustrates a perspective view of the shell of FIG. 27A with the overhead storage door in a stowed position, according to one embodiment of the present invention.
Figure 28:
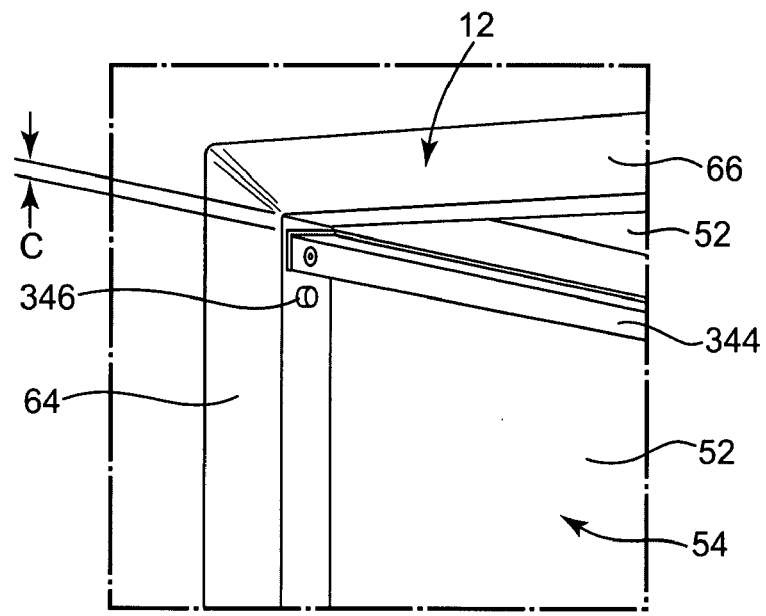
FIG. 28 illustrates a detailed view of a rail coupled to the shell of FIG. 27A configured to receive the overhead storage door of FIG. 27A, according to one embodiment of the present invention.

FIGS. 27A, 27B and 28 collectively illustrate a shell 12 with an overhead storage door 312. Overhead storage door 312 is sized and shaped to substantially cover opening 56 of shell 12. Overhead storage door 312 is coupled with shell 12 and is configured to move from a closed position (not shown) to a partially open positioned of FIG. 27A and finally to a stowed position of FIG. 27B. In particular, from the closed position, overhead storage door 312 is rotated, as generally indicated in FIG. 27A at 340, to move overhead storage door 312 away from opening 56 of shell 12. Once overhead storage door 312 is fully or otherwise sufficiently rotated, overhead storage door 321 is slid back into storage chamber 54 of shell 12, as generally indicated at 342 in FIG. 27B, to selectively position overhead storage door 312 in an open position.

To facilitate this movement and storage of overhead storage door 312, in one embodiment, a track 344 illustrated in FIG. 28 is added to shell 12 near a top front rail 66 and extends back into storage chamber 54 of shell 12 extending generally parallel to the topmost side wall 52. One track 344 is provided to extend substantially parallel with and near to each side wall 52 adjacent topmost side wall 52. In one embodiment, track 344 is provided with a clearance distance C from a bottom surface of topmost front rail 66. Clearance distance C is generally greater than a thickness of overhead storage door 312. Track 344 is configured to support overhead storage door 312 as it is slid into the stowed position and while overhead storage door 312 is stowed. In particular, overhead storage door 312 is configured to be moved along and to rest upon track 344. In one embodiment, shell 12 additionally includes a stop 346 extending from a front rail 66. Stop 346 is configured to generally prevent overhead storage door 312 from rotating into storage chamber 54 of shell 12. Other suitable methods of attaching and storing an overhead storage door 312 are also contemplated.

Pull-Out Door

Figure 29:
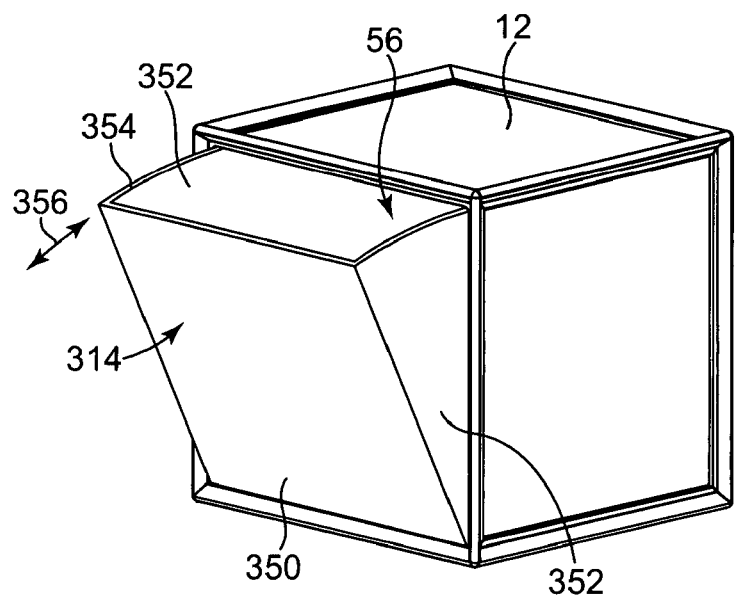
FIG. 29 illustrates a perspective view of a shell with a pull-out door in a partially opened position, according to one embodiment of the present invention.

FIG. 29 illustrates one embodiment of shell 12 with pull-out door 314. Pull-out door 314 generally includes a front panel 350 and two side panels 352 each extending from an opposite edge of front panel 350 back into shell 12. In one embodiment, front panel 350 is sized and shaped similar to or slightly larger than opening 56 of shell 12 such that front panel 350 is configured to close opening 56. In one example, pull-out door 314 is rotatably coupled with shell 12 near a bottom portion thereof, and each side panel 352 has a generally rounded top edge 354 to facilitate rotation of pull-out door 314 relative to shell 12. As such, pull-out door 314 can be rotated about its coupling with shell 12, as generally indicated at 356, to open and close opening 56 of shell 12. In one embodiment, hardware, such as a handle, knob, etc. can be added to pull out door 314 or any other of doors 32, 310 and 312.

Bins

Figure 30:
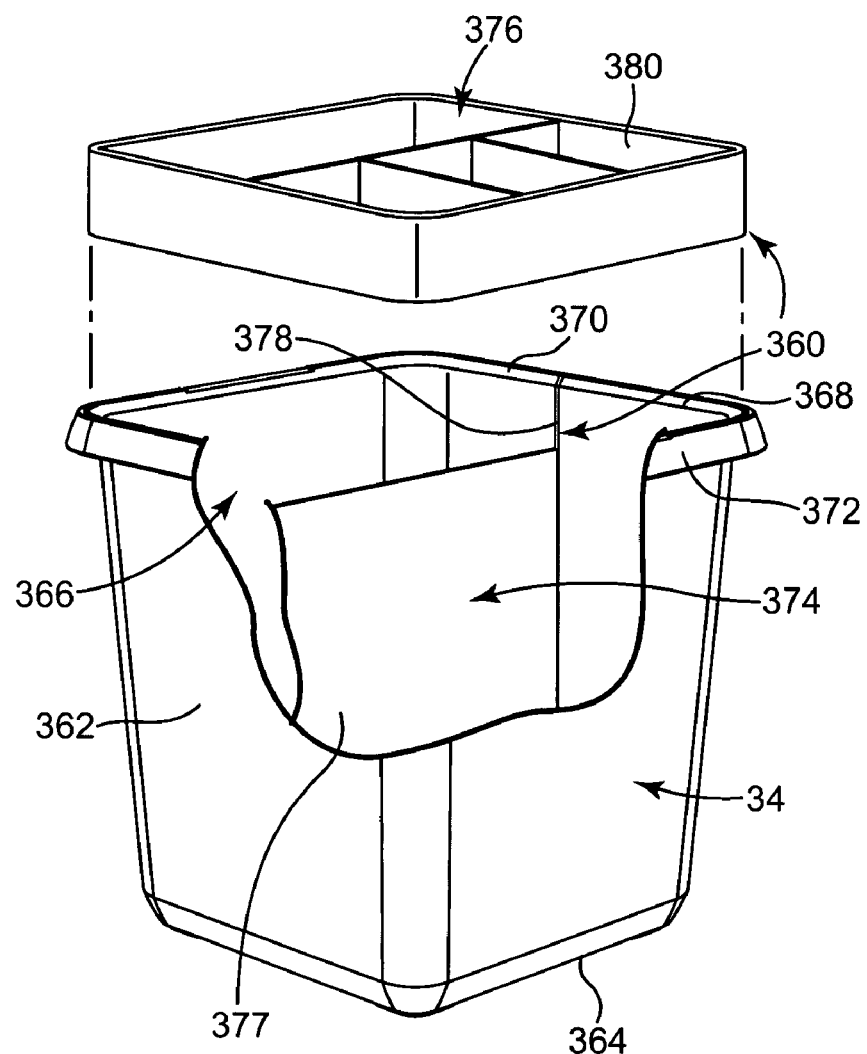
FIG. 30 illustrates a partially exploded, perspective view of a bin with a divider and a tray, according to one embodiment of the present invention.

FIG. 30 illustrates one embodiment of a bin 34 with bin accessories 360. Bin 34 is sized to fit within shell 12 (or in one embodiment, shell 160 or shell 270) as illustrated with additional reference to FIGS. 1 and 23. In one embodiment, bin 34 substantially fills storage chamber 54 of shell 12. Bin 34 includes side panels 362 extending from a bottom 364 of bin 34 and coupled to one another to define a storage cavity 366 therebetween. In one embodiment, side panels 362 are arranged in a generally rectangular configuration. In one example, side panels 362 gradually taper outward as they extend from bottom 364 to a top opening 368 in bin 34.

In one example, bin 34 additionally includes a rim 370 and a flange 372. Rim 370 extends from side panels 362 around a perimeter of top opening 368 in a direction substantially parallel to bottom 364 of bin 34. Flange 372 extends downwardly from and around rim 370 opposite side panels 362. Rim 370 and flange 372 add to the rigidity and strength of bin 34. Bin 34 may be formed of any suitable material such as plastic, acrylic, metal, wood, cardboard, fabric, natural or synthetic fibers, etc.

In one example, bin accessories 360 include at least one of a divider 374 and a tray 376. Divider 374 includes a planar member 377 having an outer perimeter configured to fit within cavity 366 and to interface with bottom 364 and two opposing side panels 362 of bin 34. In one example, a hanger member 378 extends from each side edge of planar member 377 upward and is configured to interact with at least one of rim 370 and flange 372 to generally hang planar member 377 within cavity 366. In one embodiment, internal surfaces of bottom 264 and/or side panels 362 include one or more of ribs, grooves or other features configured to interface with divider 374 to further secure divider 374 within cavity 366. Once positioned in cavity 366, divider 374 divides cavity 366 into at least two separate parts.

Tray 376 is configured to fit within cavity 366 and provides at least one compartment 380 configured to receive any of a plurality of small items (not shown). In one embodiment, tray 376 is maintained in a top portion of cavity 366 due at least in part to interaction between tray 376 and divider 374, grooves or indentation of side panels 362 in cavity 366, or other suitable feature for suspending tray 376 in bin 34 are also contemplated. Divider 374 and tray 376 provide example components for customizing bin 34 for particular storage needs of the consumer.

Figure 31:
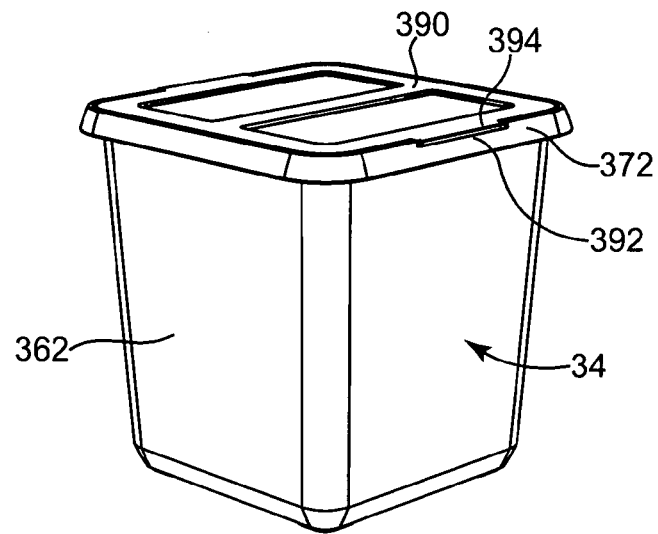
FIG. 31 illustrates a perspective view of the bin of FIG. 30 with a lid, according to one embodiment of the present invention.

Additionally referring to FIG. 31, in one embodiment, a lid 390 is provided for covering bin 34. In one embodiment, lid 390 is one of a lift-off lid, a hinged lid, a sliding lid, or any other lid suitable to cover opening 368 (FIG. 30) of bin 34. In one example, flange 372 of bin 34 includes cutouts or indentations 392 therein configured to receive planar protrusions 394 extending from an edge of lid 390. Indentations 392 and protrusions 394 collectively facilitate proper alignment of lid 390 with bin 34.

Although primarily described herein as being a bin 34, other items forming storage compartments and configured to fit within shells 12, 160, or 270 are also contemplated. For example, boxes, fabric or woven baskets, or other suitable containers with or without lids, covers, tops, etc. may be incorporated into storage and organization system 10.

Drawers

Figure 23:
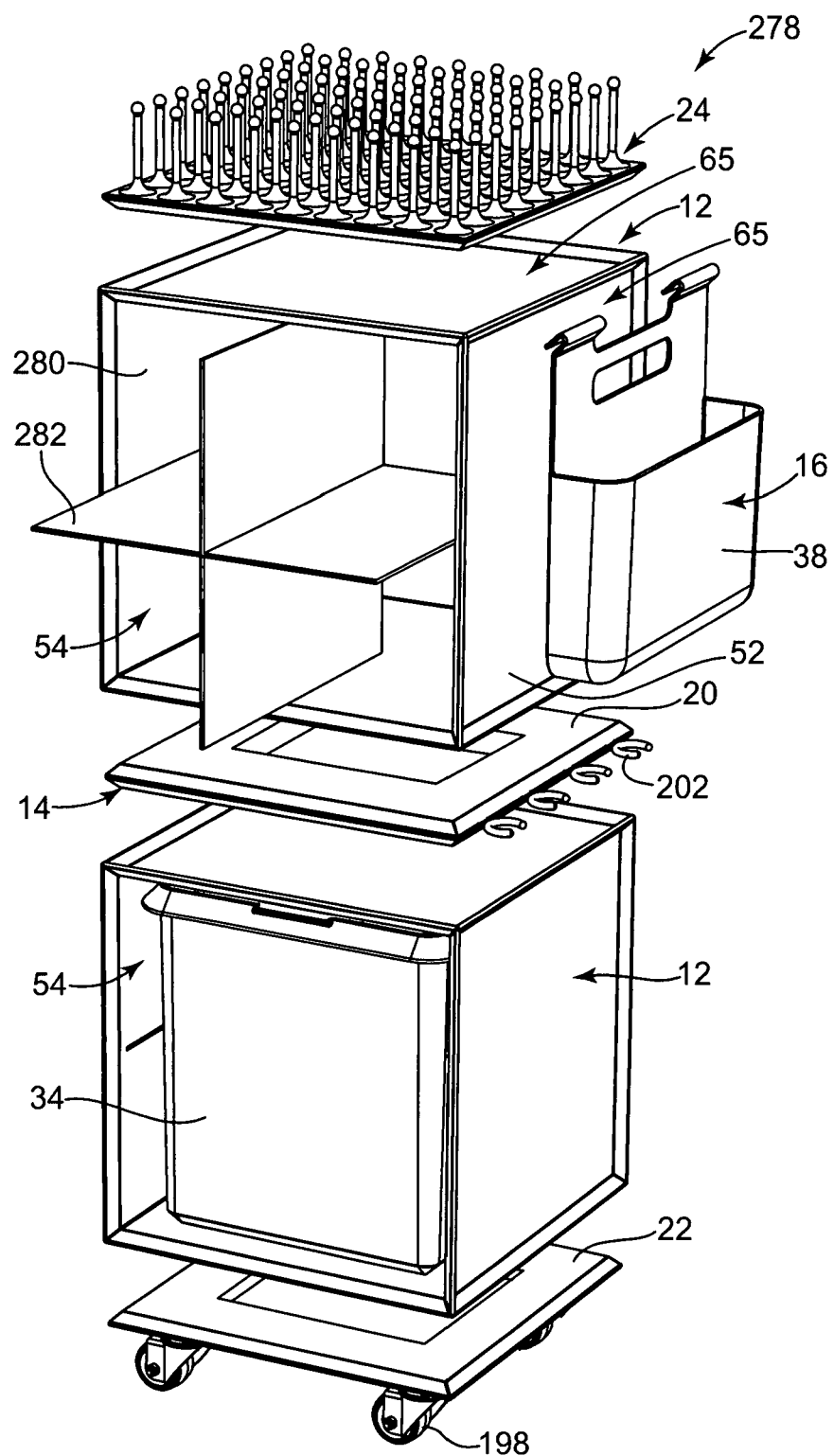
FIG. 23 illustrates a partially exploded, perspective view of a storage and organization system configuration, according to one embodiment of the present invention
Figure 32:
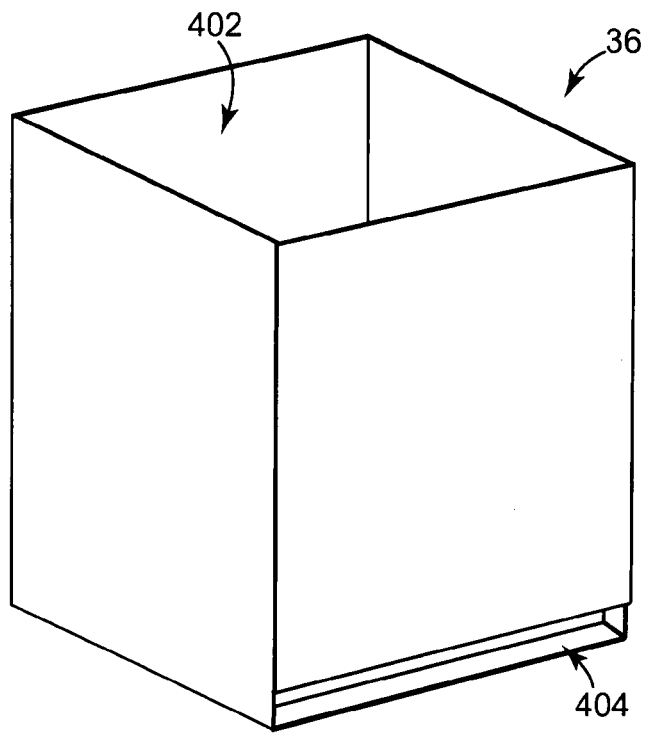
FIG. 32 illustrates a perspective view of a drawer, according to one embodiment of the present invention.

FIG. 32 illustrates on embodiment of a drawer 36 configured to be received within shell 12 (or, in other embodiments, shell 160 or shell 270). In one example, drawer 36 has a rectangular or square cross sectional shape and defines a compartment 402 for storing any of a variety of items. In one embodiment, drawer 36 is sized and shaped to substantially fill shell 12 as illustrated with reference to FIG. 34. In other embodiments, drawer 36 may be sized to fit within a portion of shell 12, such as a compartment 280 formed by insert 282 (FIG. 23).

In one embodiment, drawer 36 inherently defines a handle 404, such as an indentation, flange, groove, hole, etc. for a consumer to grasp to facilitate opening and closing drawer 36. In one embodiment, a handle, knob, etc. may be coupled with drawer to facilitate opening and closing of drawer 36 in addition to or as an alternative to handle 404. Drawer 36 can be made of any suitable material such as plastic, acrylic, metal, wood, cardboard, fabric, natural or synthetic fibers, etc.

Hangers

In general, a hanger is any accessory 16 (FIG. 1) configured to be hung from one or more rails 62 and/or 66. One example of a hanger 38 is illustrated in FIGS. 33A, 33B and 33C. Hanger 38 includes a main panel 410, one or more hooks 412 extending from an upper portion of main panel 410 and a functional component 420. Main panel 410 is substantially planar and sized smaller than side wall 52 (FIG. 23) such that hooks 412 of hanger 38 can hang at least partially within a recess 65 (FIG. 23) thereof. Each hook 412 extends in a first direction angled from main panel 410 and curves back on itself to extend by toward main panel 410. Hook 412 is specifically configured to coordinate with rails 62 and 66 of shell 12. For instance, where shell 12 includes linear rail 62a (FIG. 3A), hook 412 defines a cavity 416a shaped similar to but slightly larger than linear rail 62a. As such hook 412 can be placed over rail 62a to hang hanger 38 therefrom. In one embodiment, where shell 12 includes tapered rail 62d (FIG. 3D), a cavity 416a is formed by hook 412d and is shaped similar to but slightly larger than tapered rail 62d such that hook 412d can be placed over rail 62d to hang hanger 38 therefrom. Hooks 412 are linearly aligned with one another to such that two hooks 412 could be replaced with a single more elongated hook (not shown).

In one embodiment the topmost leg 418 of hanger hook 412 or 412a has an at least partially elastomeric nature, such that leg 418 can be bent or rotated away from the remainder of hook 412 or 412a to facilitate positioning of hook 412 or 412a on a rail 62 or 66 as illustrated in FIG. 1. Following positioning of hook 412 or 412a, topmost leg 418 moves back to the original position of leg 418 to capture rail 62 of 66 within cavity 416 or 416a of hook 412 or 412a as generally illustrated with reference to FIG. 23.

Figure 35:
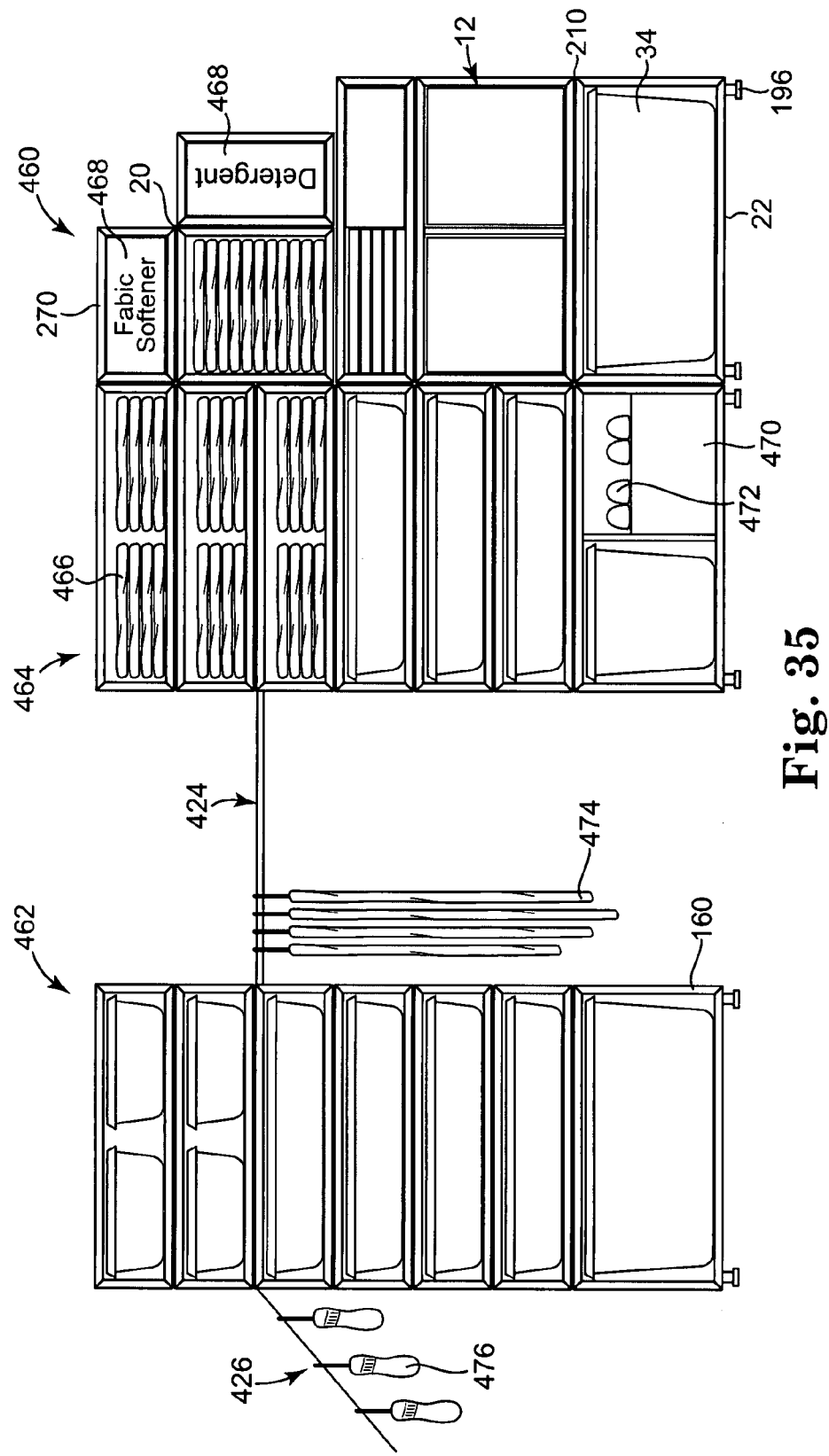
FIG. 35 illustrates a perspective view of a storage and organization system configuration, according to one embodiment of the present invention.

Functional component 420 extends from main panel 410 or directly from hooks 412. In one embodiment, functional component 420 is any suitable component such as a pouch, container, clip, hook, chalkboard, white board, corkboard, mirror, hanging rod, dry rack, peg, etc. As illustrated in FIG. 33A, functional component 420 includes a hollow case coupled with main panel 410 to define a cavity 422 therebetween for holding letters, magazines, files, keys, or any other suitably sized item. Other hanger configurations will be apparent to those of ordinary skill in the art upon reading this application. For example, a hanger 424 including a hanging rod and configured to be hung between two rails 62 or 66 of spaced apart shells 12 maybe included as illustrated in FIG. 35. FIG. 35 also illustrates a dry rack hanger 426. Hangers, such as hangers 38, 424 and 426, generally can be formed of any suitable material such as fabric, plastic, metal, acrylic, cardboard, corkboard, whiteboard, etc.

Other Accessories

Any other numbers of accessories can be included in storage and organization system 10 (FIG. 1) of the present invention to personalize shells 12, 160 and 270 and pillows 14, 20, 22, 24 and 210 thereof for a particular use, for a particular preference, for a particular season, etc. as a consumer sees fit. For example, with reference to FIG. 34, in one embodiment, tray 40 is similar to a top pillow 24 in that tray 40 includes tapered features (not shown), etc. configured to fit within a top recess 65 of shell 12. Tray 40 may additionally include a service surface, compartments 430, etc. where tray 40 can be easily removed from shell 12 and used in other purposes otherwise unrelated to storage and organization system 10.

In one embodiment, the additional accessories include boxes 432 and baskets 434 as shown in the storage and organization system configuration generally illustrated at 440 in FIG. 34. The accessories of configuration 440 or any other configuration may also include insets or panels 436. Insets 436 may be coupled with doors of configuration 440 or may alternatively be positioned within a side or top recess 65 to change the appearance and/or function of configuration 440. In one example, inset 436 includes an outer surface covered in fabric, corkboard, woven material, white board, etc. Other insets or customization features for use with the storage and organization system will be apparent to those of skill in the art upon reading this application.

In one embodiment, in addition to being coupled with other components in the storage and organization system, shells 12, 160, 270 and/or other accessories can be used alone. For example, in one embodiment, in addition or as an alternative to being stacked with other shells 12, a shell 12 may be hung on a wall 442. In one embodiment, other items such as accessories 16, etc. are configured for hanging or other uses as an alternative to use with other stacked shells 12, 160 and 270.

Configurations and Reconfiguration

As described above, storage and organization system 10 (FIG. 1) includes base components including shells 12, 160 and 270, pillows 14, 20, 22, 24 and 210 and accessories 16 or any combination thereof that are adapted to be reconfigured, supplemented, repurposed, rotated, rearranged, etc. to evolve with the changing storage and organizational needs of consumers. For instance, the same shell 12 may be used at a first point in time in storage and organization system configuration 18 (FIG. 1) and at subsequent points in time may be used in any one or more of storage and organization system configurations, for example, configurations 272 (FIG. 22), 278 (FIG. 23), 440 (FIG. 34), etc. and vice versa. In one embodiment, use of pillows 14, 20, 22, 24 and 210 alone or in combination with additional connection devices 230, 232, 234, 236, etc. rather than conventional more permanent fastening agents, for example, screws, rivets, adhesive, bolts, etc., facilitates the evolution of the storage and organization system 10 described herein by reconfiguration.

FIG. 35 illustrates one example storage and organization system configuration 460 specifically configured for a dedicated purpose, namely for use in a laundry room. In configuration 460, a plurality of shells 12, 160 and 270 are arranged into two stacks 462 and 464. In one embodiment, one or more of shells 12, 160 and 270 are provided to support the belongings of the consumer, such as folded clothes, linens and other laundry items generally indicated at 466. In one example, others of shells 12, 160 and/or 270 each receive a bin 34. Bins 34 may be used for any purpose assigned by the consumer, such as laundry baskets, storage containers, etc.

In one embodiment, given a standard sizing of shells 12, 160 and 270, products, for example, products 468, may be specifically sized and manufactured to fit within one of shells 12, 160 and 270 to allow products 468 maintained in shells 12, 160, or 270 to be stacked with and selectively secured to the remainder of configuration 460 or any other storage and organization system configuration. In addition to being sized to fit within shells 12, 160 and/or 270, in one example, products 468 are consumable products configured to be dispensed or otherwise accessed while they are stored in a respective shell 12, 160, or 270. In one embodiment, the size of shells 12, 160 and 270 is selected based on common sizes for typical mass produced items such as products 468. In one example, otherwise sized shells are specifically manufactured based on the size, shape, or other properties of a specific product 468.

In one example, more specialized accessories can be added to storage and organization system configuration 460. For example, a specialized storage bin or rack 470 may be provided and maintained within one of shells 12, 160 and 270 for storing shoes 472. In one example, hangers 424 and 426 are also included in storage and organization system configuration 460. More specifically, as illustrated in FIG. 35, hanging rod hanger 424 extends between stacks 462 and 464 such that clothing items 474 can be selectively hung from hanger 424. Dry rack hanger 426 is hung from stack 462 for hanging clothing or other laundry items 476 for air drying. Other arrangements, combinations, etc. of the storage and organization system components described herein or otherwise apparent to those of skill in the art upon reading this application for any purpose(s) assigned by the consumer are also contemplated.

Additional Support Assemblies

FIGS. 36A-36C illustrate one embodiment of a support assembly 500 configured to receive components of storage and organization system 10 (FIG. 1). In one embodiment, support assembly 500 provides an alternative or supplement to component (e.g. shells) association with pillows 20, 22, 24 and 210. In one example, support assembly 500 provides additional support and overall rigidity to a resulting storage and organization system configuration such as configuration 501 illustrated with additional reference to FIG. 37.

In one embodiment, support assembly 500 includes elongated vertical members 502, 504 and 506, which are substantially similar to one another and are laterally spaced from each other. Each vertical member 502, 504 and 506 includes one or more support members 508 extending from a side surface thereof toward another one of vertical members 502, 504 and 506. Additionally referring to FIG. 37, each support member 508 provides for the support of a shell 12, a shelf 510, or other system component.

In one embodiment, each support member 508 longitudinally extends along a substantial portion of a depth of each vertical member 502 as illustrated, for example, in FIG. 36B. In one embodiment, each support member 508 may be a more discrete point support or peg that is positioned to extend from vertical member 502, 504, or 506 in vertical alignment with another discrete support for collectively supporting a shell 12, shelf 510 or other component.

Figure 37:
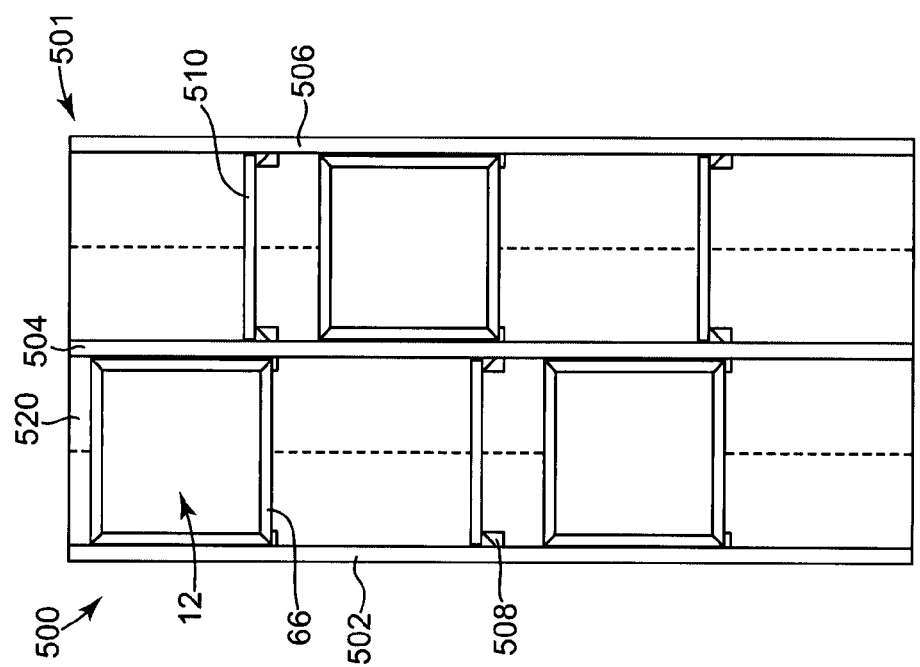
FIG. 37 illustrates a front view of the support assembly of FIG. 36A with shells, according to one embodiment of the present invention.

Support member 508 may be formed of any suitable size and shape. In one embodiment, support member 508 is formed with a beveled or angled shaped configured to correspond with the size, shape and angled orientation of rails 62 and/or 66 of shells 12 (FIG. 2). In this manner, shell 12, when placed to rest on two or more support members 508, at least partially receives each support member 508 in a recess 65 (FIG. 2) of shell 12. As a result, the bottom-most front rail 66 may partially or fully cover the respective support members 508 as generally illustrated in FIG. 37. In one example, shelves 510 include a front rail (not shown) similar to bottom-most front rail 66 of shell 12 such that upon placement of shelves 510 on support members 508, support members 508 are substantially hidden from view.

Referring once again to FIGS. 36A and 36B, in one embodiment, a back panel 520 is coupled to a rear edge of and extends between vertical members 502, 504 and 506 to brace support assembly 500. Back panel 520 is configured to regulate the horizontal spacing of vertical members 502, 504 and 506 and may additionally provide structural rigidity to support assembly 500 and ultimately configuration 501 (FIG. 37). In addition, back panel 520 provides a substantially clean, solid appearance for support assembly 500 when viewed from the back. Back panel 520 is formed of any suitable material, such as plastic, cloth, metal, wood, fiberboard, cardboard, etc.

In one example, back panel 520 defines fold or crease lines as generally indicated at 522 in FIGS. 36A and 36B. Fold lines 522 allow support assembly 500 to be collapsed or folded into a smaller more flat configuration for packaging, storage, etc. In particular, additionally referring to FIG. 36C, in one embodiment, when a force such as force 530 is applied to vertical member 506, back panel 520 is configured to fold along fold line 522 to collapse or fold support assembly 500 for packing, storage, etc.

Figure 38:
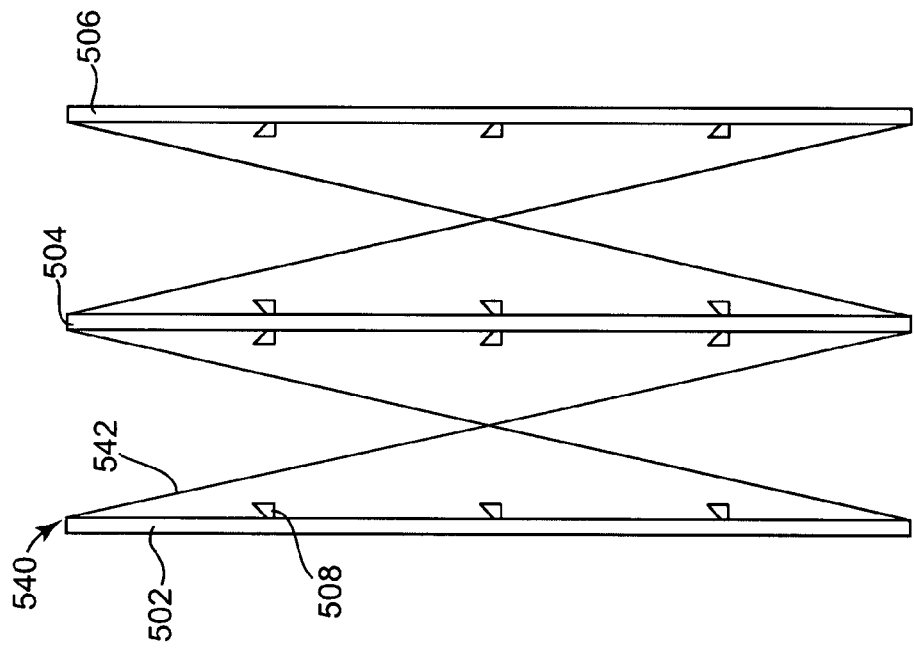
FIG. 38 illustrates a front view of a support assembly of a storage and organization system in a use position, according to one embodiment of the present invention.

FIG. 38 illustrates another support assembly 540 similar to support assembly 500 of FIGS. 36A, 36B, 36C and 37 except where specifically enumerated. In support assembly 540, back panel 520 of support assembly 500 is replaced with back braces 542. In one example, each back brace 542 extends between at least two of vertical members 502, 504 and 506 to laterally and rotationally stabilize support assembly 540. In one embodiment, back braces 542 are coupled with vertical members 502, 504 and 506 in a diagonal and/or crossing manner. Back braces 542, in one example, are coupled with each vertical member 502, 504 and 506 to allow collapse of vertical members 502, 504 and 506 toward each other for packing and storage of support assembly 540 in a manner similar to that described above with respect to FIG. 36C. With this in mind, back braces 542 can be formed of any suitable material, for example, substantially rigid materials such as plastic, acrylic, wood, metal, etc. and is selectively coupled to or has an adjustable coupling with vertical members 502, 504 and/or 506 to allow for folding of support assembly 540. In one embodiment, back braces 542 are less rigid and are formed of other suitable materials such as wire, cable, etc. configured to provide strength and stabilization to support assembly 540 by way of tension created in back braces 542 during use of support assembly 540. Support assembly 540 is configured to support shells 12, shelves 510, or other components in a manner similar to that described with respect to support assembly 500. Use of other suitable support assemblies is also contemplated.

More on Shells

Figure 6:
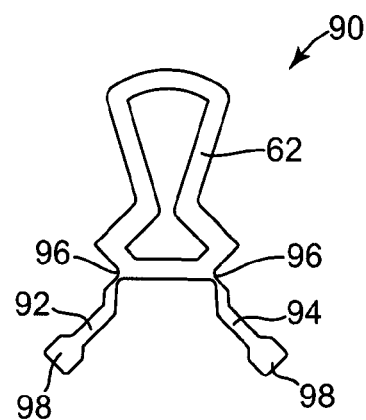
FIG. 6 illustrates an end view of a hinge member of the main body of FIG. 5, according to one embodiment of the present invention.
Figure 7:
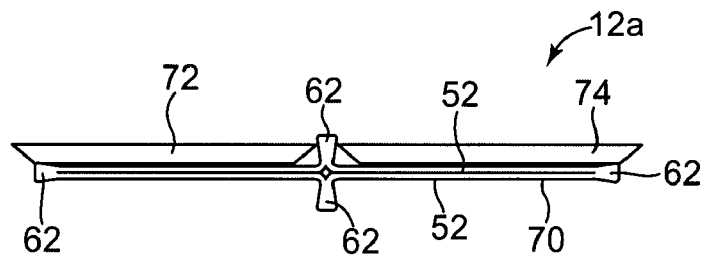
FIG. 7 illustrates a side view of the shell of FIG. 4A fully collapsed and configured for packaging, according to one embodiment of the present invention.
Figure 39:
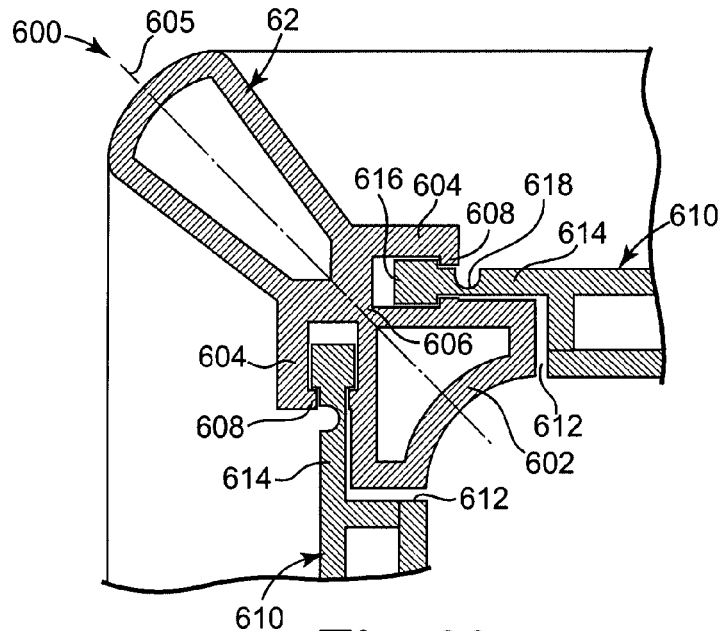
FIG. 39 illustrates a cross-sectional view of a rail and portions of adjacent side walls, according to one embodiment of the present invention.

FIGS. 39-43 each illustrate a cross section of a different embodiment of a hinge member and adjacent side walls configured to function in a similar manner as and as an alternative to hinge members 90 and side walls 52 described with respect to FIGS. 5-7. For example, FIG. 39 illustrates hinge member 600 including a rail 62, a coupling rib 602 and coupling extensions 604. An intersection 606 is formed between rail 62 and coupling rib 602. More specifically, coupling rib 602 extends from intersection 606 in a substantially opposite direction as compared to rail 62. In one embodiment, hinge member 600 substantially narrows at intersection 606 such that the material defining hinge member 600 is substantially thinner at and/or near intersection 606 than at other portions of hinge member 600. As a result, hinge member 600 is configured such that coupling rib 602 is able to repeatedly bend or effectively rotate relative to rail 62 about intersection 606 without significantly weakening or breaking rail 62 along intersection 606.

In one embodiment, a coupling extension 604 extends from each side of rail 62. Coupling extensions 604 are symmetrically positioned relative to a radial centerline 605 of rail 62. In one example, coupling extensions 604 each extend from rail 62 with an orientation substantially perpendicular to one another. In one embodiment, a tab 608 extends from an end of each coupling extension 604 with an orientation substantially perpendicular to a remainder of tab 608 toward coupling rib 602. Each tab 608 is configured to facilitate coupling of hinge member 600 with adjacent side walls 610 (e.g., of shell 12 of FIG. 4A). In one embodiment, each of rail 62, coupling 602, coupling extension 604 and tab 608 is elongated longitudinally and extends a similar distance such that each component of hinge member 600 is of a length configured to extend along substantial entirety of an edge of a side wall 610.

Each side wall 610 is similar to side walls 52 (e.g., FIG. 5), and therefore, are positioned to extend substantially perpendicular to each adjacent side wall 610 another. Each side wall 610 includes a void or cutout 612 longitudinally extending along an edge of side wall 610 and configured to facilitate reception of coupling rib 602 between adjacent side walls 610. Each side wall 610 additionally includes an extension 614 extending from the remainder of side wall 610 along cutout 612 toward rail 62. In one example, each extension 614 includes at least one elongated bead 616 on an end thereof and an elongated groove 618. Elongated bead 616 extends along an edge of extension 614 and is configured to be received between coupling rib 602 and a corresponding coupling extension 604 of hinge member 600. In one example, tab 608 of the corresponding coupling extension 604 interfaces with elongated bead 616 of extension 614 to prevent inadvertent movement of rail 62 relative to side wall 610 while simultaneously allowing for rotation of rail 62 relative to side wall 610 when desired by the consumer to transition the resulting main shell body 70 of shell 12a (e.g., FIG. 4A) to transition from a flat packed or collapsed position to an erected or assembled position to form shell 12a for storage or other use. Similarly, groove 618 is configured to selectively receive a corresponding tab 608 of rail 62 to selectively maintain main shell body 70 in a collapsed state when desired.

Figure 40:
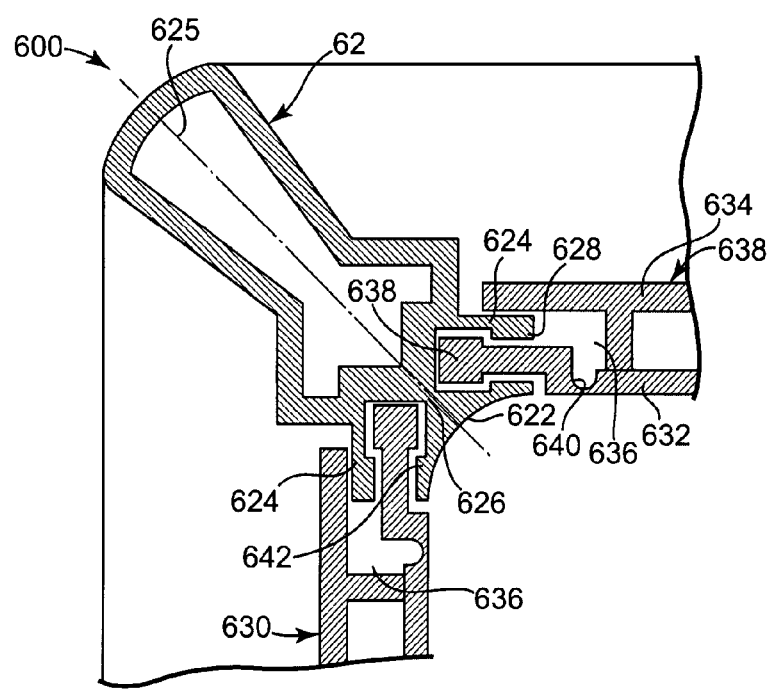
FIG. 40 illustrates a cross-sectional view of a rail and portions of adjacent side walls, according to one embodiment of the present invention.

FIG. 40 illustrates another embodiment of a hinge member generally illustrated at 620 configured to interact with shell side walls 630. Hinge member 620 includes a rail 62, a coupling rib 622 and coupling extensions 624. Similar to coupling rib 602 described with respect to hinge member 600 of FIG. 39, coupling rib 622 extends from rail 62 to define an intersection 626 therebetween. In one embodiment, intersection 626 is formed substantially thinner or at least weaker than other portions of hinge member 620 such that coupling rib 622 is allowed to repeatedly bend or effectively rotate relative to rib 622 about intersection 626 without significantly weakening or breaking rail 62 along intersection 626. Coupling extensions 624 each extend in a substantially symmetrical manner about a radial centerline 625 of hinge member 620 such that coupling extensions 624 are positioned substantially perpendicular to one another. Each coupling extension 624 defines an elongated tab 628 extending from an end opposite rail 62 and configured to facilitate interaction with adjacent side wall 630.

Side walls 630 are substantially similar to side walls 52 (e.g., FIG. 5) and, as such each defines an internal panel 632 and an external panel 634 similar to internal panel 76 and external panel 78 (e.g., FIG. 5) of side wall 52. Internal panel 632 and external panel 634 are positioned relative to one another and configured to define an open cavity 636 therebetween and positioned near the outer edges of internal panel 632 and external panel 634. Each open cavity 636 is configured to at least partially receive a corresponding coupling extension 624 of hinge member 620. More specifically, in one embodiment, internal panel 632 defines an elongated bead 638 extending along an elongated edge thereof and/or an elongated grove 640 defined at a position offset from the elongated outside edge of side wall 630. Elongated bead 638 is configured to interface with tab 628 and coupling rib 622 of hinge member 620 to prevent coupling extension 624 from being completely removed from within cavity 636. In a similar manner as described above, elongated groove 640 is configured to selectively receive tab 628 of hinge member 620 when resulting shell 12a (e.g., FIG. 4A) is in a collapsed state for flat packing, storage, etc. In one embodiment, coupling rib 622 additionally includes a tab 642 extending outwardly and configured to interact with elongated bead 638 to further facilitate coupling of hinge member 620 with side wall 630, as will be apparent to one skilled in the art upon reading this application.

Figure 41:
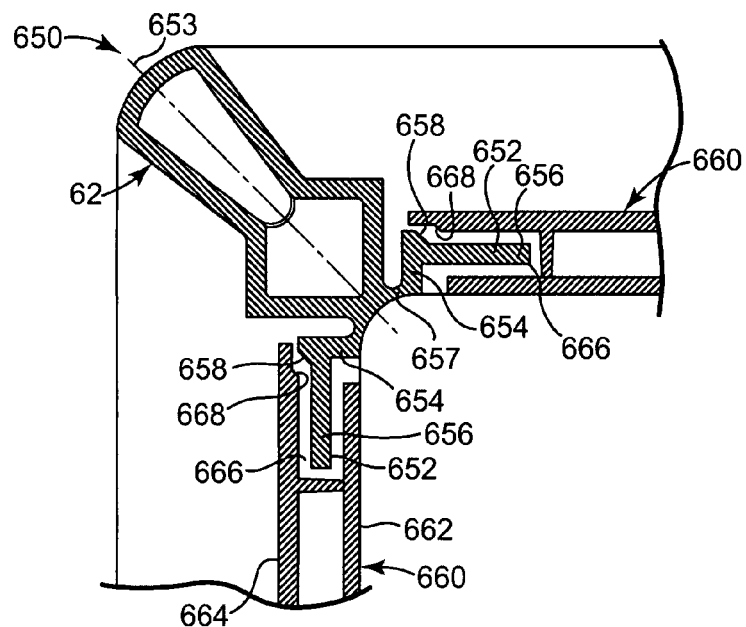
FIG. 41 illustrates a cross-sectional view of a rail and portions of adjacent side walls, according to one embodiment of the present invention.

FIG. 41 illustrates another hinge member generally indicated at 650 for shell side walls 660. Hinge member 650 generally includes rail 62 and two coupling extensions 652 each extending from an internal portion of rail 62 in a substantially symmetrical manner relative to a radial center line 653 of rail 62. In one example, each coupling extension 652 includes a first portion 654 and a second portion 656. First portion 654 extends from rail 62 to define an intersection 657 therebetween. Intersection 657 is formed of a substantially thinner amount of material than the remainder of hinge member 650 such that each coupling extension 652 is rotatable relative to rail 62 about intersection 657. The rotatable configuration allows hinge member 650 to function as a living hinge allowing the collapsing and expanding of the resulting main shell body 70 (e.g., FIG. 5).

More specifically, first portion 654 of coupling extension 652 extends in an outward direction from intersection 657. The first portion 654 of the two coupling extensions 652 of hinge member 650 extends substantially perpendicular to one another. Each second portion 656 of coupling extensions 652 extends from a corresponding first portion 654 opposite intersection 657. Each second portion 656 extends substantially perpendicular to the corresponding first portion 654 such that second portion 656 extends substantially parallel to the extension of side walls 660. In one embodiment, near the transition from first portion 654 to second portion 656, an interface shoulder 658 is formed and configured to interact with a portion of side wall 660 to prevent inadvertent collapse of the resulting main shell body 70.

Each side wall 660 adjacent to and interacting with hinge member 650 includes an internal panel 662 and an external panel 664 opposite one another and positioned to define an open cavity 666 along an edge thereof. Cavity 666 is configured and sized to receive at least a portion of second portion 656 to facilitate coupling of hinge member 650 with side wall 660. In one example, external panel 664 defines an interface surface 668 near an outer edge thereof configured to selectively interact with shoulder 658 of hinge member 650 to limit overall movement of hinge member 650 relative to each adjacent side wall 660 while allowing collapse of main shell body 70 resulting from rotation of coupling extensions 652 about intersections 657 formed therein.

Figure 42:
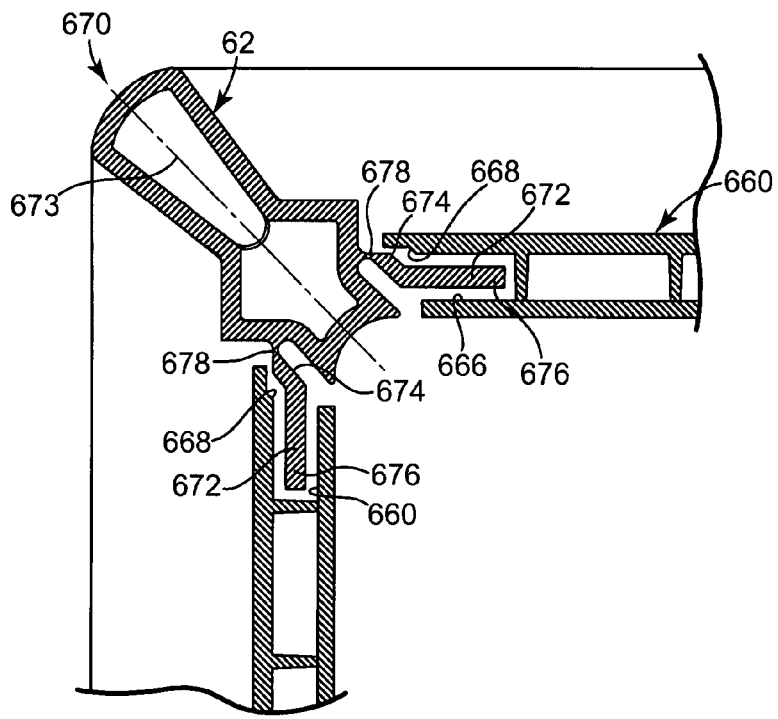
FIG. 42 illustrates a cross-sectional view of a rail and portions of adjacent side walls, according to one embodiment of the present invention.

FIG. 42 illustrates yet another hinge member generally indicated at 670 for interfacing with side walls 660. Hinge member 670 has similarities to hinge member 650 and includes rail 62 and coupling extensions 672 each extending from rail 62 in a substantially symmetrical manner about a radial centerline 673 of rail 62. However, in one embodiment, first portion 674 of coupling extension 672 extends from rail 62 in an inward manner (i.e., towards an internal portion or cavity of main shell body 70), and, as such, defines an intersection 678 between first portion 674 and rail 62. Intersection 678 is formed of a material substantially thinner than the remainder of hinge member 670, such that hinge member 670 is configured to repeatedly rotate about intersection 678 relative to rail 62 without significantly weakening or breaking rail 62 along intersection 678. In one embodiment, first portions 674 of coupling extension 672 extend from rail 62 in a manner substantially parallel to one another. Second portion 676 of each coupling extension 672 extends from the corresponding first portion 674 opposite intersection 678 with an orientation substantially parallel to adjacent side wall 660. In this manner, second portions 676 of hinge member 650 are configured to extend substantially perpendicular to one another.

Each of side walls 660, as described with respect to FIG. 41, defines cavity 666, which is configured to receive coupling extensions 672 such that second portion 676 of coupling extension 672 is at least partially maintained within cavity 666. Unlike hinge member 650, use of hinge member 670 causes interface surface 668 of side wall 660 to interface with first portion 654 directly. This configuration allows for relatively robust coupling of rail 62 to side wall 660 while also allowing for additional rotation about hinge member 670 for selective collapse of main shell body 70.

Figure 43:
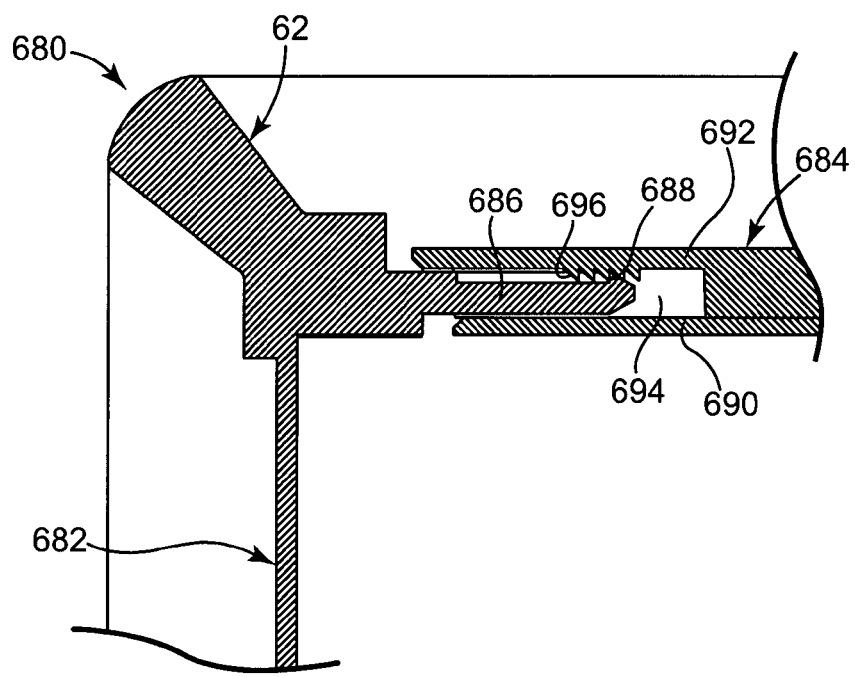
FIG. 43 illustrates a cross-sectional view of a rail and portions of adjacent side walls, according to one embodiment of the present invention.

FIG. 43 illustrates one embodiment of a hinge assembly 680 including rail 62 with a first side wall 682 and a second side wall 684. Hinge assembly 680 is configured for use in a kit of parts or similar assembly of shell 12a (e.g., FIG. 4A) where rail 62 is integrally formed along a first edge of first side wall 682. For example, in one embodiment, hinge assembly 680 may be used in a kit of parts similar to that described above with respect to FIG. 9. In one example, a rib 686 extends from rail 62 in a direction substantially perpendicular to the extension of first side wall 682 and generally parallel to extension of a second adjacent side wall 684. Rib 686 generally extends along the longitudinal edge and is configured to be received at least partially within a portion of second side wall 684. In order to facilitate coupling with second side wall 684, a protrusion 688 extends from an end of rib 686 opposite rail 62. In particular, protrusion 688 extends outwardly from an end of rib 686.

Second side wall 684 is formed of an internal panel 690 and an external panel 692 in a similar manner as described above with respect to other side walls. More specifically, internal panel 690 and external panel 692 are spaced from one another along an edge of second side wall 684 to define a cavity 694 therebetween near an edge thereof. In one embodiment, external panel 692 includes a plurality of teeth 696 extending from an internal portion thereof into cavity 694 and toward internal panel 690.

During assembly, first side wall 682 is positioned perpendicular to second side wall 684 and is slid toward second side wall 684, such that rib 686 is slid into cavity 694. More specifically, as rib 686 is pressed into cavity 694 protrusion 688 of rib 686 is configured to interact with teeth 696 formed by second side wall 684. The interaction between protrusion 688 and teeth 696 is configured to couple first side wall 682 to second side wall 684 generally without the use of tools or other coupling mechanisms thereof. In this manner, during storage and transportation (i.e., prior to assembly), first side wall 682 and second side wall 684 can be stacked on one another. Subsequently, upon assembly, side wall 682 and 684 can be press-fit together. Notably, teeth 696 are generally angled back away from first side wall 682 such that rib 686 is generally prevented from being removed from cavity 694 following assembly due to the interaction between protrusion 688 and the corresponding teeth 696.

Although FIGS. 39-43 illustrate a plurality of methods for attaching two adjacent side walls to one another, upon reading the present application and those incorporated herein by reference, one of skilled in the art will recognize a variety of manners of attaching and couplings two adjacent side walls to one another to form a hinged connection near each rail 62. In one embodiment, features of the various members 600, 620, 650, 670 and/or side wall 682 and 684 may be interchanged or intermixed to achieve a desired coupling of a rail with adjacent side walls.

More on Pillows

Figure 44:
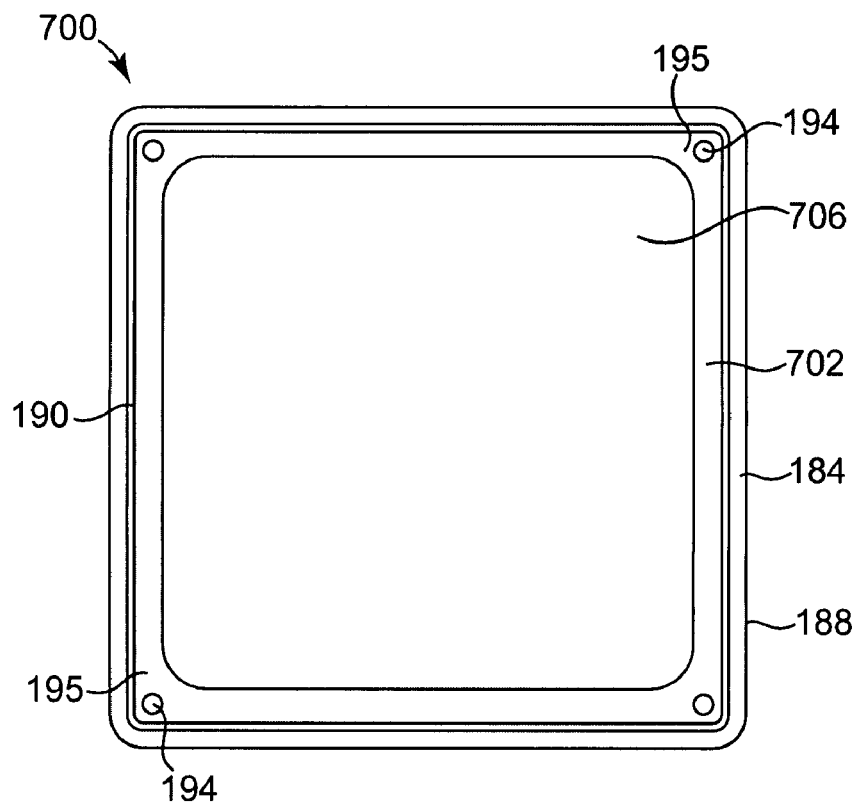
FIG. 44 illustrates a top view of a pillow, according to one embodiment of the present invention.
Figure 45:
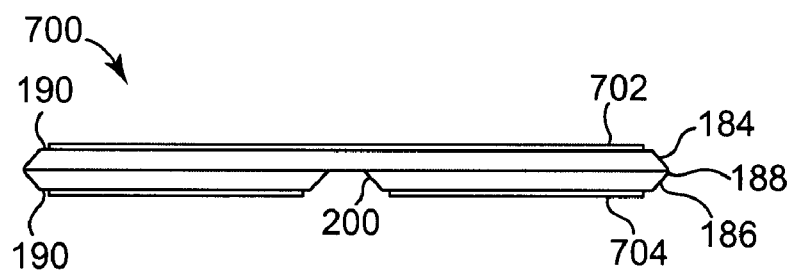
FIG. 45 illustrates a side view of the pillow of FIG. 44.

FIGS. 44 and 45 illustrate one embodiment of a pillow 700. Pillow 700 is configured for use similar to pillow 20 (e.g., FIG. 11) and similarly can be used as a connection pillow, a base pillow and/or a top pillow. Pillow 700 includes a first surface 702 and a second surface 704 that are sized similarly to one another and, in one embodiment, are each substantially planar and positioned opposite one another. Similar to pillow 20, pillow 700 includes first tapered edge 184 generally extending around and outwardly from first surface 702. A second tapered edge 186 generally extends around and outwardly from second surface 704 at least partially toward first surface 702 in a manner similar to how first tapered edge 84 extends from first surface 702. As such, perimeter edge 188 is formed between first and second tapered edges 184 and 186 opposite the respective surfaces 702 and 704. Edge 188 of pillow 700 is configured to interact with shells 12 in a similar manner as described with respect to pillow 20, for example, as illustrated in FIG. 12. In this manner, in one embodiment, pillow 700 also includes a setback 190 similar to that of pillow 20.

In one example, connection pillow 700 includes a hole 706 extending through a center thereof. Hole 706 is substantially similar to hole 192 described for connection pillow 20, however hole 706 is substantially larger than hole 192. In this manner, the amount of material used to form pillow 700 is substantially smaller than the amount of material used to form connection pillow 20. Connection pillow 700 also includes any number of additional features to contribute to the versatility of the connection pillow 700. In one example, connection pillow 700 includes a plurality of apertures 194 each positioned through a corner portion 195 of connection pillow 700. As described with respect to FIG. 11, each aperture 194 is configured to receive a connection pin or post of an accessory such as a support leg 196 (e.g., FIG. 15) or a caster 198 (e.g., FIG. 1).

In one example, pillow 700 also includes a slot 200 extending across a depth or width thereof and, therefore, across hole 706. Slot 200 is configured to receive a rail 62 of two adjacent shells (not shown) that are equal to or less than half a width of shell 12 or can be used similar to elongated pillow 212 to support two shells 12 above a larger shell 160 in a manner similar to that illustrated, for example, in FIGS. 13 through FIG. 15. In one embodiment, pillow 700 is used interchangeably with or as an alternative to pillow 14 (e.g., pillow 20, pillow 22 and/or pillow 24.) Other configurations or modifications to pillow 700 and/or pillow 14 will be apparent to those of skill in the art upon reading this application.

More on Accessories

Inserts

Figure 46:
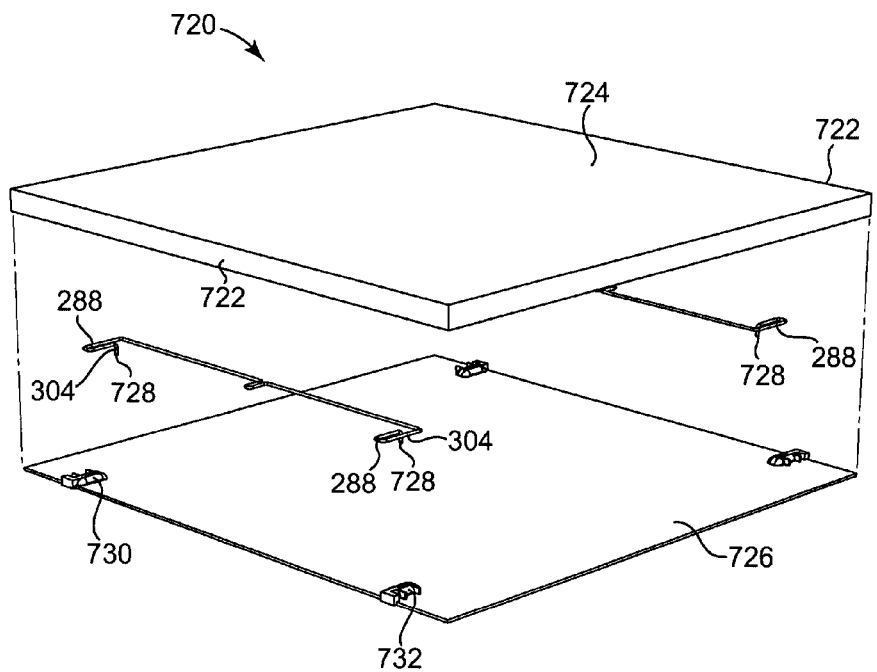
FIG. 46 illustrates an exploded perspective view of a shelf, according to one embodiment of the present invention.

FIG. 46 illustrates an exploded view of one embodiment of a shelf insert generally at 720. More specifically, shelf insert 720 is configured to fit within shell 12 (e.g., FIG. 2). Similar to insert 282 described with respect to FIG. 24, shelf insert 720 includes spring loaded clips 288 configured to interact with shell 12 to at least partially maintain shelf insert 720 in place relative to shell 12. More specifically, clips 288 extend outwardly from one or more of exposed or external edges 722 of shelf insert 720 and are configured to be received by grooves or notches 298 formed an internal surfaces 300 of shell 12 as generally illustrated in FIG. 2 to couple shelf insert 720 to shell 12.

More specifically, in one embodiment, shelf insert 720 is formed of a first member 724, which is generally planar, and a second member 726, which is generally planar and sized similarly to first member 724. Shelf insert 720 additionally includes at least one clip 728. At least one clip 728 is configured to be primarily maintained between first member 724 and second member 726 to define one or more clips 288 extending from shelf insert 720. More specifically, at least second member 726 defines a feature 730 configured to partially space second member 726 from first member 724 and additionally defining an aperture generally indicated at 732. Each feature 730 is positioned along external edges 722 of first member 724 and second member 726 in a manner configured to receive clip 728. For example, in one embodiment, clip 728 defines two protrusions or connection clips 288 on either end thereof.

A separate feature 730 is defined along an edge of second member 726 to receive each connection clip 288. In addition, portion 304 of clip member 728 fits through aperture 732 of each feature 730 to be accessible from an external portion of shell insert 720. In particular, clip member 728 is substantially enclosed between first member 724 and second member 726 such that only portion 304 extends through apertures 732 and is accessible to the consumer from an external portion of shelf insert 720. Additionally, connection clips 288 are configured to extend outside external edge 722 defined by shelf insert 720. In this manner, during use the consumer can interface with clip member 728, more specifically, portion 304 of clip member 728, to initiate retraction or extension of connection clips 288 further into or further away from external edge 722 depending upon whether shelf insert 720 is being positioned within shell 12 or removed from shell 12.

Since clip member 728 includes two connection clips 288 rigidly coupled to one another via a connection portion 734, moving a single portion 304 effectively moves two clips 288 relative to shelf insert 720. In one embodiment, clip member 728 is spring loaded such that connection clips 288 automatically retract when inward pressure, as generally indicated by arrow 302 in FIG. 24, is applied to connection clips 288. In other embodiments, clip member 728 must be otherwise manually manipulated to alter the extension of clips 288 from shelf insert 720.

Figure 47:
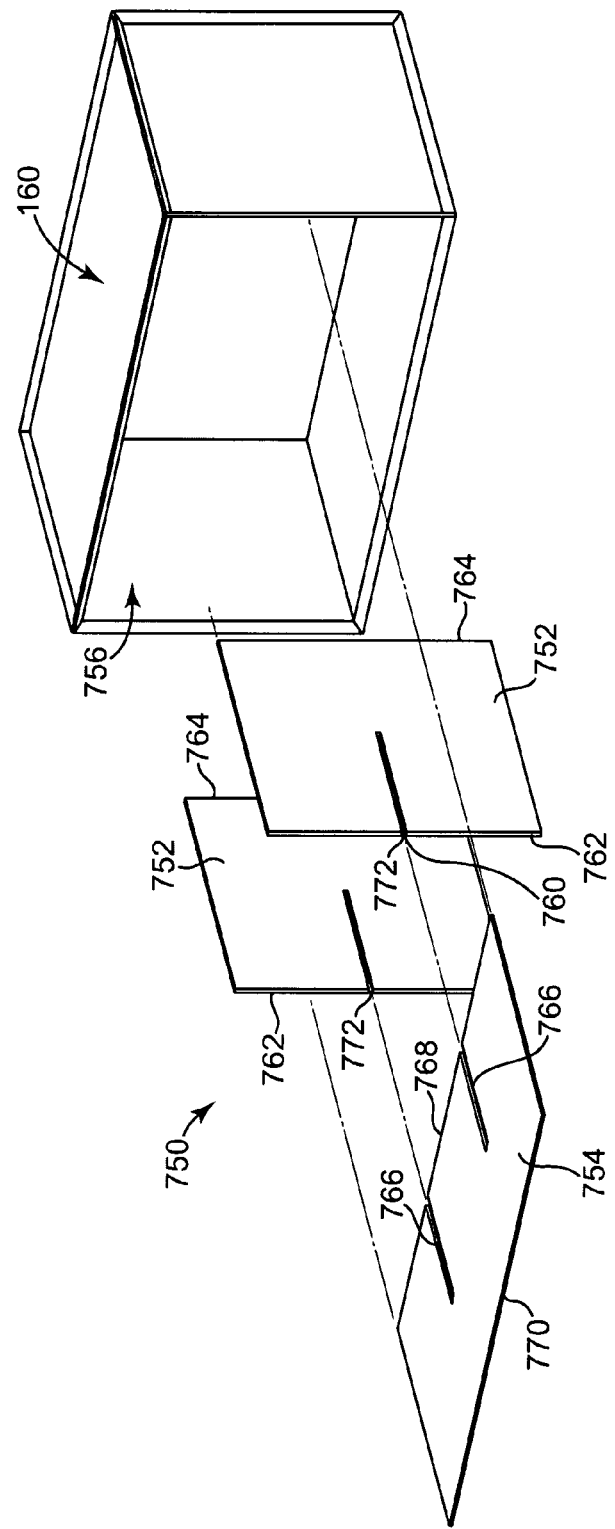
FIG. 47 illustrates an exploded perspective view of a shell and an insert, according to one embodiment of the present invention.

FIG. 47 generally indicates another embodiment of an insert at 750. In particular, in organization, it is desirable to provide a storage solution for shoes or other similarly sized items. As such, in one embodiment, insert 750 is specifically configured to transform shell 160, as specifically described with respect to FIG. 10 into a shoe rack. In one embodiment, insert 750 generally comprises a plurality of parts including two vertical members 752 and a horizontal member 754. Each vertical member 752 defines a height similar to that of an internal cavity 756 of shell 160. Similarly, horizontal member 754 is formed with a width substantially similar to the width of internal cavity 756 of shell 160. Each vertical member 752 defines a slot 760 extending from a front edge 762 thereof towards an opposite, back edge 764. In one embodiment, slot 760 extends substantially half way toward back edge 764. In one embodiment, slot 760 has a height sufficient to receive a thickness of horizontal member 754.

Horizontal member 754 defines two slots 766 extending from a rear edge 768 thereof at least partially toward front edge 770 of horizontal member 754 and spaced from one another. In one embodiment, slots 766 extend from rear edge 768 at least half way toward front edge 770. In one embodiment, each slot 766 has a width sufficient to receive the thickness of one of vertical members 752. As such, slots 766 are spaced from each other and extend parallel to one another so as to each be configured to receive a different one of vertical members 752.

Figure 48:
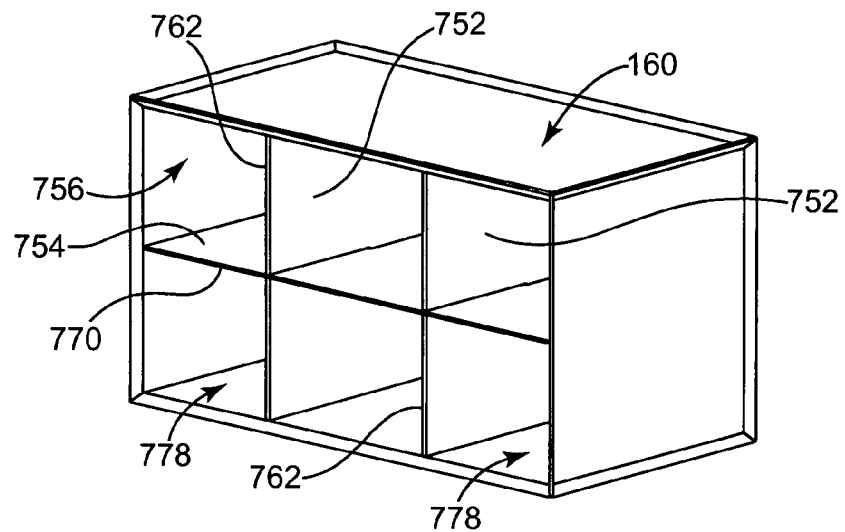
FIG. 48 illustrates a perspective view of the shell and the insert of FIG. 47.

Upon assembly, horizontal member 754 is slid toward vertical members 752 or vice-versa, such that slots 766 of horizontal member 754 are aligned with slots 760 of vertical members 752. Upon further sliding, members 752 and 754 are positioned relative to one another such that front end 772 of slot 766 is positioned substantially adjacent to front edge 770. In this manner, insert 750 is fully assembled and has an overall depth not greater than the overall depth of internal cavity 756 formed in shell 160. Assembled insert 750 is moved into internal cavity 756 of shell 160 to convert standard shell 160 into a shoe rack as generally indicated with additional reference to FIG. 48. More particularly, insert 750 is configured to divide internal cavity 756 of shell 160 into six separate sub-compartments 778.

In one embodiment, each sub-compartment 778 is generally configured to receive a pair of shoes, a shoe box or other similarly sized item(s). In other embodiments, depending upon the size of shell 160, more or less than six sub-compartments 778 may be formed and configured to receive shoes or similarly sized items. Furthermore, it should be understood that any inserts, including insert 750 may be configured to include clip member 728 and/or other clip 288 along outside edges thereof configured to interact with features inside internal cavity 756 of shell 160. Other modifications or alterations will also be apparent to those of skill in the art upon reading this application.

Figure 49:
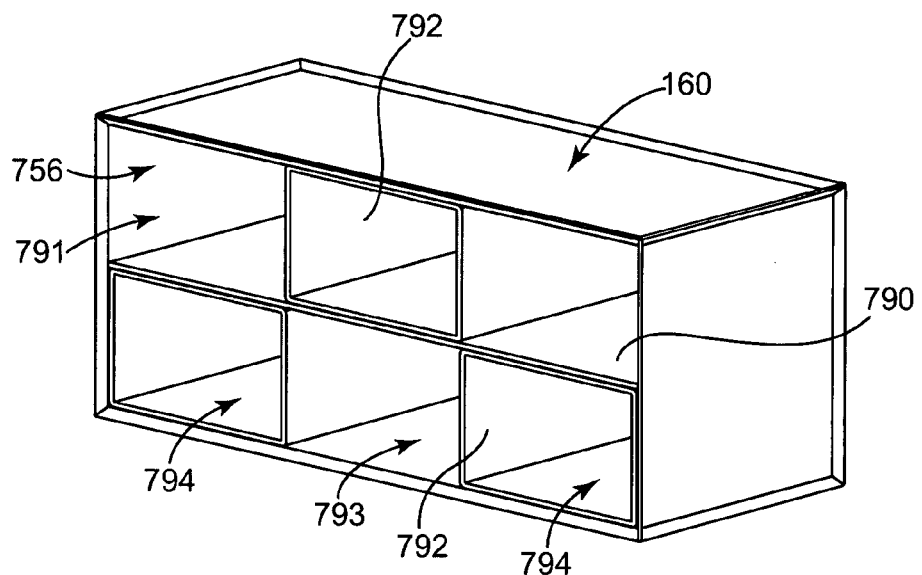
FIG. 49 illustrates a perspective view of a shell with an insert and a plurality of boxes, according to one embodiment of the present invention.

FIG. 49 illustrates one embodiment including an insert 790 and boxes 792 for converting shell 160 into a shoe rack or other similar structure. In this embodiment, insert 790, which is substantially similar to shelf insert 720 of FIG. 46 but elongated to extend across an entire width of internal cavity 756 of shell 160, is placed within internal cavity 756. More specifically, shelf insert 790 is positioned within internal cavity 756 to substantially divide internal cavity 756 into an upper half 791 and a lower half 793. Subsequently, a plurality of boxes 792 are provided. Each box 792 is configured to fit within either upper half 791 or lower half 793 of internal cavity 756. In particular, boxes 792 can be positioned in upper half 791 and/or lower half 793 of internal cavity 756 to further divide internal cavity 756 into small sub-compartments 794. Sub-compartments 794 are similar in size to compartment 778 defined with respect to FIG. 48. In this manner, shelf insert 790 and boxes 792 are an alternative means for converting shell 160 into a shoe rack or similar structure as an alternative to insert 750 of FIG. 48.

Figure 50:
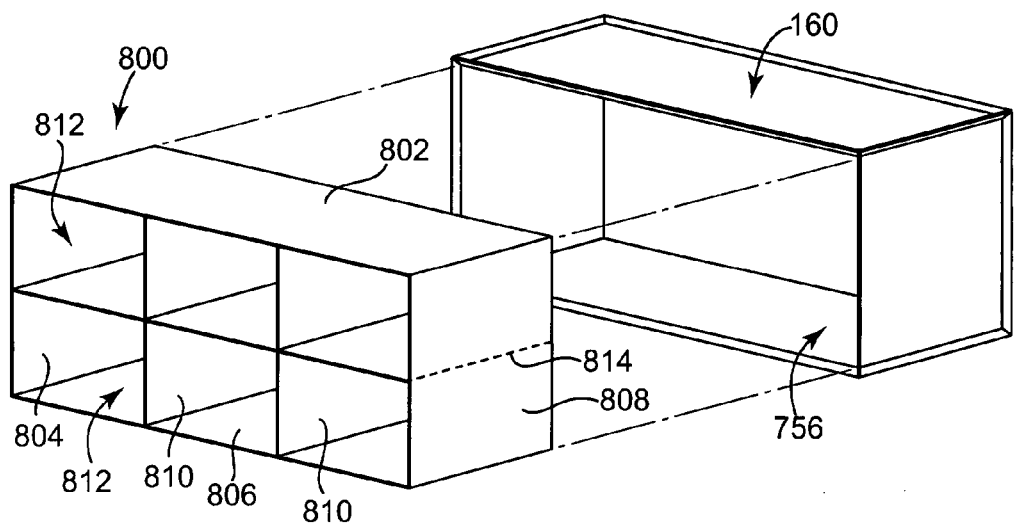
FIG. 50 illustrates an exploded perspective view of a shell and an insert, according to one embodiment of the present invention.

FIG. 50 illustrates one embodiment of an insert 800 configured to be positioned within shell 160 to convert shell 160 into a shoe rack or other similar storage configuration. Insert 800 includes a top wall 802, a first side wall 804, a bottom wall 806 and a second side wall 808 opposite first side wall 804. Top, side and bottom walls 802, 804, 806 and 808 are configured with respect to one another to form a rectangular member sized and shaped to be received with internal cavity 756 defined by shell 160. In addition, divider walls or internal walls 810 are provided between top, bottom and side walls 802, 804, 806 and 808 to divide an internal portion thereof into a plurality of cavities 812. As such, insert 800 can be easily slid into internal cavity 756 of shell 160 to divide internal cavity 756 into individual cavities 812.

Figure 51:
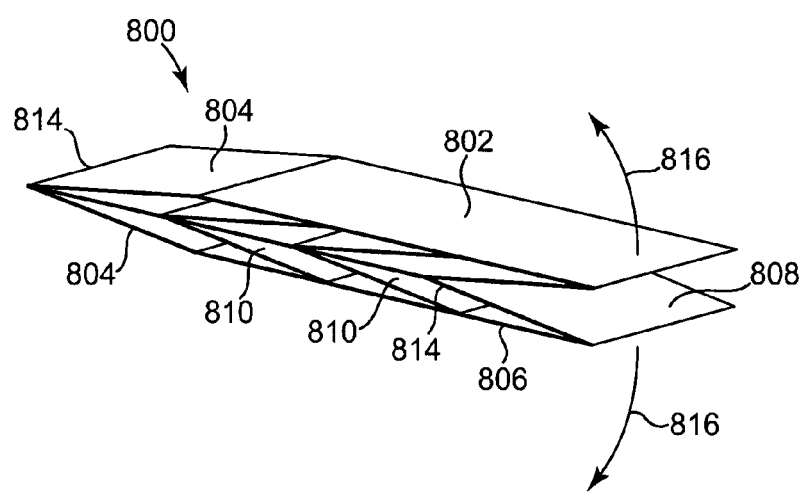
FIG. 51 illustrates a perspective view of the insert of FIG. 50 in a partially collapsed position.

In one embodiment, in order to facilitate storage and/or packaging of shelf insert 800, shelf insert 800 is configured for flat packing as generally indicated with respect to FIG. 51. For instance, in one embodiment shelf insert 800 is configured to be folded along a fold line 814 (generally indicated in FIG. 50) of side walls 804 and 808 as well as along lines of intersection between internal walls 810 such that shelf insert 800 is easily collapsed. Once flat packed, shelf insert 800 is easily restored to its upright position by applying force as generally indicated by arrows 816 in FIG. 51 to erect shelf insert 800. Once erected, shelf insert 800 can be slid into shell 160. Once positioned within shell 160, side walls 162, 164, 168 and 170 (e.g., FIG. 10) interact with shelf insert 800 to prevent inadvertent collapse of shelf insert 800 while it is positioned within shell 160. Other methods of flat packing any of the assemblies described herein will also be apparent to those of skill in the art upon reading this application.

Figure 52:
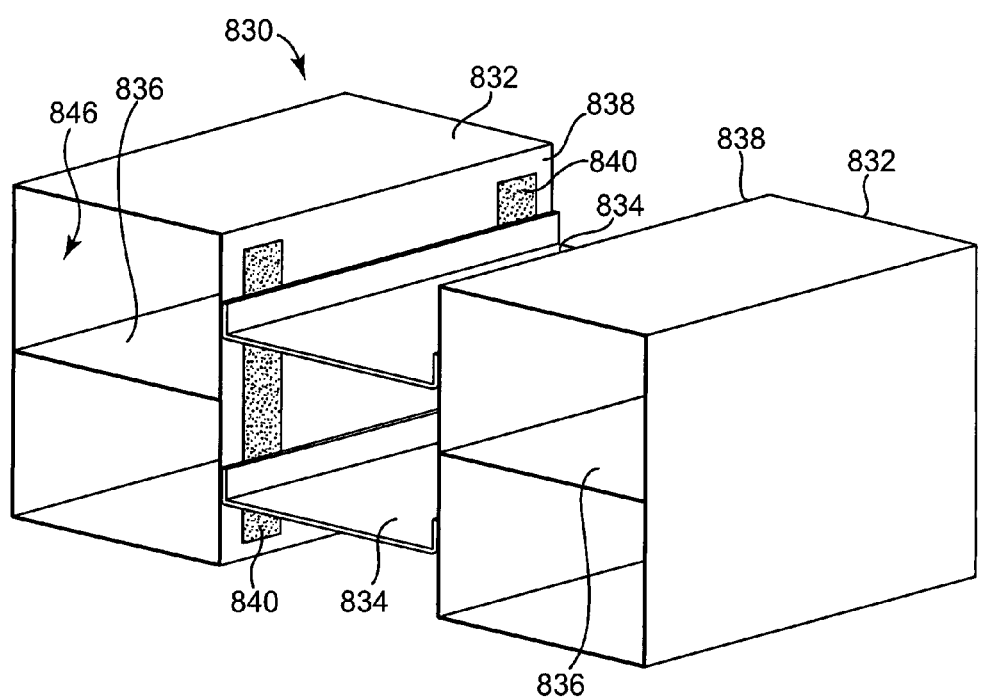
FIG. 52 illustrates a perspective view of an insert assembly for use with a shell, according to one embodiment of the present invention.

FIG. 52 illustrates one embodiment of an insert assembly 830 sized and shaped to be positioned within an internal cavity 756 (e.g., FIG. 50) to divide internal cavity 756 into a plurality of compartments 846, for example, compartments 846 sized to receive shoes, shoe boxes, etc. In particular, insert assembly 830 includes two boxes 832 and two intermediate shelves 834. Each box 832 is configured to have a similar height and depth as internal cavity 756. Each box 832 is generally rectangular and, in one embodiment, includes an internal shelf 836. An external surface 838 of each box 832 generally includes a Velcro, adhesive or other attachment strip 840 extending vertically on an external surface 838 thereof. In one embodiment, two attachment strips 840 are included on external surface 838 spaced from and extending substantially parallel to one another.

The external surfaces 838 of each box 832 including attachment strips 840 are positioned to face one another and boxes 832 are spaced from each other. More specifically, boxes 832 are spaced from each other a distance similar to that of shelves 834. Each shelf 834 has a first member extending between boxes 832 and side members extending either upward or downward therefrom and configured to interact with attachment strips 840. In particular, each side member 844 of shelves 834 includes an adhesive, Velcro or other feature configured to correspond with adhesive strip 840 such that the position of shelves 834 can be selectively altered as necessary anywhere along the height of attachment strips 840. Other methods of attaching shelves 834 between boxes 832 are also contemplated.

The overall insert assembly 830 is sized with a width, height and depth similar to that of internal cavity 756 such that insert assembly 830 is easily slid into internal cavity 756 of shell 160. As such, internal cavity 756 is divided into individual compartments such as compartment 846 generally indicated in FIG. 52, which are sized and configured to receive smaller items such as shoes, etc. Although specific embodiments for converting shell 160 into a shoe rack are described herein with respect to FIGS. 47-52 other methods of dividing shell 160 and/or shell 12 into a shoe rack or other divided compartment are also contemplated.

Drawer Units

Figure 53:
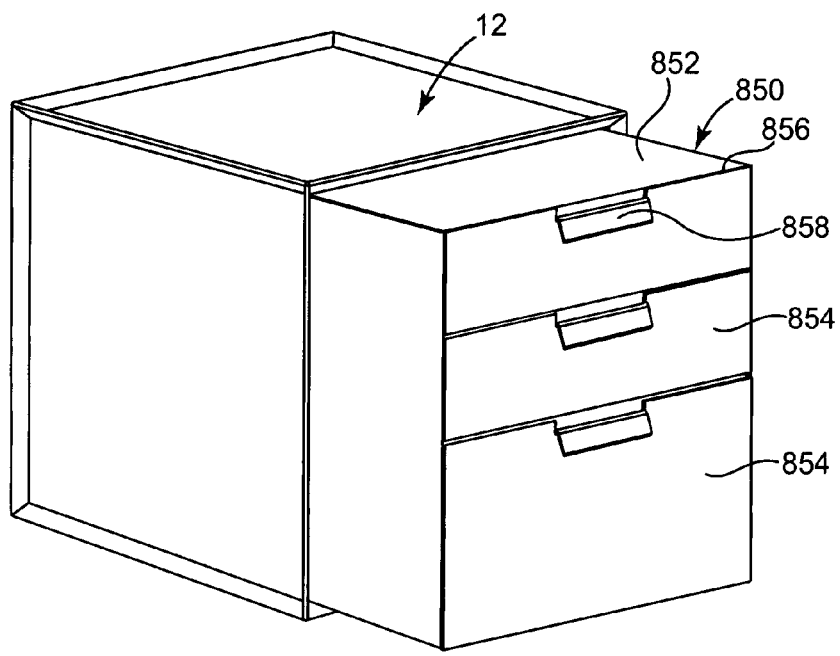
FIG. 53 illustrates a perspective view of a shell with a drawer unit, according to one embodiment of the present invention.

FIG. 53 illustrates one embodiment a drawer unit 850 configured to be inserted into shell 12. Drawer unit 850 provides a pre-assembled and separately purchasable drawer sub-unit specifically configured to fit within shell 12. Drawer unit 850 is thereby configured to have similar, but slightly smaller, outside dimensions as compared to the inside dimensions of storage chamber 54 (FIG. 2) of shell 12. More specifically, drawer unit 850 includes outside walls 852 defining the outside dimensions of drawer unit 850. Drawer unit 850 additionally includes one or more drawers 854 extending from a front portion 856 of drawer unit 850 and configured to be selectively slid into and out of shell 12 upon assembly. In one embodiment, each drawer 854 includes a handle 858, however, in other embodiments, no handle 858 is included. In this manner, drawer unit 850 provides an easy to assemble means for converting shell 12 into a specifically configured shell 12 including drawers 854. In one embodiment, drawer unit 850 is separately marketed for a specific modification of shell 12.

Figure 54:
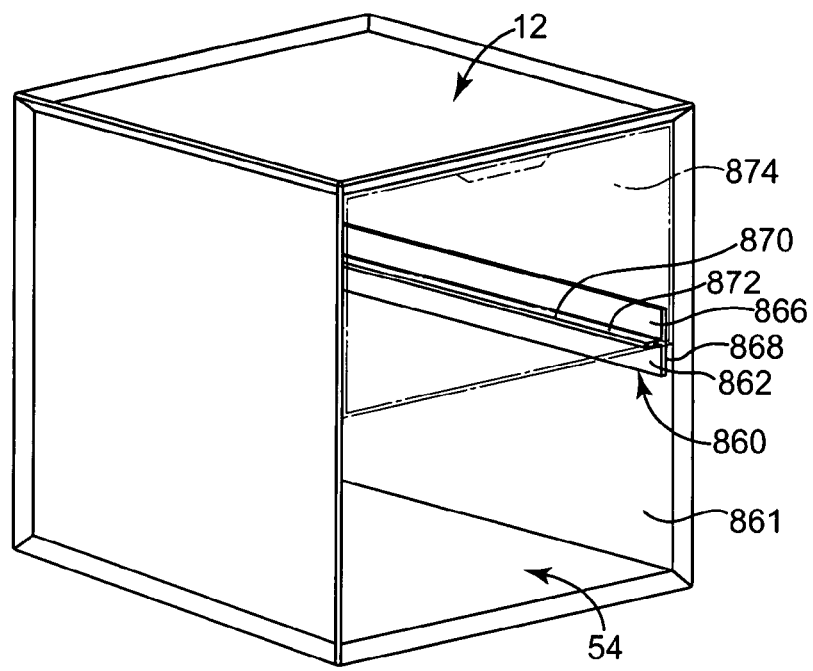
FIG. 54 illustrates a perspective view of a shell, a track and a drawer, according to one embodiment of the present invention.
Figure 55:
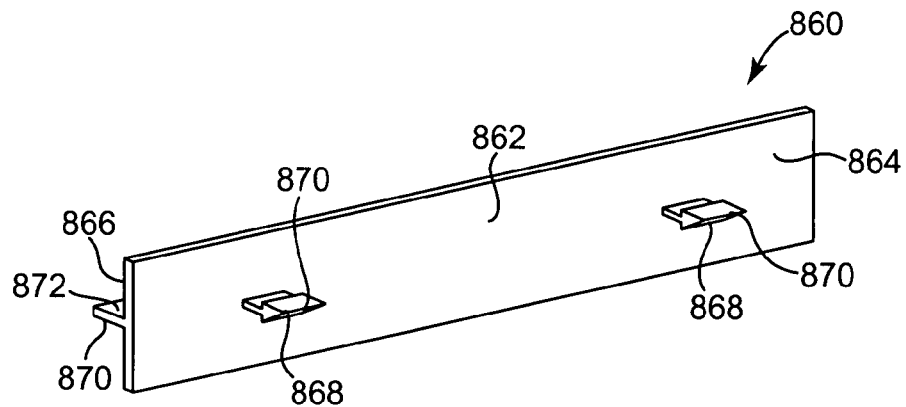
FIG. 55 illustrates a perspective view the track of FIG. 54.

However, other methods of converting shell 12 to include drawers are also contemplated. For example, referring to FIGS. 54 and 55, track members 860 are provided and are configured to be coupled with an internal portion 861 of shell 12. In particular, in one embodiment, track member 860 generally includes an elongated rectangular plate portion 862 having two generally planar and opposite surfaces 864 and 866. One or more protrusions 868 extend from first surface 864 away from second surface 866. Each protrusion 868 is configured to be received within a groove or notch 298 formed in internal surfaces 300 of shell 12 as generally indicated in FIG. 2. In one embodiment, each protrusion 868 has a triangularly shaped flange 870 configured to easily be inserted into a notch 298 and to generally prevent inadvertent removable of protrusions 868 from notches 298. As such, protrusions 868 are configured to facilitate snap coupling of track member 860 with shell 12.

A generally continuous and elongated flange 870 extends from second surface 866 of plate portion 862 with an orientation substantially perpendicular to that of portion 862. In one embodiment, flange 870 extends along an entire length of track member 860 or at least a substantial portion thereof. In other embodiments, flange 870 may be intermittently or otherwise formed. With this in mind, upon coupling of track member 860 to an internal surface 300 of side wall 52 via protrusions 868 and notches 298, flange 870 extends inward into storage chamber 54. A second and similar flange member (not shown) is generally installed on an opposite side wall 52 thereof such that flanges 870 of the two opposing members extend toward one another. As such, top surfaces 872 formed by flanges 870 are configured to slidably receive a drawer as generally indicated in hidden lines at 874 in FIG. 54. Use of track members 860 decreases the amount of material contacts between shell 12 and drawer 874 as compared to embodiments where a drawer is supported by a solid and continuous surface (such as a bottom, inside surface) of shell 12. Decreasing material contact decreases friction between drawer 874 and shell 12, which in one embodiment allows drawer 874 to more easily and/or smoothly slide in and out of shell 12. In one embodiment, top surfaces 872 are formed of a suitable material configured to facilitate repeated sliding of drawer 874 on top surfaces 872.

In one embodiment, a bottom portion of chamber 54 is left empty for storage of other items or alternatively, can be used to receive a second drawer (not shown). In one embodiment, track member 860 and drawer 874 are separately sold from each other and from shell 12. In another embodiment, two track members 860 and a drawer 874 are generally sold as a package for converting a standard shell 12 into a shell 12 having drawer 874.

Figure 56:
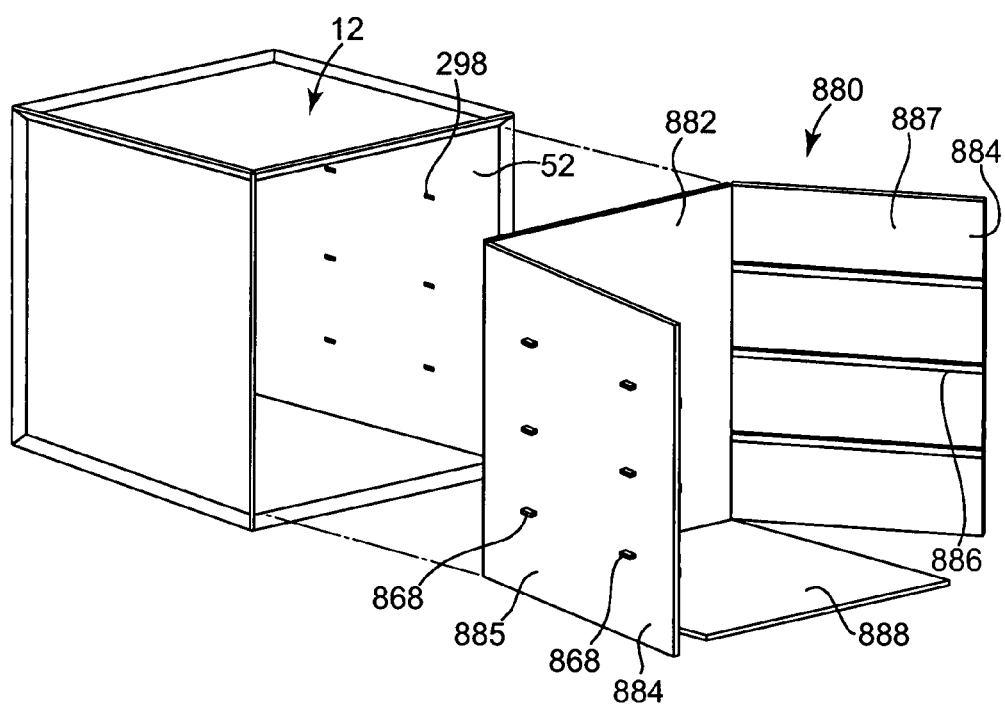
FIG. 56 illustrates an exploded perspective view of a shell with a drawer support unit, according to one embodiment of the present invention.

FIG. 56 illustrates yet another method of transforming a general shell 12 into a drawer assembly. In particular, a drawer support unit 880 is configured to be placed within shell 12 to form supports for receiving one or more drawers, such as drawer 874, 854, etc. (e.g., FIGS. 54 and 55). More specifically, drawer support unit 880 includes a back wall 882 and two side walls 884. Each side wall 884 extends from an opposite edge of back wall 882. Side walls 884 are each configured to interact with notches 298 inside shell 12. More specifically, an external surface 885 of each side wall 884 includes a plurality of protrusions 868 similar to those described with respect to FIGS. 54 and 55.

Protrusions 868 are positioned along side walls 884 to each interface with one of notches 298 defined by shell 12. In addition, each side wall 884 defines a flange 886 extending substantially perpendicular to an internal surface 887 of side wall 884. Each flange 886 is similar to flange 870 defined with respect to FIG. 55 and is configured to at least partially slidably support a drawer (e.g., drawer 854, 874, etc.).

Side walls 884 are generally rotatable relative to back wall 882. In this manner, when drawer support unit 880 is inserted into shell 12, back wall 882 in inserted first while side walls 884 are rotated slightly inward. Once fully inserted into shell 12, side walls 884 can be rotated outwardly to push each protrusion 868 into a respective notch 298 formed within shell 12. In this manner, protrusions 868 interface with notches 298 to couple and securely position drawer support unit 880 within shell 12. Once properly positioned, flanges 870 of opposite side walls extend towards one another, and, as such, are configured to collectively support a drawer as will be apparent to those of skill in the art upon reading the present application.

In one embodiment, drawer support unit 880 additionally includes one or more of a bottom or top wall 888 configured to provide additional stability to drawer support unit 880. In one embodiment, a bottom wall 888 is included having a decreased co-efficient of friction as compared to walls 52 of shell 12. In this manner, a drawer or other member fully interacting with bottom wall 888 is easily slid into and out of shell 12 and is not overly impeded due to friction caused by contact between the member and bottom wall 888.

It should be noted that both track members 860 and drawer support unit 880 are specifically configured to interface with and to utilize notches 298 already formed within shell 12 to receive other inserts such as inserts 720, 750, etc. In this manner, the single set of notches 298 can be used in multiple manners to customize shell 12 as desired by the consumer.

Figure 57:
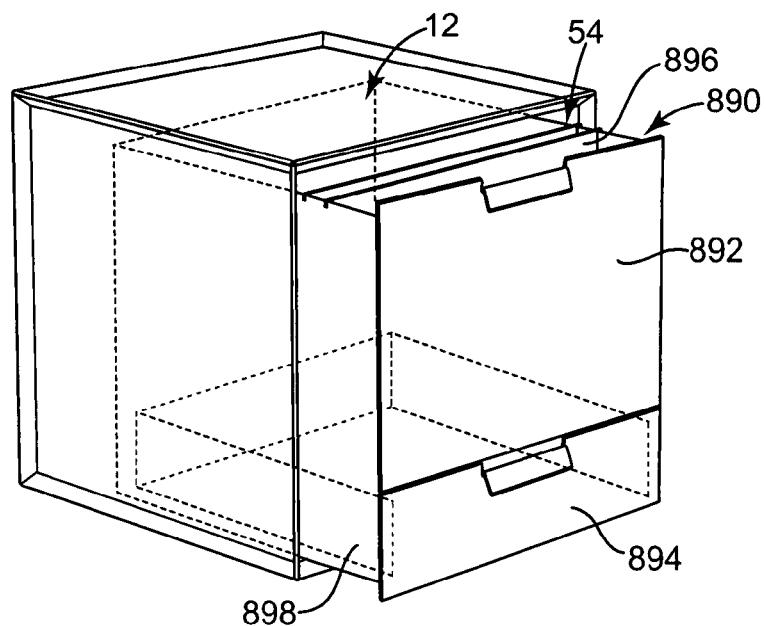
FIG. 57 illustrates a perspective view of a shell with a drawer unit, according to one embodiment of the present invention.
Figure 58:
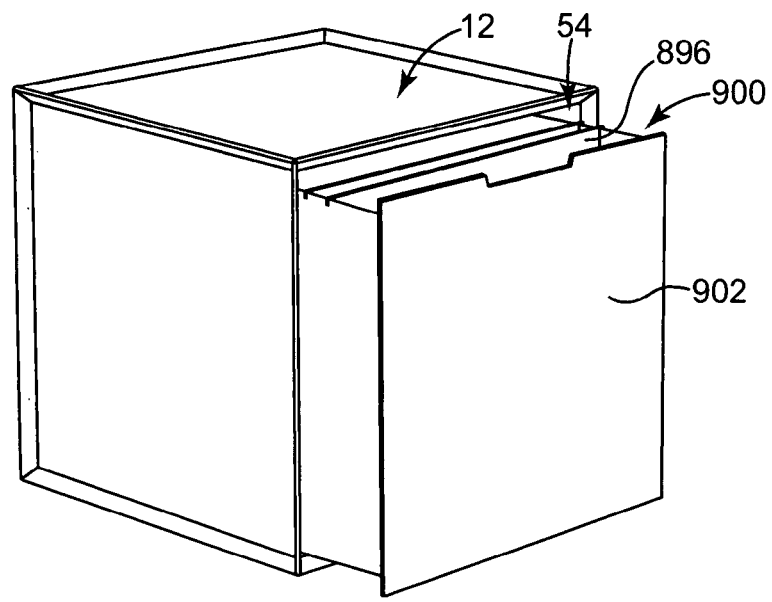
FIG. 58 illustrates a perspective view of a shell with a drawer unit, according to one embodiment of the present invention.

FIGS. 57-62 each illustrate additional embodiments of drawer units configured to be placed within standard shell 12. For example, FIG. 57 illustrates a drawer unit 890 including a primary drawer 892 and a secondary drawer 894 formed within a bottom portion 898 of primary drawer 892. More specifically, secondary drawer 894 is configured to be slid open and closed relative to primary drawer 892 and to move relative to shell 12 with primary drawer 892 as primary drawer 892 is opened and closed. In one example, primary drawer 892 is sized in a suitable manner to receive standard size or other suitable hanging files 896. In one embodiment, drawer unit 890 is configured to be purchased as a single assembly that is easily slid into and received by shell 12, more particularly, chamber 54 of shell 12. FIG. 58 illustrates a drawer unit 900, which is similar to drawer unit 890 (FIG. 57), but with a single drawer 902 and no secondary drawer 894 (FIG. 57) formed therein. Drawer unit 900 is sized and shaped to be slid directly into and to substantially fill chamber 54 of shell 12.

Figure 59:
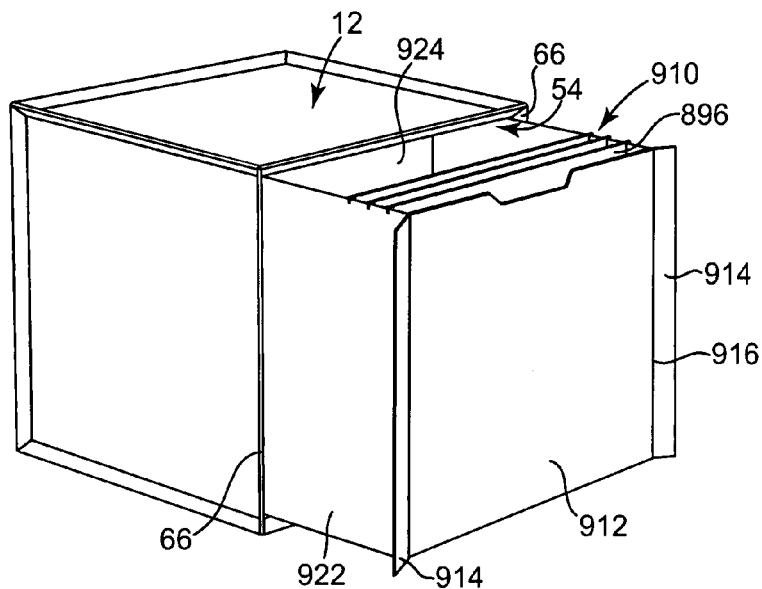
FIG. 59 illustrates a perspective view of a shell with a drawer unit, according to one embodiment of the present invention.

FIG. 59 illustrates one embodiment of a single drawer unit 910 configured to be slid into and to substantially fill chamber 54 of shell 12. In one embodiment, drawer unit 910 is sized and otherwise configured to receive hanging files 896. In one example, drawer unit 910 defines a front face 912 and two side fins 914 extending therefrom. Each side fin 914 extends along a side edge 916 of front face 912 away from front face 912. Fins 914 are sized to at least partially hide corresponding side rails 66 of shell 12. As such, fins 914 contribute to a more smooth overall appearance of an assembly including shell 12 and drawer unit 910.

Figure 60:
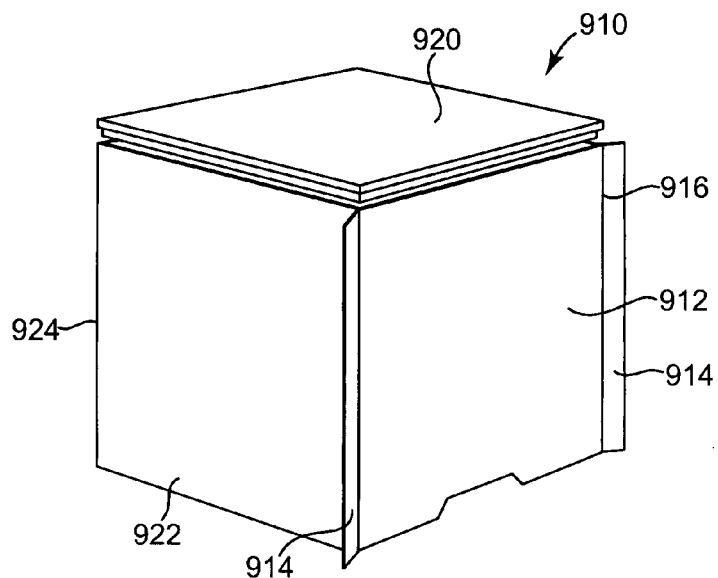
FIG. 60 is an inverted partially exploded view of the drawer unit of FIG. 59.

Additionally referring to FIG. 60, in one embodiment, drawer unit 910 is configured to be flat packed for storage when not in use. In one specific example, drawer unit 910 includes a main body 918 and a bottom 920. Main body 918 includes front face 912, fins 914, side faces 922 and a rear face 924. Faces 912, 922 and 924 are configured to flex relative to one another such that main body 918 can be collapsed for flat packing for example, in a similar manner as described with respect to main shell body 70 as illustrated in FIG. 7. When removed for storage and configured for use, main body 918 is squared or expanded into a non-collapsed position and bottom 920 is coupled thereto. Bottom 920 is configured to hold main body 918 in a square position during use. Main body 918 and bottom 920 may be selectively or permanently coupled to one another in any suitable manner, such as snap fit, adhesive, rivets, etc.

Figure 61:
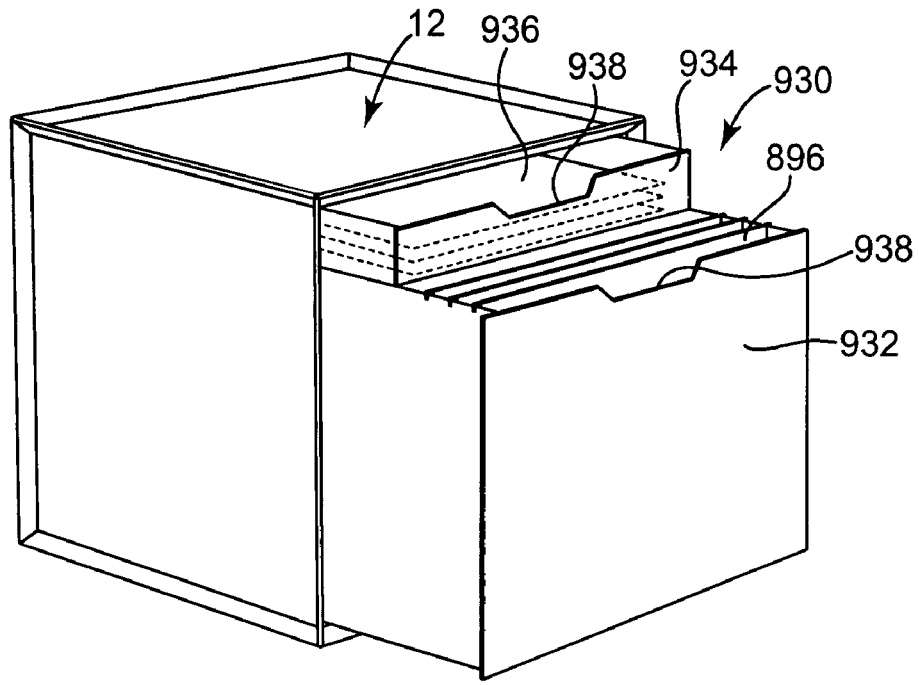
FIG. 61 illustrates a perspective view of a shell with a drawer unit, according to one embodiment of the present invention.
Figure 62:
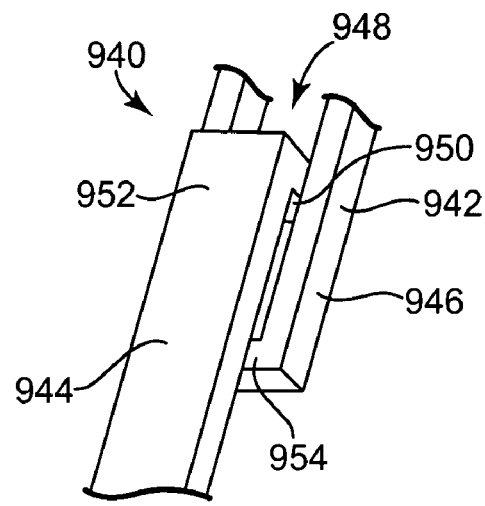
FIG. 62 illustrates a partial perspective view of a track and a slider of the shell and drawer unit of FIG. 61.

FIG. 61 illustrates a drawer unit 930 configured to be slid into and to substantially fill chamber 54 (e.g., FIG. 2) of shell 12. Drawer unit 930 includes a primary drawer 932 and a secondary drawer 934 stacked with respect to primary drawer 932. Each drawer 932 and 934 is configured to be separately opened and closed relative to shell 12. In one embodiment, primary drawer 932 is sized and otherwise configured to receive hanging files 896, and secondary drawer 934 is sized and configured to receive a stack 936 of letter sized papers. In one example, each drawer 932 and 934 includes a notch 938 or other handle (not shown) to facilitate the consumer in grasping and opening/closing drawers 932 and 934.

While any of the drawers described above may be slid directly into and out of shell 12 and interact therewith out any rails, tracks, etc., in one embodiment, shell 12 and the respective drawer include complimentary components 940 to facilitate moving shell 12 relative to a drawer and vice versa. For example, referring to FIGS. 61 and 62, in one embodiment, shell 12 includes a track 942 inside chamber 54 thereof configured to interact with a corresponding member 944 defined by drawer 932. Track 942 defines an elongated rectangular member 946 defining an elongated opening 948 therein. Corresponding member 944 is elongated and defines a protrusion 950 near an end 952 thereof.

When drawer unit 930 is positioned within shell 12, corresponding member 944 is positioned just above track 942 such that member 944 and track 942 extend and are aligned with one another and extend in a substantially parallel manner relative to each other. More specifically, protrusion 950 is received within opening 948. As drawer 932 is slid relative to shell 12, protrusion 950 slides back and forth within opening 948 as a guide providing for smoother movement of drawer 932 relative to shell 12. In one example, elongated rectangular member 946 includes a stop 954 at an end thereof, which interacts with protrusion 950 of drawer 932 to prevent drawer 932 from being inadvertently pulled all the way out of shell 12. Similar tracks and corresponding members can be used with any of the drawers described herein. In addition, tracks and corresponding members may be include on the bottom and/or the sides of the respective drawers as will be apparent to those of skill in the art.

Figure 63:
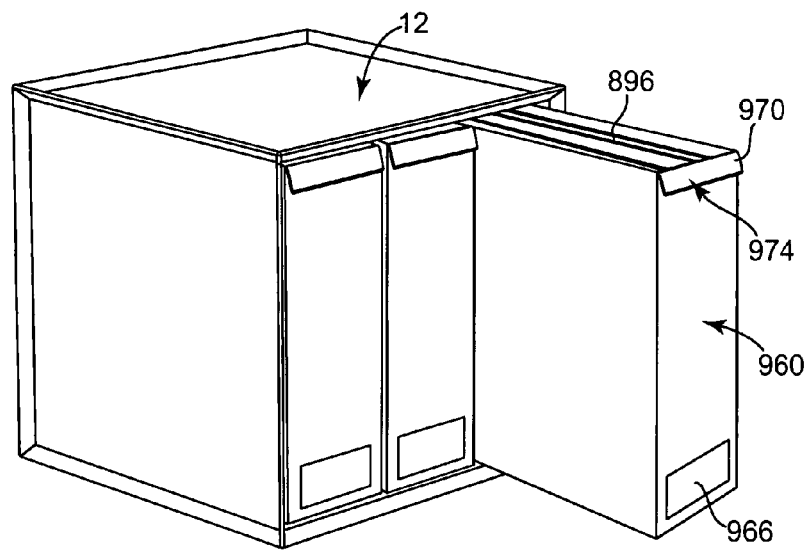
FIG. 63 illustrates a perspective view of a shell with a plurality of storage boxes, according to one embodiment of the present invention.
Figure 64:
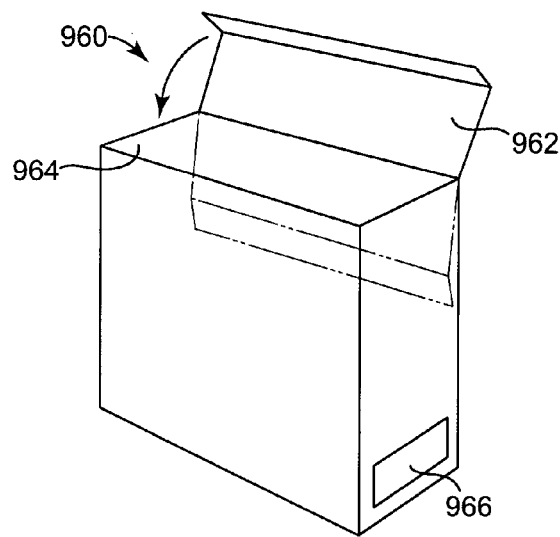
FIG. 64 illustrates a perspective view of one of the storage boxes of FIG. 63.

FIG. 63 illustrates one embodiment of shell 12 customized with a plurality of boxes 960. In one embodiment, each box 960 is sized and shaped to hold hanging files 896. Additionally referring to FIG. 64, box 960 includes an integrated lid 962 extending from a top portion thereof. Lid 962 is configured to cover an opening 964 of box 960 during storage within shell 12 or during storage outside of shell 12 to protect hanging files 896 or other contents stored therein. As such, box 960 is versatile for use with shell 12 or without shell 12. In one example, lid 962 is rotatable relative to a remainder of box 960 is configured to be rotated into box 960, as indicated in dashed lines, to move lid 962 out of the way, for example, during periods of regular use of the contents within box 960. In one embodiment, each box 960 includes a label 966, such as an adhesive label, removable card label, etc.

In one embodiment, the plurality of boxes 960 are sized and shaped to allow three of the plurality of boxes 960 to fit within shell 12 collectively substantially fill chamber 54 (e.g., FIG. 2) of shell 12. Each of the plurality of boxes 960 is configured to be slid into and out of chamber 54. When one of the plurality of boxes 960 is pulled out of shell 12, the remainder of the plurality of boxes 960 act as counterbalances, which decrease or prevent shell 12 from tipping or otherwise becoming unstable as the one box 960 is pulled from shell 12.

Figure 65:
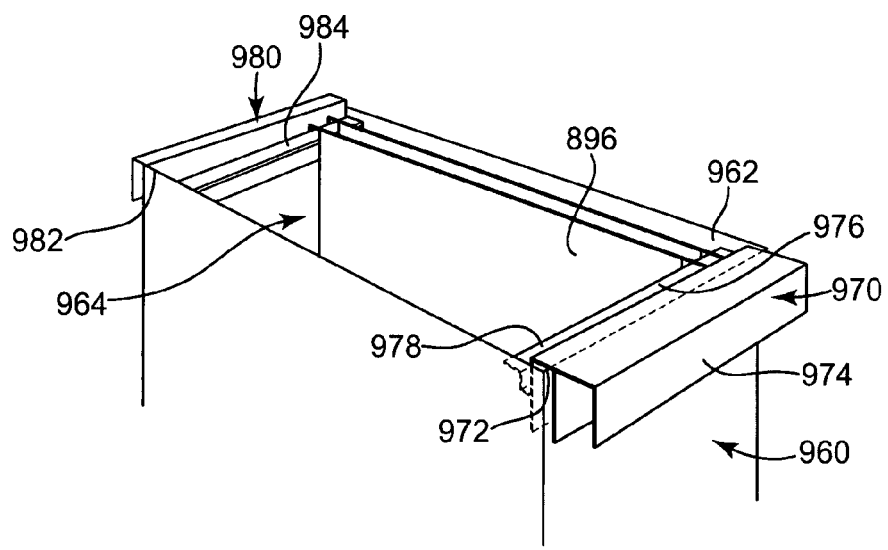
FIG. 65 illustrates a perspective view of a portion of one of the storage boxes of FIG. 62 with side handles and hanging file folders, according to one embodiment of the present invention.

As illustrated with additional reference to FIG. 65, in one embodiment, a first support member 970 is configured to be slid over a front edge 972 of opening 964. First support member 970, more particularly, includes a handle portion 974 and an internal support portion 976. Handle portion 974 extends outside of each box 960 and provides for the consumer interface configured to facilitate handling, more specifically, pulling of box 960 into and out of shell 12. Internal support portion 976 extends into box 960 and defines a ledge 978 configured to receive and support one side of hanging files 896 being stored in box 960. In one example, first support member 970 has a width substantially equal to the width of each box 960.

A second support member 980 is configured to be slid over a rear edge 982 of opening 964 and defines a ledge 984 similar to ledge 978 of first support member 970 to receive and support the opposite side of hanging files 896 being stored in box 960. As such, box 960 with support members 970 and 980 is configured to store and support hanging files 896 such that hanging files 896 can slide along ledges 978 and 984 with each box 960. In one example, second support member 980 has a width substantially equal to the width of each box 960.

Trays

Figure 66:
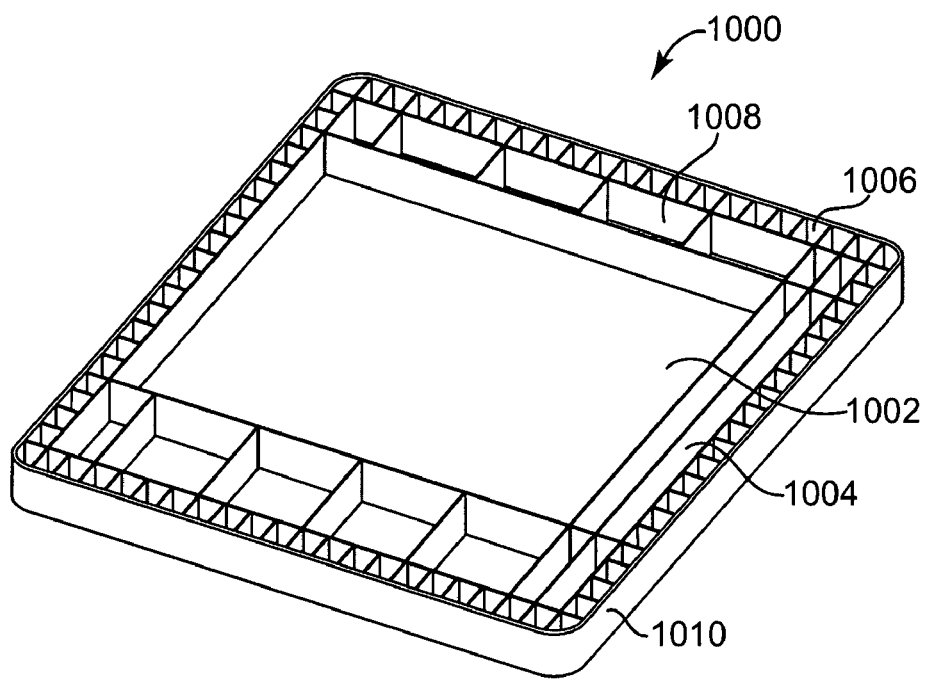
FIG. 66 illustrates a perspective view of a tray, according to one embodiment of the present invention.
Figure 67:
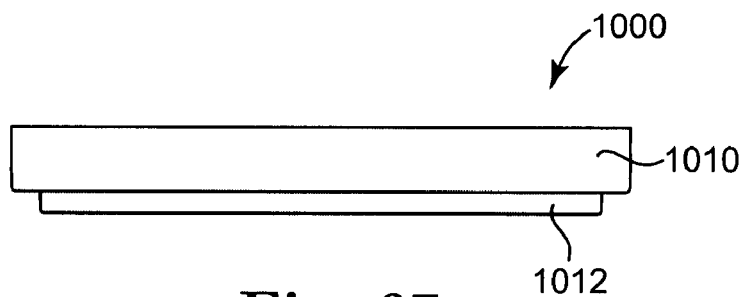
FIG. 67 illustrates a side view of the tray of FIG. 66.

FIGS. 66 and 67 respectively illustrate a perspective view and a side view of one embodiment of a tray 1000 configured to fit on shell 12 nested at least partially between rails 62 (e.g., FIG. 2). Tray 1000 includes a large compartment 1002 sized to receive standard letter-sized (i.e., 8.5" by 11") paper, long thin compartments 1004 to receive mail or similarly sized items, small compartments 1006 to receive writing utensils (e.g., pens, pencils, etc.) in a vertical orientation and other compartments 1008 for various other office supplies, etc. Tray 1000 defines an outer overall perimeter profile 1010 that mimics an outer profile of shell 12 to create a clean appearance when tray 1000 is stacked on shell 12. Tray 100 includes a lower extension portion 1012 configured to fit within top external recess 65 (e.g., FIG. 2) of shell 12, which securely and selectively maintains tray 1000 in place relative to shell 12. In one embodiment, tray 1000 is configured such that multiple trays 1000 can securely be stacked upon one another.

Figure 68:
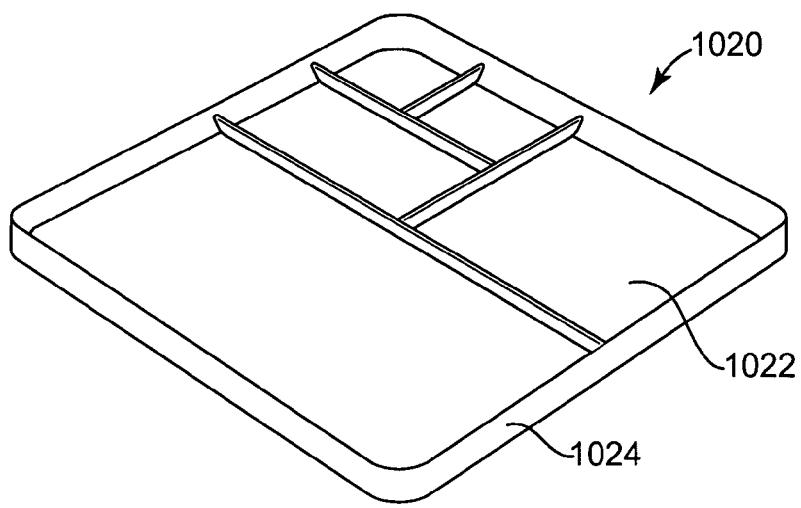
FIG. 68 illustrates a perspective view of a tray, according to one embodiment of the present invention.
Figure 69:
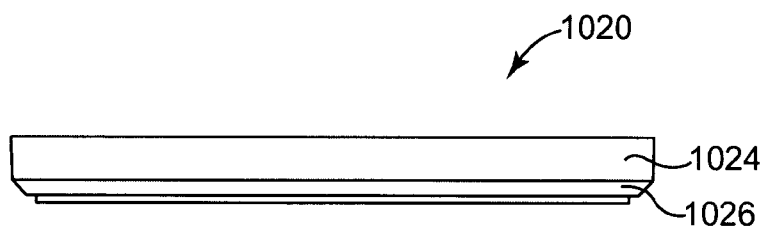
FIG. 69 illustrates a side view of the tray of FIG. 68.

FIGS. 68 and 69 respectively illustrate a perspective view and a side view illustration of one embodiment of a tray 1020 configured to fit on shell 12 and to nest at least partially between rails 62 surrounding a top of shell 12 (e.g., FIG. 2). Tray 1020 is configured to be a multi-purpose tray and defines a plurality of compartments for maintaining various items as desired by the consumer. Tray 1020 defines an outermost profile 1022 that mimics an outer profile of shell 12 and a lower extension portion 1026 configured to fit within top external recess 65 (e.g., FIG. 2) of shell 12. As such, tray 1020 securely nests within recess 65 between upper rails 62 of shell 12.

Figure 70:
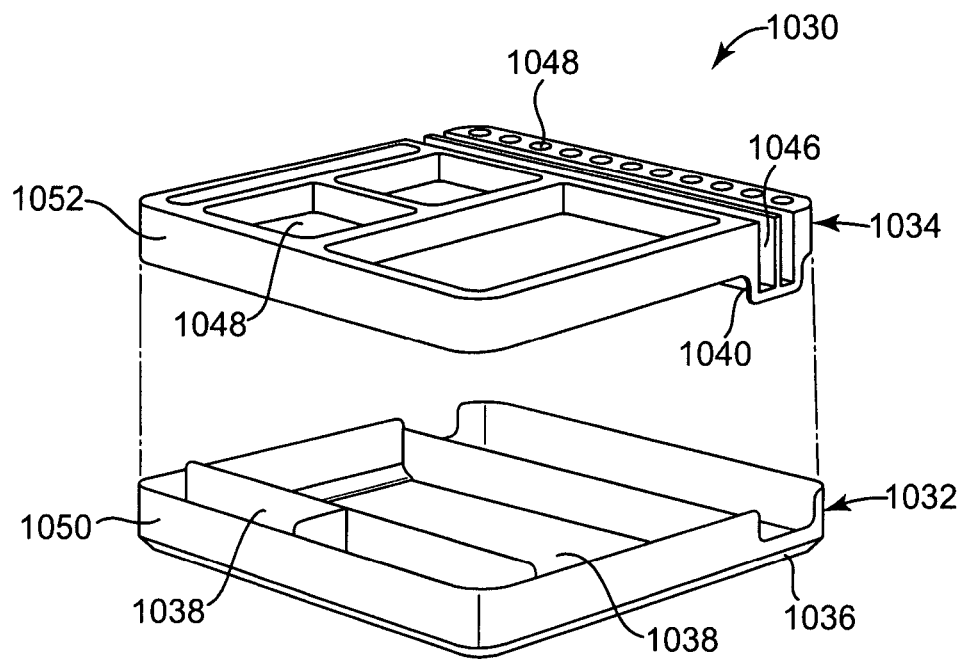
FIG. 70 illustrates an exploded perspective view of a tray assembly, according to one embodiment of the present invention.
Figure 71:
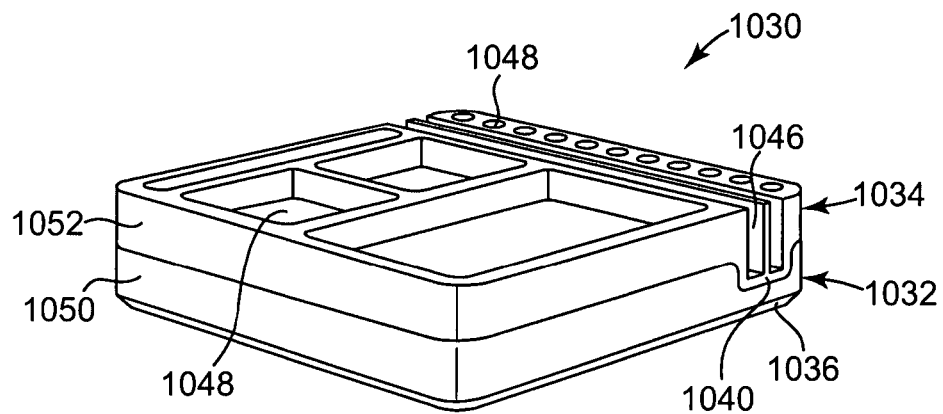
FIG. 71 illustrates a perspective view of the tray assembly of FIG. 70.

FIGS. 70 and 71 respectively illustrate an exploded perspective view and a non-exploded perspective view of a tray assembly 1030 including a first tray 1032 and a second tray 1034. First tray 1032 includes a lower portion 1036 configured to nest within recess 65 of shell 12 and defines an outer profile that mimics an outer profile of shell 12. A plurality of compartments 1038 of various shapes and sizes are defined by first tray 1032. Second tray 1034 is configured to be stacked on and to partially nest with first tray 1032. For example, second tray 1034 includes a portion 1040 that extends below a bottom 1042 of the remainder of second tray 1034 and is configured to fit within a cut-out portion 1044 of first tray 1032 as illustrated in FIG. 71. As such, first and second trays 1032 and 1034 are aligned and nested with each other. When trays 1032 and 1034 are nested together, items that are stored within compartments 1038 of first tray 1032 are covered or enclosed between trays 1032 and 1034. Other corresponding extensions/cut-outs formed by first and second trays 1032 and 1034 are also contemplated to assist in securely stacking two trays together. In one embodiment, additional trays are configured to be stacked or nest together.

In one example, second tray 1034 defines one or more mail slots 1046 within portion 1040 such that mail slots 1046 can be formed with a depth greater than a depth of other compartments 1048 defined by first tray 1032. The other compartments 1048 can be of any suitable size and shape to hold loose office supplies, paper, writing utensils, tools, devices, etc. In one embodiment, first and second trays 1032 and 1034 have similar outer perimeters 1050 and 1052, respectively, which mimic an outer perimeter of shell 12.

Figure 72:
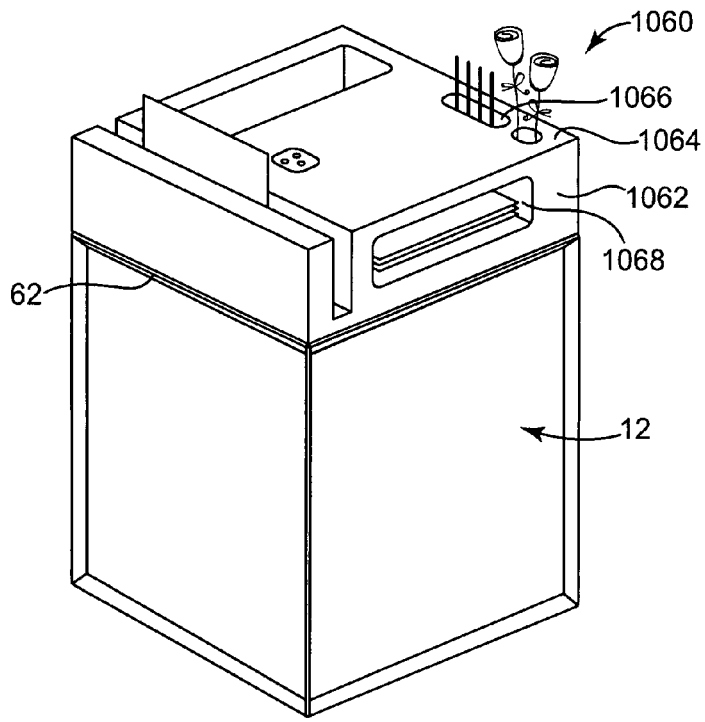
FIG. 72 illustrates a perspective view of a shell with a tray, according to one embodiment of the present invention.

One embodiment of a tray 1060 is illustrated coupled with shell 12 in FIG. 72. Tray 1060 defines a front face 1062 and a top surface 1064 extending generally perpendicular to top surface 1064. Compartments 1066, 1068 and 1069 are defined by tray 1060 for receiving various items. More specifically, front compartments 1066 are open to front face 1062 of tray 1060, top compartments 1068 are open to top surface 1064 of tray 1060 and compartments 1069 are open to both front face 1062 and top surface 1064 of tray 1060. In one embodiment, tray 1060 is configured to partially fit between rails 62 of shell 12 in any suitable manner as will be apparent to one of skill in the art upon reading this application to selectively secure tray 1060 to shell 12.

Figure 73:
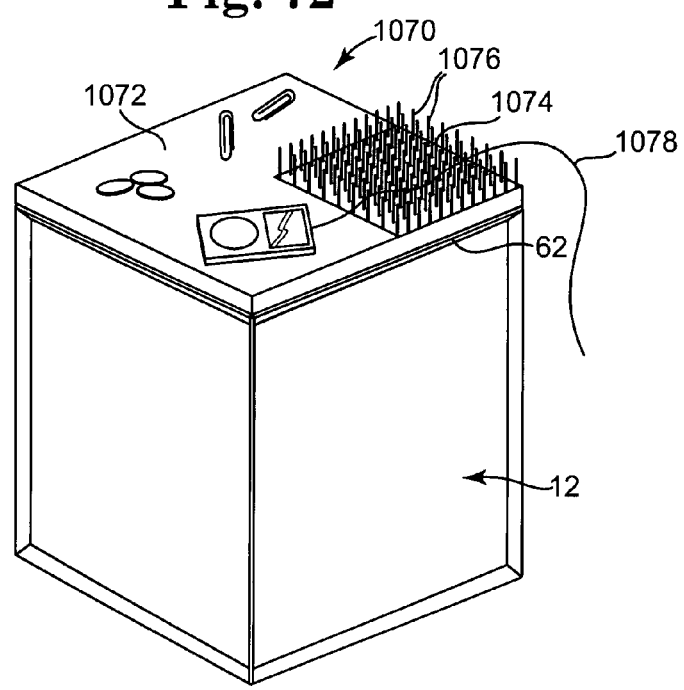
FIG. 73 illustrates a perspective view of a shell with a tray, according to one embodiment of the present invention.

FIG. 73 illustrates a tray 1070 nested between rails 62 of shell 12. Tray 1070 defines a substantially planar top surface 1072 for supporting various items and a pegged portion 1074 extending upwardly therefrom. Pegged portion 1074 may include a plurality of individual pegs 1076 extending from top surface 1072 in an array. Each peg 1076 may be rigid or may be relatively flexible such that pegs 1076 are configured to hold items such as letters in an upright position, to hide phone or other device cords 1078, etc. In one example the plurality of pegs 1076 is similar relatively long artificial grass. In one example, each peg 1076 is rigidly formed of plastic, wood, structural foam, etc.

Figure 74:
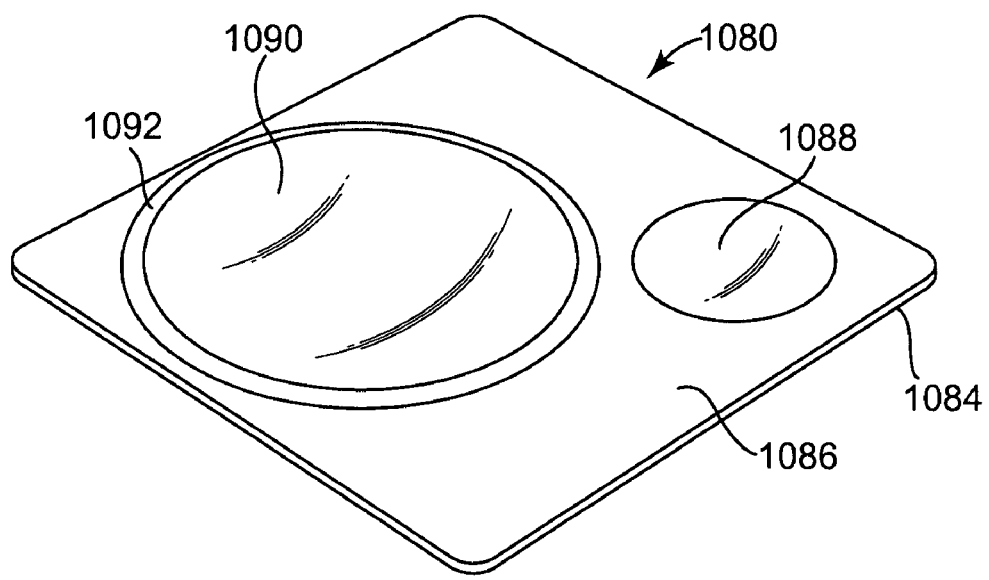
FIG. 74 illustrates a perspective view of a tray, according to one embodiment of the present invention.
Figure 75:
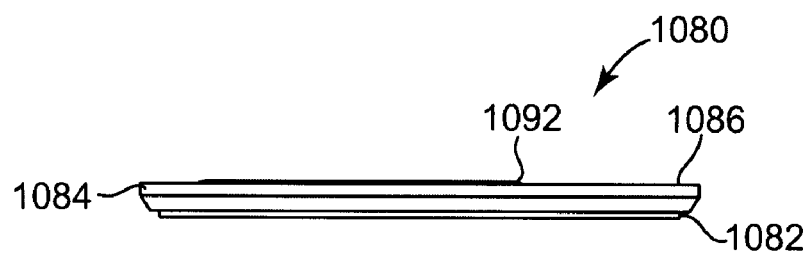
FIG. 75 illustrates a side view of the tray of FIG. 74.

FIGS. 74 and 75 respectively illustrate a perspective view and a side view of one embodiment of a tray 1080. Tray 1080 includes a lower portion 1082 configured to nest within recess 65 of shell 12 (e.g., FIG. 2) and defines an outer profile 1084 that mimics the outer profile of shell 12. Tray 1080 defines a substantially planar top surface 1086, a first compartment 1088 and a second compartment 1090. First compartment 1088 extends from top surface 1086 into tray 1080 in a dome or bowl-like manner. Second compartment 1090 is formed similar to first compartment 1088; however, second compartment 1090 extends slightly above top surface 1086. A rim 1092 surrounds second compartment and provides a transition from a top of compartment 1088 to top surface 1086. In one embodiment, only one of first compartment 1088 and second compartment 1090 are included in tray 1080. In one embodiment, other compartments (not shown) are also included in tray 1080 in addition to first compartment 1088 and/or second compartment 1090.

Although specific examples of trays are described above, it should be understood that various other trays or trays substituting or combining the features of any of trays or tray assemblies 1000, 1020, 1030, 1060, 1070 and 1080 described above are also contemplated for personalizing shell 12 for a particular use or particular uses. In one embodiment, trays and/or tray assemblies 1000, 1020, 1030, 1060, 1070 and 1080 are formed of single piece construction (e.g., by injection molding or other forming) or are formed of composite piece construction. Trays and/or tray assemblies 1000, 1020, 1030, 1060, 1070 and 1080 can be formed of plastic, structural foam, wood, laminate, acrylic, steel, aluminum or any other suitable material.

Bins

FIGS. 76-79 illustrate one embodiment of a bin 2000 sized to fit within a shell 12. It should be understood, that while primarily described as being sized to fit within shell 12, in other embodiments, bin 2000 can be altered as would be apparent to one of skill in the art upon reading this application to fit within a corresponding shell of any size, such as shell 160 or shell 270 as illustrated with additional reference to FIGS. 1 and 23. In one embodiment bin 2000 is substantially similar to bin 34 (e.g., FIG. 30) except for those differences specifically enumerated herein. Bin 2000 includes side walls or side panels 2002 extending from a bottom 2004 of bin 2000 and coupled with one another to define a storage cavity 2006 therebetween. In one embodiment, side panels 2002 are arranged in a generally rectangular configuration. In one example, side panels 2002 gradually taper outwardly as they extend from bottom 2004 to a top opening 2008 in bin 2000.

In one example, bin 2000 additionally includes a rim 2010 and a flange 2012. Rim 2010 extends from side panels 2002 around a perimeter of top opening 2008 in a direction substantially parallel to bottom 2004 of bin 2000. Flange 2012 extends downwardly from and around rim 2010 opposite side panels 2002. Rim 2010 and flange 2012 add to the rigidity and strength of bin 2000. In one embodiment, cutouts 2014 are formed by flange 2012 such that flange 2012 does not extend above rim 2010 in the areas of cutouts 2014. In this manner, cutouts 2014 are configured to receive portions of lids or other members as will be further described below. In one embodiment, two cutouts 2014 are defined by flange 2012 opposite one another.

In one embodiment, elongated or otherwise suitably formed indentations 2016 are formed in bottom 2004 of bin 2000. Each indentation 2016 is configured to facilitate receipt of a divider 2018 (e.g., FIGS. 81 and 82) or other item configured to customize bin 2000. In one example, each indentation 2016 defines a protrusion 2017 as viewed from a vantage point external to bin 2000. In one embodiment, each indentation 2016 is substantially linear and/or indentations 2016 are linearly aligned with one another along bottom 2004 of bin 2000. In one example, indentations 2016 are longitudinally aligned with one another and are laterally centered on bottom 2004 of bin 2000.

In one example, feet 2022 are defined to extend from an external surface 2024 of bottom 2004. Feet 2022 are sized and shaped in any suitable manner and are configured to facilitate stacking of a plurality of bins 2000 as will be further described below. In one embodiment, one foot 2022 is positioned near each corner of bottom 2004. In one example, all feet 2022 are similarly sized in shaped. In one example, at least one of feet 2022 is sized and shaped similar to a trademark or other identifying feature associated with a brand, retail logo, etc. as generally shown at 2024 in FIG. 85.

Additionally referring to the detail view of FIG. 80, in one embodiment bin 2000 defines a reception slot 2030 extending into cavity 2006 from rim 2010. Reception slot 2030 is configured to facilitate coupling and reception of a divider 2018 (e.g., FIGS. 81 and 82) configured to divide cavity 2006 into two or more compartments. Slot 2030 defines a cutout 2032 extending from rim 2010 into side panel 2002 of bin 2000. In one embodiment, cutout 2032 includes a first portion 2034 and a second portion 2036. First portion 2034 extends from rim 2010 downwardly into side panel 2002. Second portion 2036 extends from first portion 2034 opposite rim 2010 further into side panel 2002. In one example, second portion 2036 is narrower than first portion 2034 and is laterally centered with respect to first portion 2034. Reception slot 2030 additionally defines a small chamber 2038 extending radially outwardly from cutout 2020. In one embodiment, reception slot 2030 is one of two or more reception slots 2030 (e.g., a pair of reception slots 2030) wherein two of the reception slots 2030 are positioned opposite one another relative to cavity 2006 and/or top opening 2008 of bin 2000. In one example, two reception slots 2030 and indentations 2016 are position along a common transverse plane extending through bin 2000.

FIG. 81 illustrates one embodiment of a divider 2018 similar to divider 374 (e.g., FIG. 47) except for those differences explicitly enumerated herein. Divider 2018 includes a main panel 2040 sized to fit within and extend across cavity 2006 of bin 2000. In one embodiment, a rim 2042 extends around a substantial portion of main panel 2020, which, in one example, is substantially planar, with a larger width than main panel 2020 to add to the overall rigidity and strength of divider 2018. In one embodiment, tabs 2044 extend from a bottom section 2046 of rim 2042 in a direction substantially parallel to main panel 2020. Each tab 2044 is sized and positioned to be received by one of indentations 2016 of bin 2000. In one embodiment, the interaction between tabs 2044 and indentations 2016 registers divider 2018 in a position within bin 2000 and also more securely maintains divider 2018 in place relative to bin 2000.

A hook 2048 extends from or, more specifically, curls outwardly and downwardly from each upper corner of rim 2042. Each hook 2048 is configured to be selectively received by slot 2030 of bin 2000 to selectively couple divider 2018 with bin 2000. In one embodiment, as illustrated with additional reference to the detailed view of FIG. 82, each hook 2048 include a rib 2050 extending inwardly from an outermost portion of the corresponding hook 2048. Each rib 2050 is laterally centered on hook 2048 and is configured to be received by second portion 2036 of cutout 2032 when divider 2018 is placed within bin 2000 such that the remainder of hook 2048 is received by first portion 2034 of cutout 2032. In this manner, rib 2050 contributes to a more secure and robust selective coupling between divider 2018 and bin 2000. In one embodiment, divider 2018 is permanently coupled with bin 2000.

Figure 83:
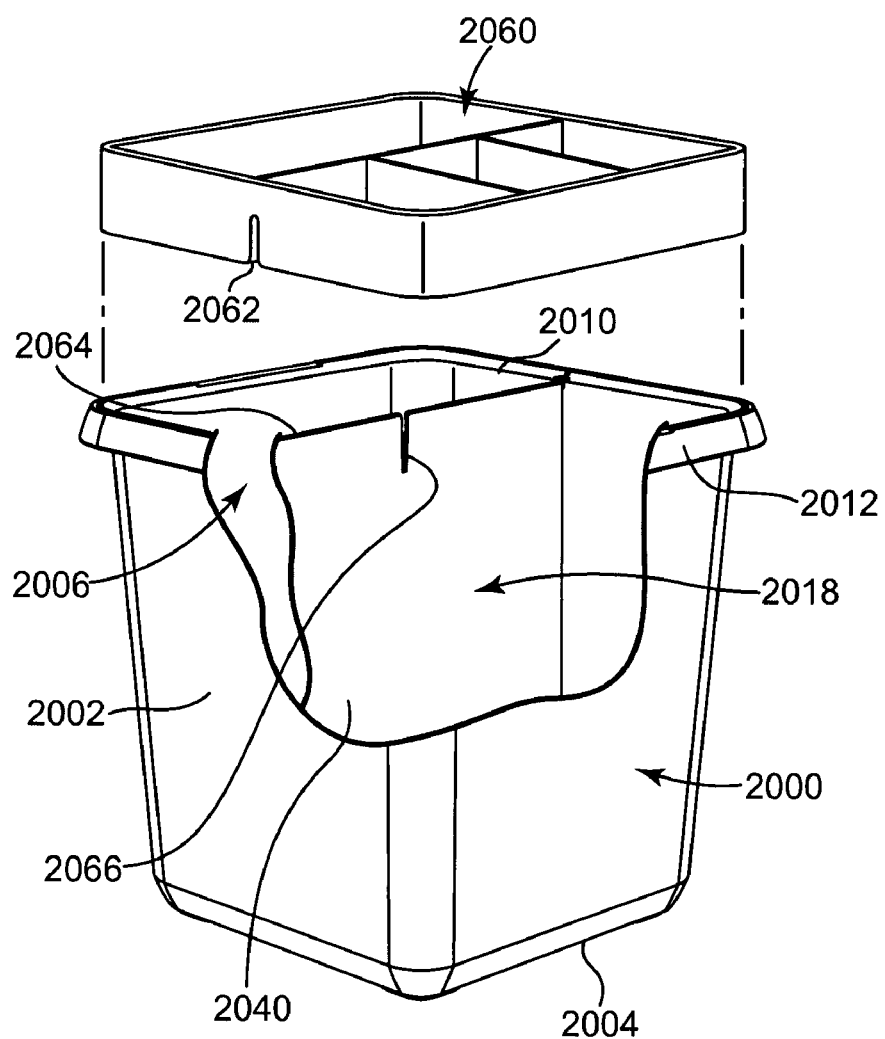
FIG. 83 illustrates a perspective view of a bin and a tray, according to one embodiment of the present invention.

As illustrated in FIG. 83, in one embodiment, bin 2000 and divider 2018 are used with a tray 2060 similar to tray 376 (e.g., FIG. 30). In one example, given the height of divider 2018 in bin 2000, tray 2060 includes a groove 2062 laterally extending through a bottom portion of tray 376 that is sized and shaped to receive a top edge 2064 of divider 2018. In this manner, tray 2060 fits partially down and around main panel 2040. In one embodiment, divider 2018 additionally or alternatively includes a slot 2066 extending downwardly from top edge 2064 and configured to receive a portion of tray 2060 to facilitate placement of both divider 2018 and tray 2060 within cavity 2006 of bin 2000.

Figure 84:
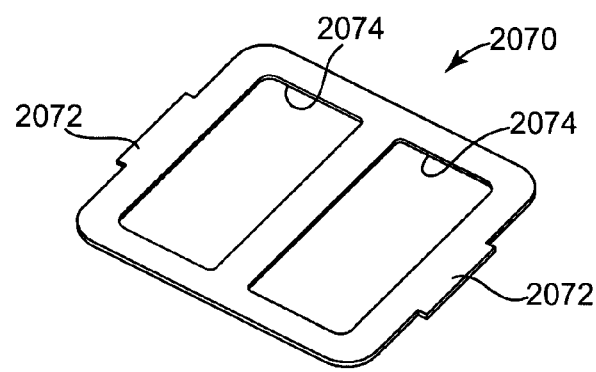
FIG. 84 illustrates a perspective view of a lid for the bin of FIG. 76, according to one embodiment of the present invention.
Figure 85:
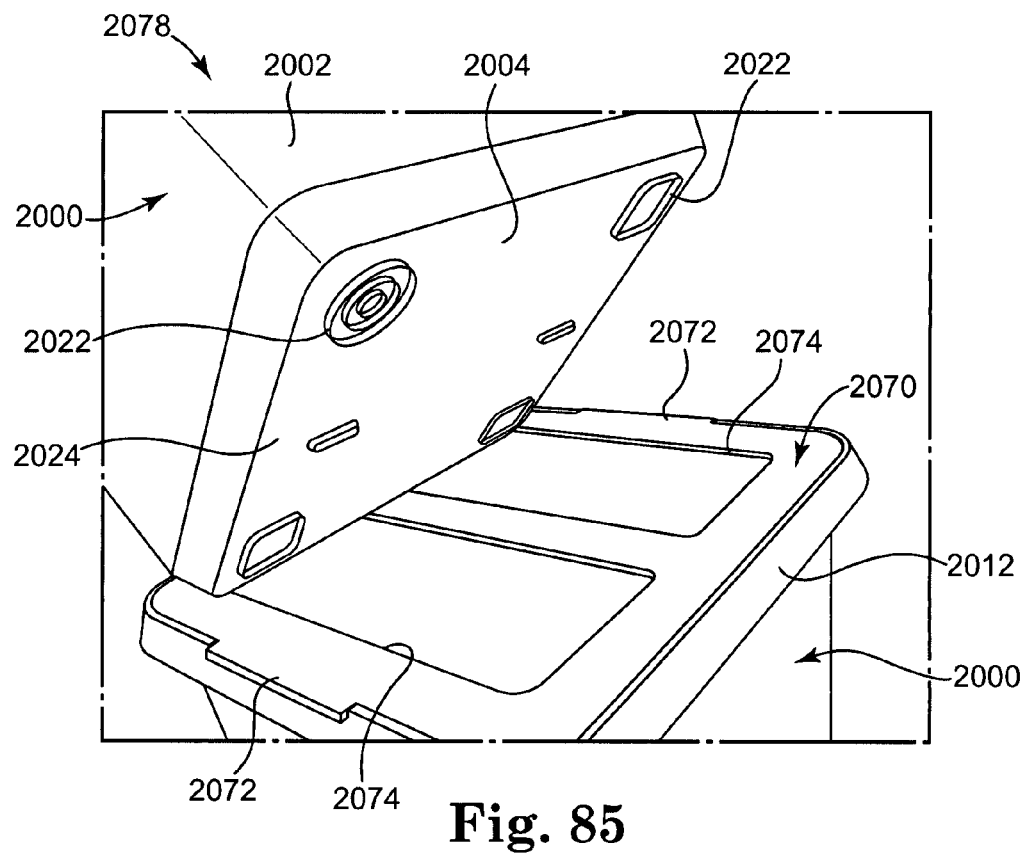
FIG. 85 illustrates a perspective view of two adjacent bins being stacked, according to one embodiment of the present invention.

Referring to FIG. 84, in one example, a lid 2070 is provided for covering bin 2000 similar to lid 390 (e.g., FIG. 31). In one embodiment, lid 2070 includes planar protrusions 2072 extending from the remainder of lid 2070 and/or defines indentations 2074 in a top thereof. Lid 2070 fits over bin 2000 such that lid 2070 sits on rim 2010 and planar protrusions 2072 are received by cutouts 2014 in bin 2000. In one embodiment, indentations 2074 of lid 2070 on a first bin 2000 are sized to at least partially receive feet 2022 of a second bin 2000 stacked on first bin 2000 as illustrated in FIG. 85. In particular, in one example, each foot 2022 interacts with a corner of a corresponding indentation 2074 to decrease shifting of second bin 2000 relative to first bin 2000, which, in turn, decreases the likelihood that a resultant stack 2078 of bins 2000 will topple over or otherwise become substantially unstable.

Figure 76:
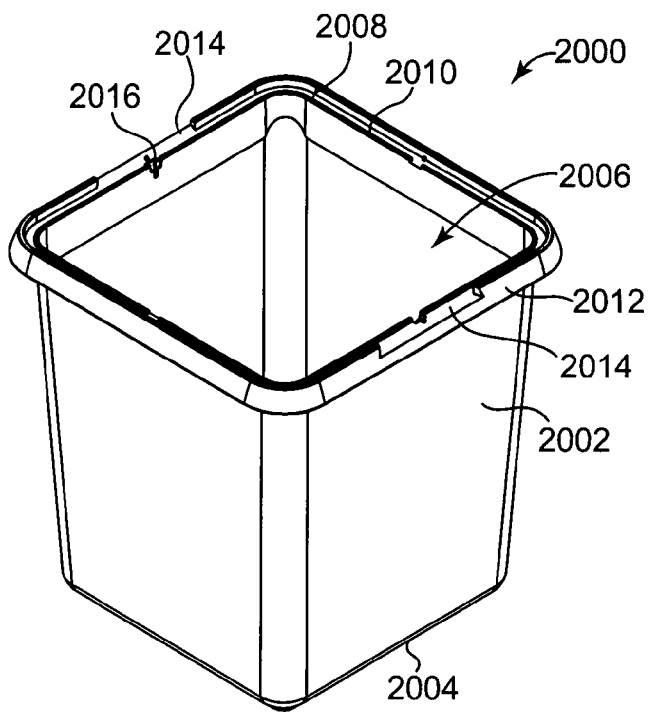
FIG. 76 illustrates a perspective view of a bin, according to one embodiment of the present invention.
Figure 77:
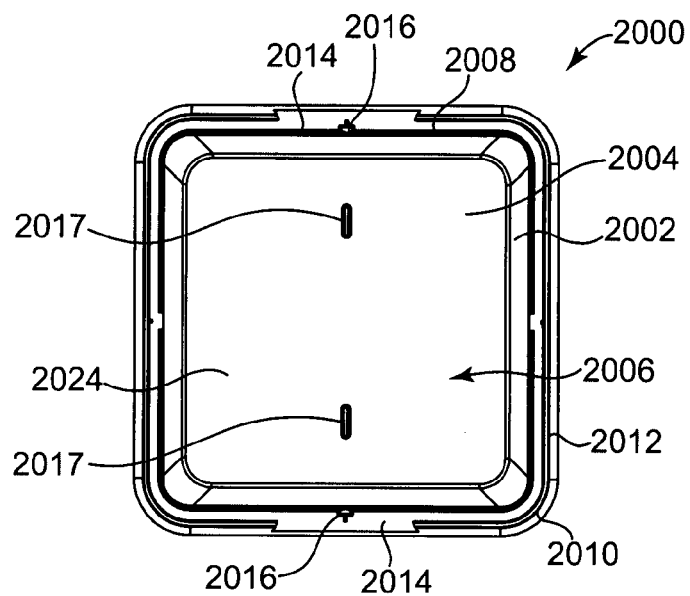
FIG. 77 illustrates a top view of the bin of FIG. 76.
Figure 78:
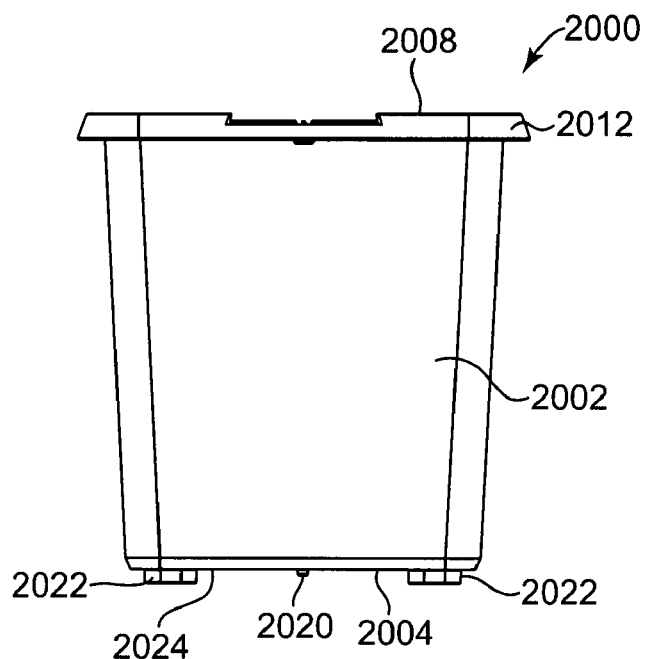
FIG. 78 illustrates a side view of the bin of FIG. 76.
Figure 79:
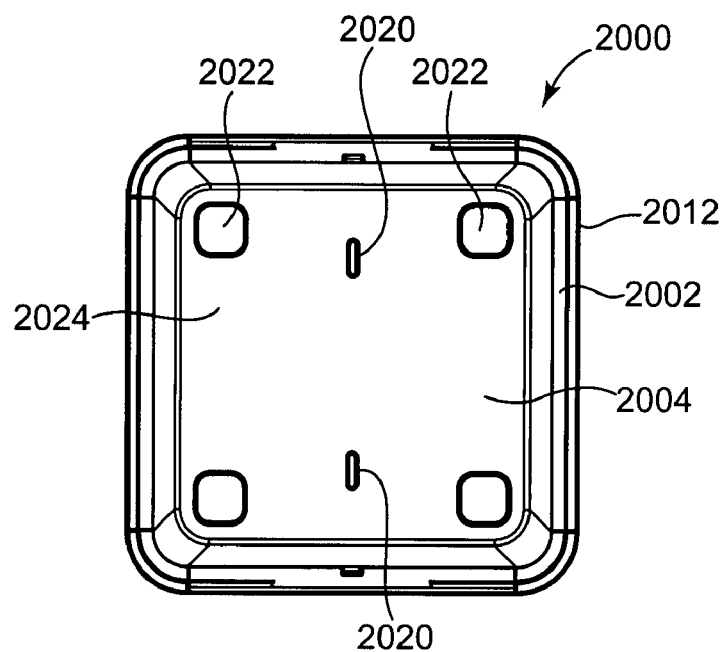
FIG. 79 illustrates a bottom view of the bin of FIG. 76.
Figure 86:
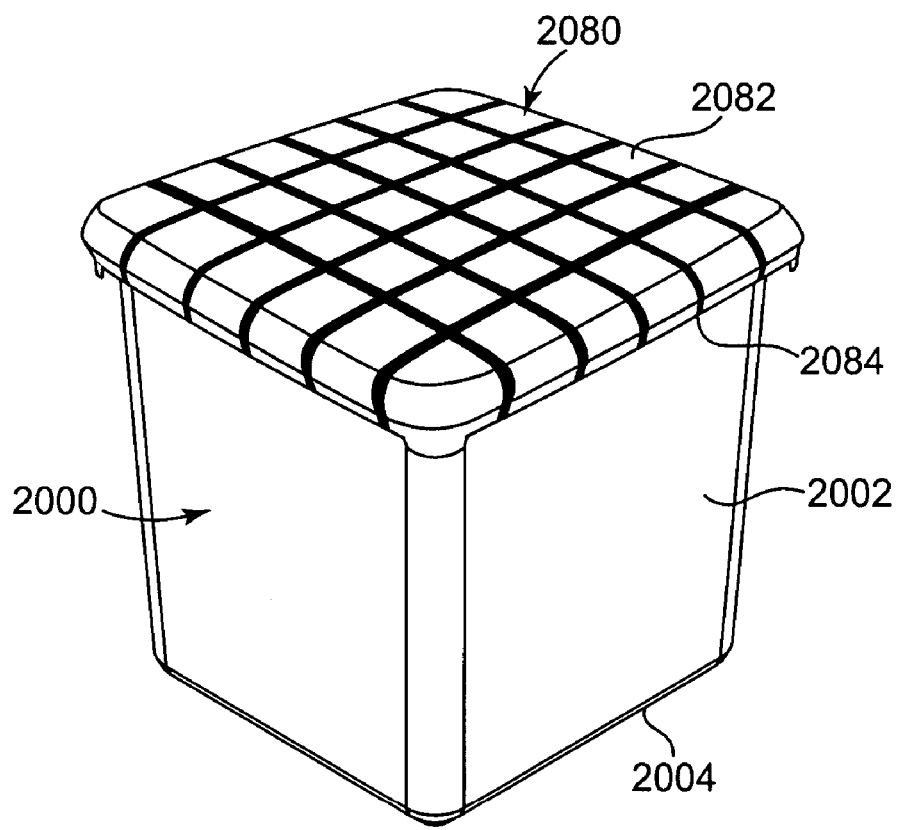
FIG. 86 illustrates a perspective view of the bin of FIG. 76 with a cap, according to one embodiment of the present invention.

Referring to FIG. 86 in view of FIGS. 76 and 85, in one embodiment, a cap 2080 is provided. Cap 2080 is formed similar to a shower cap and includes a main body 2082 and a drawstring or elastomeric member 2084 (generally indicated in FIG. 86). Cap 2080 is configured to stretch to tightly fit around rim 2010 and flange 2012 (see e.g., FIG. 76). More specifically, upon positioning cap 2080 relative to bin 2000, drawstring or elastomeric member 2084 is tightened just below flange 2012 on an external portion of bin 2000 to cover cavity 2006 and lid 2070, if any. In one example, cap 2080 is substantially waterproof to prevent or at least decrease the likelihood that any water or other liquid inadvertently applied to cap 2080 will penetrate cap 2080 and enter bin 2000. As such, cap 2080 is configured to decrease the likelihood that any contents of bin 2000 will be damaged by water or other liquids. Other suitable bins and associated components will be apparent to those of skill in the art upon reading the present application.

Labels

In one embodiment, a plurality of labels are configured to facilitate the consumer in identifying items that have previously been sorted into any of the boxes, bins, etc. disclosed herein. For example, referring to FIG. 87, in one example, a box 434 is provided having a cutout 2090 on a front thereof. A label 2092 is provided and defines a front portion 2094 and a back portion 2096. In one embodiment, label 2092 is formed of a single piece folded over itself in a U-shape to define front portion 2094 and back portion 2096. An opening 2098 is formed in a lower portion of label 2092. In one example, front portion 2094 may be formed of any suitable material and/or may be covered in a suitable material to allow the consumer to write indicia 2100 onto front portion 2094. In one example, front portion 2094 is a white board surface or other suitable surface allowing indicia to be selectively written to and later removed from front portion 2094.

In one embodiment, label 2092 additionally is includes a color coding and is available in a plurality of colors such that the consumer may select a color based upon the particular type of item stored within the bin, box, etc. For example, all clothing items may be stored and labeled with labels 2092 of a first color, for example, orange, while all items relating to a sporting or other activity, may be stored in bins, boxes, etc. having labels 2092 of a second color, for example, green. As such, the color coding of labels 2092 allows the consumer to more quickly and readily identify the types of items stored in the respective boxes, bins, etc.

Figure 87:
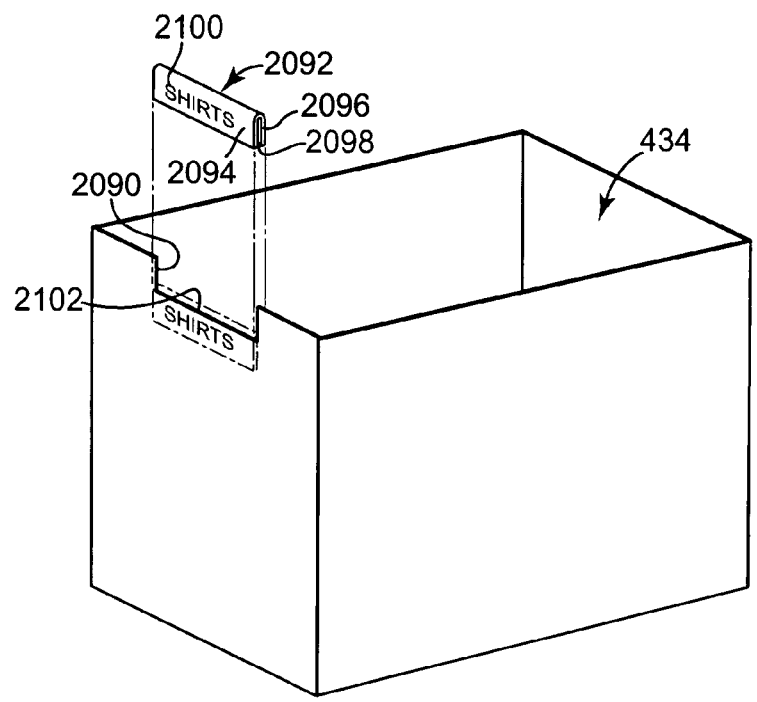
FIG. 87 illustrates a perspective view of a box with a label, according to one embodiment of the present invention.
Figure 88:
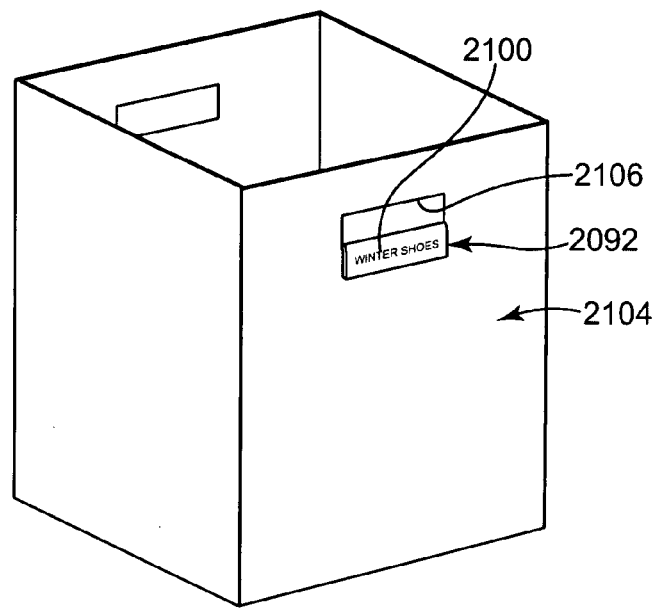
FIG. 88 illustrates a perspective view of the bin of FIG. 76 with a label hanger, according to one embodiment of the present invention.

In one embodiment, label 2092 is sized and shaped specifically to fit within cutout 2090 of box 434. More specifically, label 2092 is configured with a width at least slightly smaller than the overall width of cutout 2090 such that an upper edge 2102 of cutout 2090 is received by opening 2098 of label 2092. As such, label 2092 is clipped around box 434 maintaining a portion of box 434 between front portion 2094 and back portion 2096. Such construction of label 2092 provides for an easy assembled label that can be formed relatively inexpensively. Label 2092 is also able to be used with various types of boxes. For example, label 2092 could be clipped over a top edge of a box not including a cutout 2090 as illustrated in FIG. 87. In another embodiment, label 2092 is useful with a box, such as box 2104 including an internal cutout 2106 illustrated in FIG. 88, as will be apparent to those of skill in the art upon reading this application.

Figure 89:
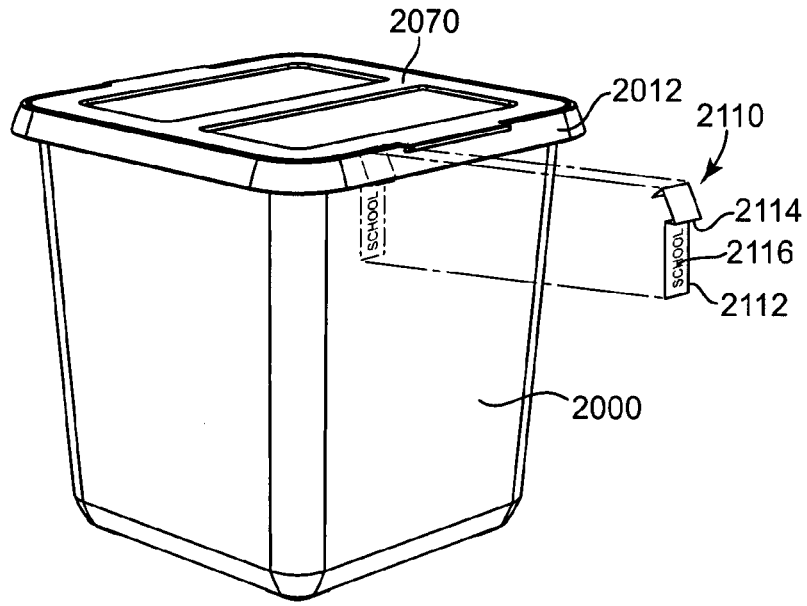
FIG. 89 illustrates a perspective view of a box with a label, according to one embodiment of the present invention.

FIG. 89 illustrates a label configured for use with a bin, such as, for example, bin 2000. In particular, a label 2110 includes a label portion 2012 and a clip portion 2114. In one example, label portion 2112 is substantially elongated and configured to receive an adhesive label or to otherwise be written thereto with indicia 2116. In one embodiment, label portion 2112 is formed of a white board or other suitable material such that indicia 2116 can be selectively written to and removed from label portion 2112. In one embodiment, label portion 2112 is capable of receiving permanent indicia 2116. Clip portion 2114 extends from an upper edge of label portion 2112 and is formed in a generally C-shaped configured to receive and wrap around a portion of flange 2012 of bin 2000. In one example, label 2110 or at least clip portion 2114 is formed of an at least partially deformable and/or elastomeric member capable of expanding to receive flange 2012 while being biased in a contracted position such that once positioned around flange 2012, clip portion 2115 grasps flange 2012 securing label 2110 to bin 2000. As such, label 2110 can be repeatedly removed or secured to different bins 2000 as the needs of the consumer changes.

In one example, a portion of label 2110 such as clip portion 2114 is color coded or otherwise available in a plurality of colors to assist the consumer in quickly identifying types of items stored within bins 2000. In one embodiment, label 2110 is also configured to be used with a cap 2080 as illustrated in FIG. 86, such as cap 2080 extends around flange 2012 leaving label portion 2112 viewable to an observer of bin 2000. As such, placement of cap 2080 about flange 2012 of bin 2000 does not obstruct indicia 2116 written to label 2110. Other labels suitable to be selectively received by and removed from flange 2012 will be apparent to those of skill in the art upon reading the present application.

Figure 90:
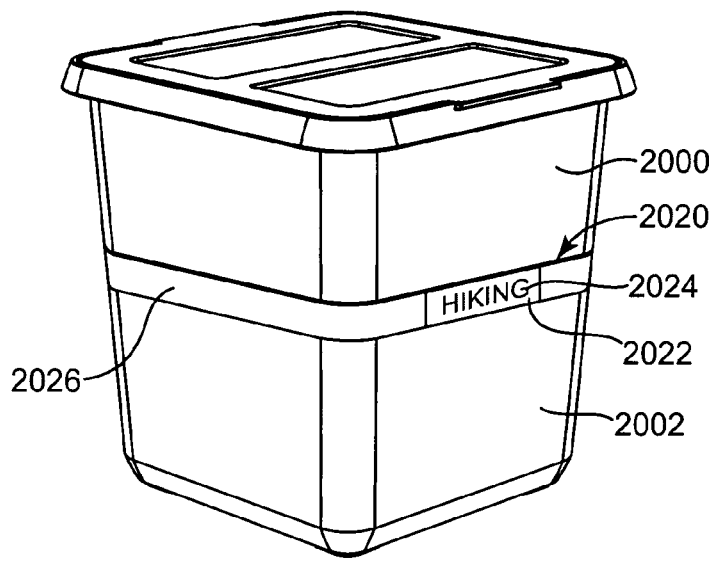
FIG. 90 illustrates a perspective view of the bin of FIG. 76 with a label band, according to one embodiment of the present invention.

FIG. 90 illustrates one embodiment of a band label 2120. In one embodiment, band label 2120 includes a label portion 2022 capable of receiving indicia 2024 applied thereto by a user of band label 2120. For example, label portion 2022 may selectively receive indicia 2024 (e.g., where label portion 2022 includes a white board surface, etc.) and/or to permanently receive indicia 2024. In one embodiment, an elastomeric portion 2026 (e.g., a rubber band, etc.) is attached to label portion 2022, more specifically extends from one end of label portion 2022 to the other end of label portion 2022 to define a circular band. In one embodiment, elastomeric portion 2026 is configured to selectively stretch to receive bin 2000 or other item, more specifically, to extend around side panels 2002 thereof. In one embodiment, band portion 2026 is available in a variety of colors such that label 2020 can be selected to assist the consumer in color coding particular types of items stored within particular storage units. Other variations of band label 2020 will be apparent to those of skill in the art. In addition, it should be noted that band label 2020 is also suitable for use with boxes, for example, boxes 434 or 2104.

Figure 91:
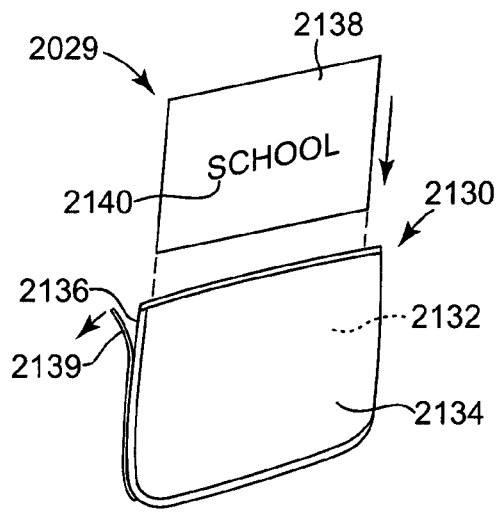
FIG. 91 illustrates an envelope and label, according to one embodiment of the present invention.

FIG. 91 illustrates yet another label system 2029 configured for use with bins, boxes, trays, drawers, etc. configured for use with the storage and organization systems described herein. A substantially transparent envelope 2130 is provided and defines a chamber 2132 configured to receive a card 2138 including indicia 2140 identifying items stored within a particular shell, bin, box, etc. In one example, front surface 2134 of envelope 2130 is substantially transparent to allow card 2138 and therefore indicia 2140 thereof to be viewed through front surface 2134 of envelope 2130 when card 2138 is placed therein.

In one example, back surface 2136 of envelope 2130 is provided with an adhesive material allowing envelope 2130 to be easily applied to an outside surface of any respective shell, bin, box, tray, drawer, etc. In one example, a protective layer 2139 is applied on an adhesive back surface 2136 and is easily removed from back surface 2136 to expose adhesive thereon for applying to the respective bin, box, etc. In this manner, envelope 2130 can be applied to any component of the storage and organization system described herein as will be apparent to those of skill in the art. As such, label system 2029 can be placed on any substantially flat surface of a corresponding bin, box, tray, drawer, shell, etc. as desired by the consumer. In one embodiment, card 2138 and/or envelope 2130 includes a color coded portion configured to allow the consumer to select specific colors for specific types of items stored within the bins, boxes, etc. that envelope 2130 is attached thereto. In one embodiment, front surface is translucent and is tinted a particular color, which serves as the color coding of envelope 2130. As described above, color coding of items stored within these components allows the consumer to easily and readily identify types of items stored within particular bins, boxes, etc.

Although a plurality of labels are described above with respect to particular shells, boxes, bins, trays, drawers, etc., upon reading the present application, it will apparent to those of skill in the that other labeling systems and/or combinations of labels with shells, boxes, bins, trays, drawers, etc. also fall within the scope of the present invention.

Hanger

Figures 92, 93:
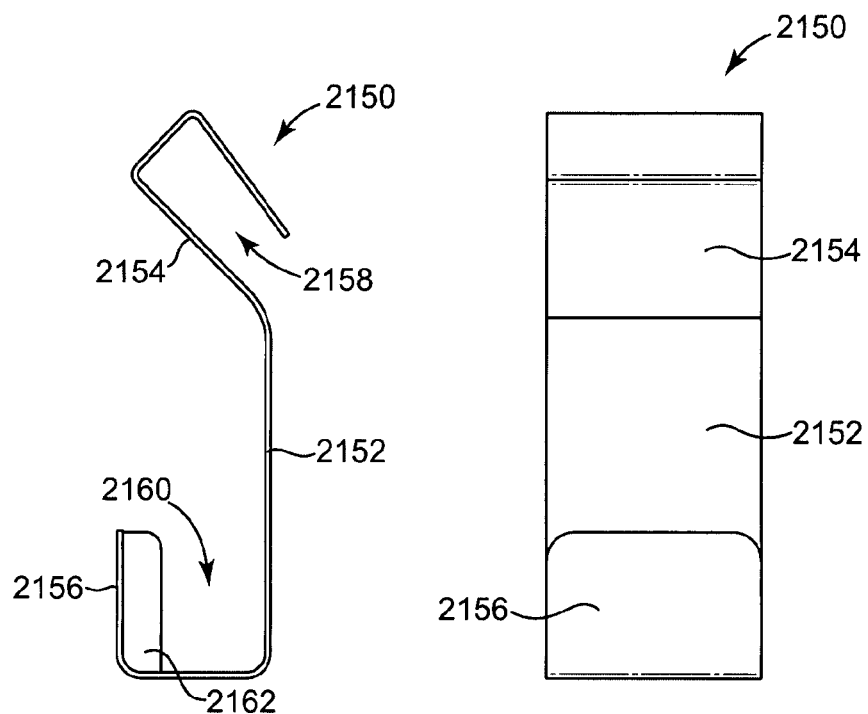
FIG. 92 illustrates a side view of a hanger, according to one embodiment of the present invention.
FIG. 93 illustrates a front view of the hanger of FIG. 93, according to one embodiment of the present invention.

FIGS. 92 and 93 respectively illustrate side and front views of one embodiment of a hanger 2150. Hanger 2150 is configured to hang over a rail 62 of a shell 12 to utilize the space on side of shell 12 for additional storage and organizational options. For example, hanger 2150 includes a main panel 2152, a first hook 2154 extending from an upper portion of main panel 2152 and a second hook 2156 extending from a lower portion of main panel 2152. First hook 2154 initially angles forward and upward from main panel 2152 and then curves back on itself in the opposite direction. Hook 2154 is curved and formed to receive rail 62 of shell 12 or other shell. For instance, first shell 12 includes linear rail 62*a* (FIG. 3A), hook 2154 defines a cavity 2158 shaped similar to but slightly larger than linear rail 62*a*. As such, hook 2154 can be placed over rail 62*a* to hang hanger 2150 therefrom.

In one embodiment, second hook 2156 initially extends from lower portion of main panel 2152 in a forward and substantially perpendicular orientation with respect to main panel 2152 and then extends upwardly to define a U-shaped hook when collectively considered with main panel 2152. As such, hook 2156 is configured to receive a coat, bag or any other item configured to be hung therefrom. In one embodiment, main panel 2152, first hook 2154 and second hook 2156 are each formed of a similar material such as sheet metal, plastic, etc. In one embodiment, hook 2154 is formed with some deformability and bias to facilitate attachment of hook 2154 to a respective rail 62. In one example, a pad 2162 formed of plastic or other suitable material is included on the substantially vertical portion of hook 2156 to provide a thicker end piece of hook 2156 configured to prevent snagging or other deformation of items hung from hanger 2150 as will be apparent to those of skill in the art upon reading the present application. In one embodiment, hanger 2150 is formed of a substantially small width such that a plurality of hangers 2150 may be hung from a single rail 62 of a shell 12. Other embodiments of suitable hangers for use with shell 12 will be will be apparent to those of skill in the art upon reading the present application.

More on Additional Support Assemblies

FIGS. 94-97 illustrate one embodiment of a support assembly 2170. In one example, support assembly 2170 includes an external box 2172, which defines a plurality of external side walls 2174, and internal walls or shelves 2176. In one embodiment, support assembly 2170 is configured to transition from a collapsed position as illustrated in FIG. 94 where support assembly 2170 is in a substantially flat configuration for packing and storage, and a fully assembled position as illustrated in FIG. 97. More specifically, external box 2172 is formed of four side walls 2174 positioned end-to-end to form a substantially rectangular box frame when assembled. However, each side wall 2174 is configured to rotate relative to the adjacent side walls 2174 such that external box 2172 can be collapsed into a flat position as illustrated in FIG. 94.

In one embodiment, one or more cables 2178 are attached to external box 2172 to facilitate squaring and assembly of external box 2172. For example, upon unfolding of external box 2172, cables 2178 become taut and, as such, pull side walls 2174 into square. In one embodiment, two cables 2178 are included and diagonally extend from opposite corners of external box 2172. In one example, no cables 2178 are included. Once external box 2172 is squared, shelves 2176 can be placed therein. In one embodiment, each shelf 2176 includes a slot 2180 extending from a first edge thereof back toward a second edge. In this manner, shelves 2176 are configured to be coupled to one another by engaging slots 2180 of one shelf 2176 with slot 2180 of another shelf 2176. Once shelves 2176 are assembled, shelves 2176 are slid into external box 2172. Shelves 2176 may be attached to external walls 2174 of external box 2172 in any suitable manner such as via a dovetail connection, adhesive, other track interaction, etc. Once shelves 2176 are assembled and squared within external box 2172, support assembly 2170 is fully assembled. Upon full assembly, support assembly 2170 defines a plurality of cavities 2182 each configured to receive shell 12 or other components disclosed herein. In one embodiment, while some of cavities 2182 receive preassembled shells, boxes or bins, other cavities 2182 may directly receive items to be stored by support assembly 2170.

Figure 98:
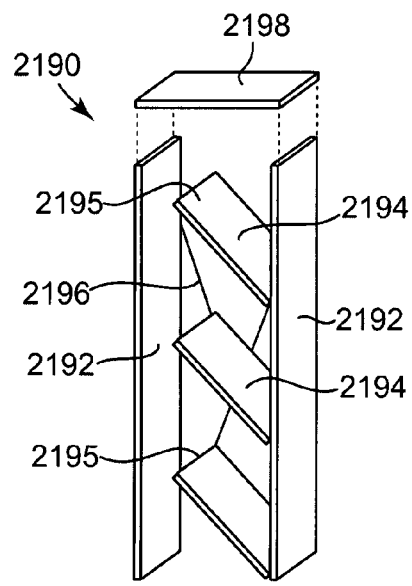
FIG. 98 illustrates an exploded perspective view of a partially collapsed shelf assembly, according to one embodiment of the present invention.

FIG. 98 illustrates one embodiment of a support assembly 2190. Support assembly 2190 includes side walls 2192 and shelves 2194. In one embodiment, two side walls 2192 are positioned opposite one another in a generally vertical configuration. In one example, cables 2196 extend from opposite corners of side walls 2192 between each of side walls 2192 to brace and support side walls 2192 in their vertical and substantially parallel configuration relative to one another. In one example, shelves 2194 are hingeably connected to one of side walls 2192. In this manner, shelves 2194 can be folded flat with respect to the corresponding side wall 2192 and can subsequently be folded downward therefrom to interact with the opposing side wall 2192.

For example, as illustrated in FIG. 98, shelves 2194 are partially folded down from one side wall 2192 toward the opposing side wall 2192. In one example, the opposing side wall 2192 includes grooves, clips or other suitable attachment device (not shown) configured to receive free ends 2195 of each shelf 2194. As such, when shelves 2194 are folded down away from side wall 2192, the respective ends 2195 of shelves 2194 are clipped or otherwise received by the opposing side wall 2192. As a result, shelves 2194 are horizontally maintained between the two side walls 2192 such that shelves 2194 can receive shells, bins, boxes and other storage components.

In one embodiment, a top wall 2198 is separately attached to each of side walls 2192 and extends therebetween. In one embodiment, attachment of top wall 2198 further secures and stabilizes side walls 2192 and is a substantially square configuration such that side walls 2192 extend parallel to one another even upon periods of extended use.

Figure 99:
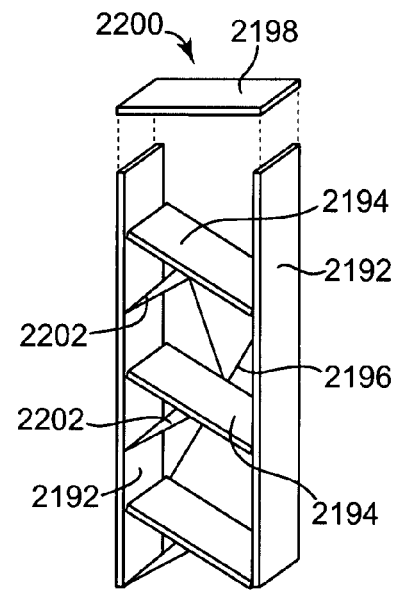
FIG. 99 illustrates an exploded perspective view of a partially collapsed shelf assembly, according to one embodiment of the present invention.

FIG. 99 illustrates support assembly 2200 similar to support assembly 2190 of FIG. 98 that additionally includes braces 2202. Each brace 2202 extends from an opposing side wall 2192 and is configured to interact with a center portion of each shelf 2194. As described above, shelves 2194 are hingeably connected to side wall 2192. Braces 2202 are hingeably connected with the opposing side wall 2192 and each corresponding shelf 2194. As such, support assembly 2200 can be flat packed when shelves 2194 and braces 2202 are pushed upward and side walls 2192 are pushed toward one another. However, upon assembly, side walls 2192 are moved away from one another and shelves 2194 are moved downwardly. In such an embodiment, braces 2202 serve to further support shelves 2194 and may additionally provide for additional stability of support assembly 2200.

Figure 100:
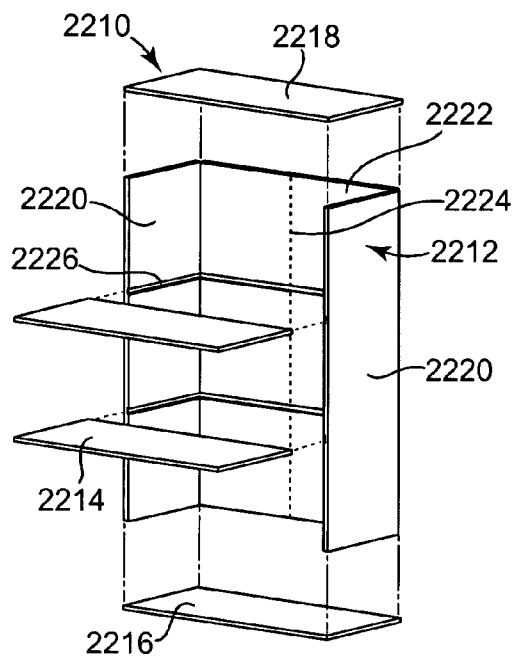
FIG. 100 illustrates an exploded perspective view of a shelf assembly, according to one embodiment of the present invention.
Figure 101:
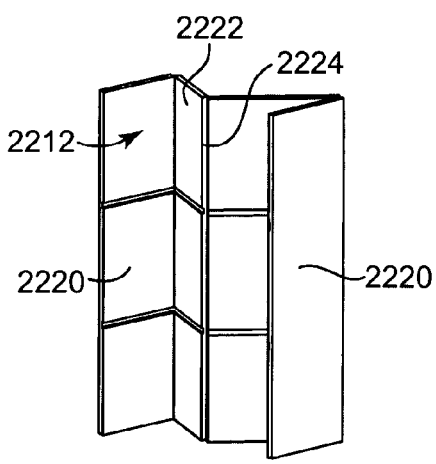
FIG. 101 illustrates a perspective view of a partially unfolded wall member of the shelf assembly of FIG. 100, according to one embodiment of the present invention.

FIG. 100 illustrates one embodiment of support assembly 2210 including a wall member 2212, shelves 2214, bottom wall 2216 and top wall 2218. Wall member 2212 as described with additional reference to the partially folded configuration illustrated in FIG. 101, includes two side members 2212 spaced from one another and coupled to each other via rear wall 2222 which extends between side walls 2220. Wall member 2212 is configured to form a substantially U-shaped wall member upon assembly as illustrated in FIG. 100. However, during storage or prior to assembly, wall member 2212 is configured to collapse into a substantially flat configuration. In particular, in one embodiment, rear wall 2222 includes a hinge or fold line 2224 configured to fold rear wall 2222 inwardly while side walls 2220 are collapsed inward toward rear wall 2222. As such, wall member 2212 folds in a substantially accordion configuration into a substantially flat member.

When in a substantially U-shaped configuration for assembly, wall member 2212 is configured to receive shelves 2214. In particular, in one embodiment, wall member 2212 includes grooves 2226 configured to receive edges of shelves 2214. As such, during assembly, shelves 2214 can be slide into grooves 2226 of wall member 2212 thereby coupling each shelf 2214 to wall member 2212. During assembly, in one embodiment, one or more of bottom wall 2216 and top wall 2218 may be separately coupled with wall member 2212 at a bottom and top edge thereof, respectively, to further square and secure support assembly 2210. In other embodiments, one or both of bottom wall 2216 and top wall 2218 may be eliminated.

Figure 102:
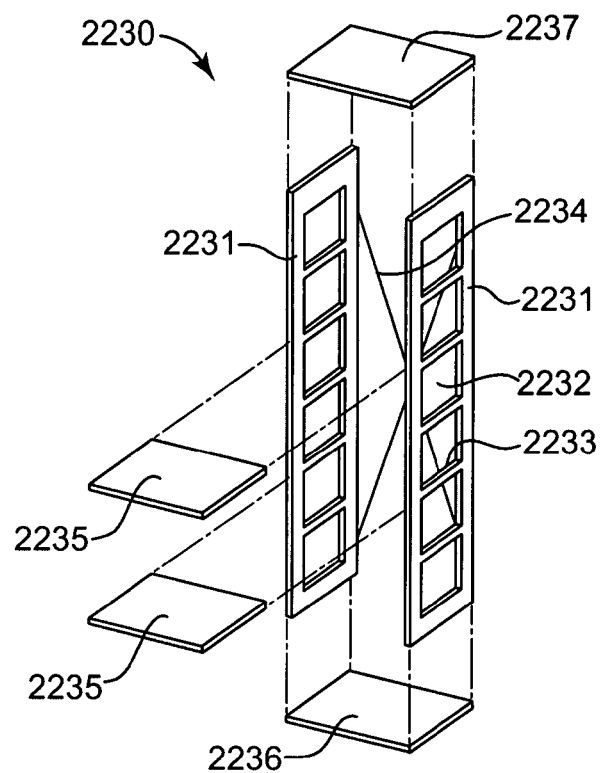
FIG. 102 illustrates an exploded perspective view of a shelf assembly, according to one embodiment of the present invention.

FIG. 102 illustrates one embodiment of support assembly 2240. Support assembly 2240 includes side walls 2231, which are each substantially planar and configured to be initially packed adjacent to one another in a flat manner. However, upon assembly, side walls 2231 are separated from one another and are configured to extend substantially parallel to each other. In one embodiment, each side wall 2231 includes a plurality of cavities 2232 formed therein, which, in turn, define rails 2233 extending between adjacent cavities 2232. Each rail 2233 is configured to selectively receive a shelf 2235 as will be further described below. In one embodiment, to increase stability of support assembly 2240, cables 2234 are attached to side walls 2231 such that when side walls 2231 are separated, cables 2234 are engaged or become taut to hold side walls 2231 relative to one another.

Figure 103:
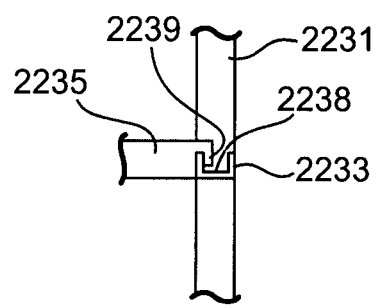
FIG. 103 illustrates a detailed side view of a shelf and a portion of a side wall of the shelf assembly of FIG. 102, according to one embodiment of the present invention.
Figure 104:
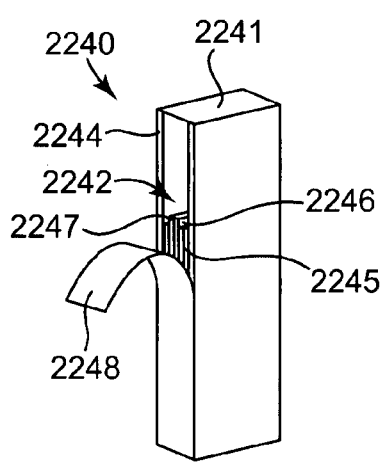
FIG. 104 illustrates a perspective view of a packaged shelf assembly, according to one embodiment of the present invention.
Figure 105:
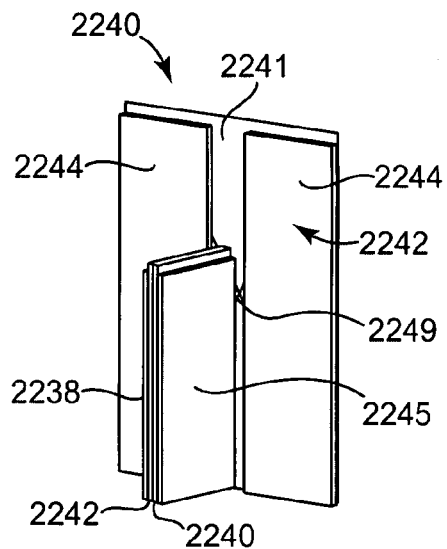
FIG. 105 illustrates a perspective view of the packaged shelf assembly of FIG. 104 when partially assembled, according to one embodiment of the present invention.

Upon separation of side walls 2231, shelves 2235 are selectively placed between side walls 2231 to each engage a rail 2233 of each side wall 2231. For example, as illustrated with additional reference to the detailed view of FIG. 103, in one embodiment, each rail 2233 is substantially U-shaped and forms a void 2238 therein. To interact with each rail 2233, in on embodiment, each shelf 2235 includes a lip or flange 2239 at an end thereof. Each flange 2239 is configured to be received within void 2238 of rail 2233. As such, using the forces of gravity, each shelf 2235 is coupled with the respective side walls 2231. Prior to or following positioning of shelves 2235 relative to side walls 2231, one or more of bottom wall 2244 and top wall 2237 may be attached to side wall 2231 to further square and stabilize support assembly 2240. In one embodiment, one or both of bottom wall 2244 and top wall 2237 may be eliminated. Notably, since each component of support assembly 2240 is substantially planar, prior to assembly, support assembly 2240 can be substantially flat packed as will be apparent to one of skill in the art upon reading the present application.

FIGS. 104-107 illustrate one embodiment of a packaged support assembly 2240 including a package 2241 and a support assembly 2242, according to one embodiment of the present invention. Similar to other support assemblies previously described, support assembly 2242 includes two side walls 2244, one or more shelves 2245, a top wall 2246 and a bottom wall 2247. When unassembled, side walls 2244, shelves 2245, top wall 2246 and bottom wall 2247 are configured to be flat packed and enclosed within package 2241. Package 2241 may be formed of any suitable material, such as a paper-based or cardboard material. In one embodiment, package 2241 is configured to aid in the assembly of support assembly 2242. For example, upon purchasing package support assembly 2240, the consumer removes the side portion 2248 of package 2241 as partially illustrated in FIG. 104. In one example, each side portion 2248 is configured to be easily peeled away from the remainder of package 2241.

Figure 106:
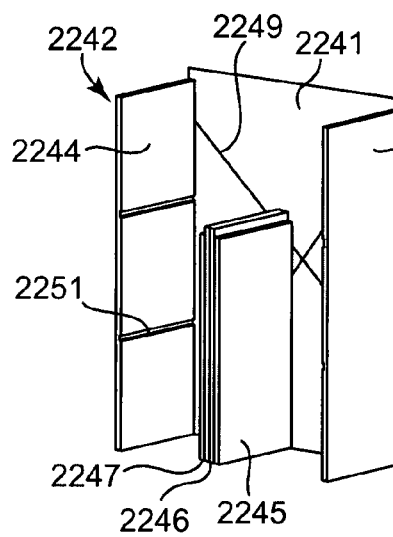
FIG. 106 illustrates a perspective view of the packaged shelf assembly of FIG. 104 when partially assembled, according to one embodiment of the present invention.
Figure 107:
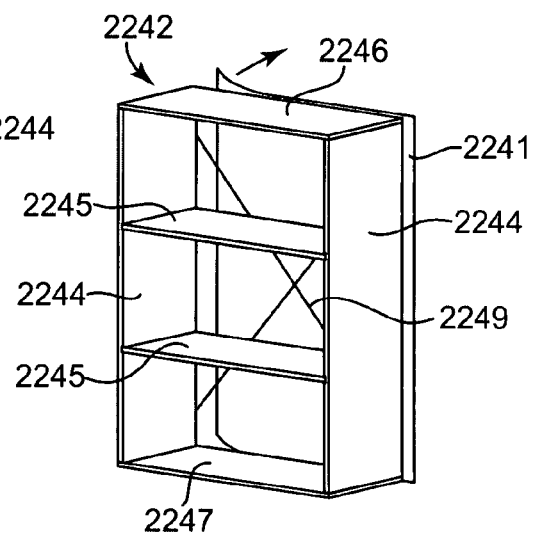
FIG. 107 illustrates a perspective view of the shelf assembly of FIG. 104 when fully assembled, according to one embodiment of the present invention.
Figure 108:
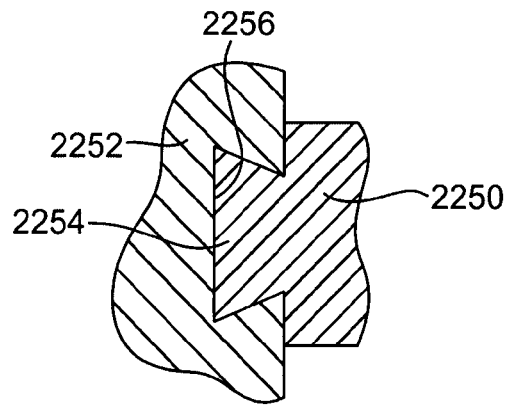
FIG. 108 illustrates a cross-sectional detail view of a coupling between a shelf and a side wall, according to one embodiment of the present invention.

Upon removal of side portions 2248 of package 2241, side walls 2244, which are initially packaged on either side of a bundle of shelves 2235, top wall 2246 and bottom wall 2247, are folded outwardly backwards away from shelves 2235, top wall 2246 and bottom wall 2247. In one embodiment, the remaining package 2241 is configured to aid in spacing and placement of side walls 2244 to be positioned opposite on another and extend substantially parallel to one another. As illustrated in FIG. 106, side walls 2244 are rotated relative to the remaining package 2241 to extend substantially perpendicular thereto and are in position for the final assembly. In one embodiment, cables 2249 are attached and extend diagonally between opposing rear corners of side walls 2244 such that when side walls 2244 are rotated relative to package 2241 as illustrated in FIG. 106, cables 2249 automatically engage and are pulled taut to provide additional support and stability to support assembly 2242.

In one embodiment, each side wall 2244 defines one or more grooves 2251 extending laterally across each side wall 2244 and being configured to slidably receive an edge of corresponding shelf 2245. In one embodiment, grooves 2251 are configured to receive a dovetailed edge of each shelf 2245 as will be apparent to those of skill in the art. As such, during assembly, shelves 2245 are slid into engagement with each side wall 2244 so as to extend substantially perpendicular to and between side walls 2244. In one example, a top wall 2246 and/or bottom wall 2247 are positioned at the top and bottom of side walls 2244 and coupled thereto in a suitable manner. Upon assembly of support assembly 2242, any remaining packaging 2233 can be removed by being peeled away from support assembly 2242 as generally indicated by the arrow in FIG. 107. Once assembled, support assembly 2242 is configured to receive any items owned by the consumer, including any shells 12, bins, boxes, etc.

FIGS. 108-113 illustrate various embodiments of means for coupling internal walls or shelves 2250 with corresponding side walls 2252. As described with respect to FIGS. 108-113, shelves 2250 should be understood to be any of the shelves disclosed herein and side walls 2252 should be understood to be any of the side walls disclosed herein Referring to FIG. 108, in one embodiment, shelves 2250 include dovetails 2254 at opposing sides thereof. Each dovetail 2254 is formed in any suitable manner as will be apparent to those of skill in the art upon reading the present application. In one embodiment, dovetail 2254 is formed in a generally trapezoidal or frustro-triangular manner. Accordingly, side walls 2252 each include a corresponding groove 2256 configured to slidably receive dovetail 2254. As such, groove 2256 is formed with a cross-sectional shape similar to but just slightly larger than dovetail 2254. As such, once dovetail 2254 of each shelf 2250 is slid into a corresponding groove 2256 of a side wall 2252, shelf 2250 is coupled to side wall 2252.

Figure 109:
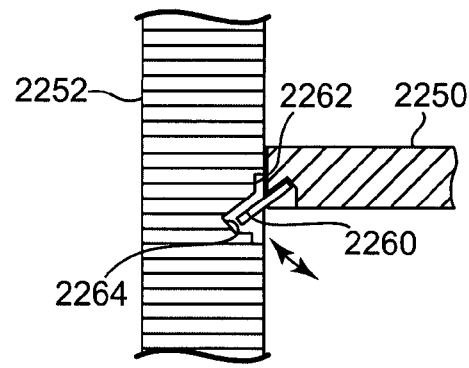
FIG. 109 illustrates a cross-sectional view of a coupling between a shelf and a side wall, according to one embodiment of the present invention.

FIG. 109 illustrates another embodiment of a method of attaching shelf 2250 to a corresponding side wall 2252. In one embodiment, shelf 2250 includes an angled insert 2260. For example, angled insert 2260 may be formed of sheet metal or other material having a slightly springy or biased nature outwardly away from the remainder of shelf 2250. As such, some movement of angle insert 2260 in a direction generally indicated by bidirectional arrow of FIG. 109 is generally allowed. Angled insert 2260 may be coupled with the remainder of shelf 2250 in any suitable manner. Side wall 2252 includes a groove 2262 configured to receive angled insert 2260. In particular, groove 2262 includes an angled portion 2264 configured to receive angled insert 2260. In one example, the opening to groove 2262 is larger than the angled portion 2264 such that shelf 2250 can be moved from a position just above groove 2262 downward until angled insert 2260 extends outwardly into angled portion 2264. Once angled insert 2260 is seated within angled portion 2264, shelf 2250 is suitably coupled with side wall 2252. In one embodiment, angled insert 2260 provides a selective coupling, such that if the consumer desires to disassemble shelf 2250 from side wall 2252, the consumer merely raises shelf 2250, which, in turn, removes angled insert 2260 from groove 2262.

Figure 110:
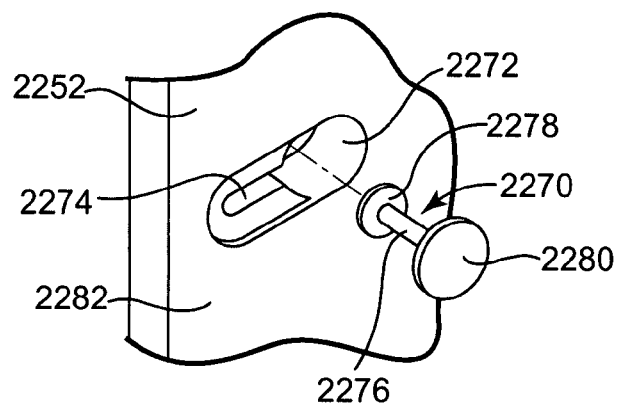
FIG. 110 illustrates an exploded perspective view of a side wall and a coupling device, according to one embodiment of the present invention.
Figure 111:
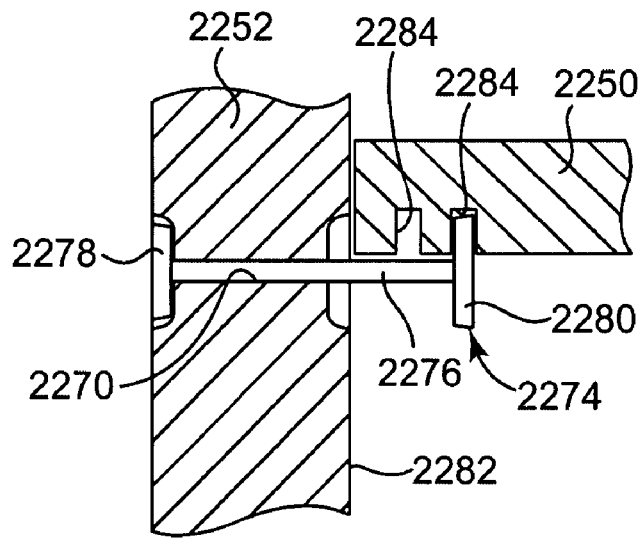

FIG. 110 illustrates an exploded perspective view of a side wall 2252 with a coupling device 2270. Side wall 2252 is formed with a recess 2272 and a smaller slot 2274 laterally extending therefrom. Coupling device 2270 is formed with a cylindrical shaft 2276 having a first button 2278 and a second button 2280 on opposing ends thereof. In one embodiment, second button 2280 is significantly larger than first button 2278. Coupling device 2270 is configured such that first button 2278 is placed through recess 2272 of side wall 2252 to align shaft 2276 with slot 2274. Once so positioned, coupling device 2270 is slid toward slot 2274 to position shaft 2276 of coupling device 2270 within slot 2274. As such, coupling device 2270 is selectively secured to side wall 2252 such that a portion of shaft 2276 and second button 2280 extend from inside surface 2282 of side wall 2252 as illustrated with additional reference to the cross-sectional view of FIG. 111.

More specifically, when button 2280 extends outwardly from internal surface 2282 of side wall 2252, button 2280 is configured to receive a portion of shelf 2250. In one example, shelf 2250 includes one or more indentations 2284 each sized to receive a portion of button 2280 if coupling device 2270. As such, once coupling device 2270 is positioned with respect to side wall 2252, shelf 2250 can be positioned to rest on top of coupling device 2270 such that a portion of button 2280 is received by indentation 2284. A similar coupling occurs at the opposite end of shelf 2250 with an opposing side wall 2252 as will be apparent to those of skill in the art. In addition, each side wall 2252, multiple slots 2274 are configured to receive coupling devices 2270 to provide a multi-point connection between shelf 2250 and side wall 2252. As such, upon coupling of shelf 2250 with each of the corresponding coupling devices 2270, shelf 2250 is securely supported.

Figure 112:
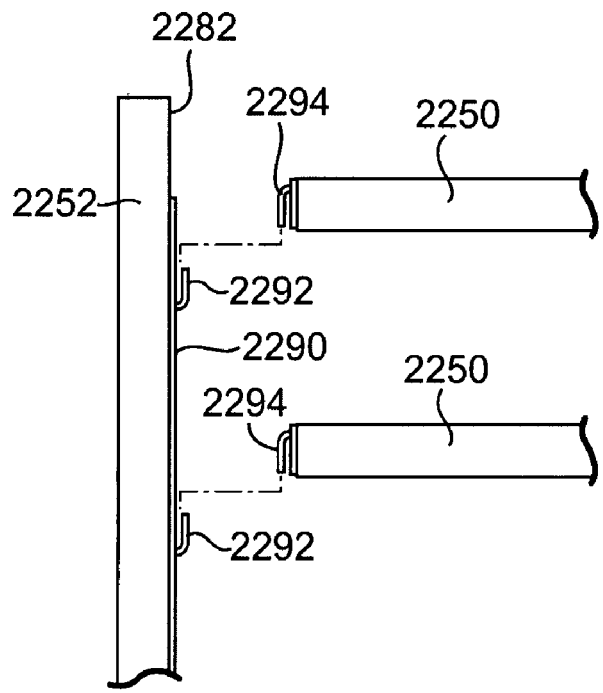

FIG. 112 illustrates a side view of a coupling between shelves 2250 and a side wall 2252. In particular, in one embodiment, a coupling plate 2290 is attached to an inside surface 2282 of side wall 2252. Coupling plate 2290 includes a ledge 2292 curved upwardly from the remainder of coupling plate 2290. In one embodiment, each coupling ledge 2292 is discreet and a plurality of coupling ledges 2292 are positioned along a lateral width of side wall 2252. In one embodiment, each ledge 2292 is elongated and extends along a substantial portion of the lateral width of side wall 2252. In one example, multiple ledges 2292 are vertically spaced from one another wherein each ledge 2292 is configured to receive a different shelf 2250.

Each shelf 2250 includes an inverted hook 2294 configured to receive and be received by ledges 2292. In particular, each shelf 2250 is positioned above corresponding ledge 2292 and move downwardly until ledge 2292 engages hook 2294 of shelf 2250. As will be apparent to those of skill in the art upon reading the present application, in one embodiment, opposite ends of shelves 2250 also include hook 2294 and are configured to interact with an opposing side wall 2252 in a similar manner as described above. As such, ledges 2292 and hooks 2294 are configured to allow selective coupling of shelves 2250 to side wall 2252.

Figure 113:
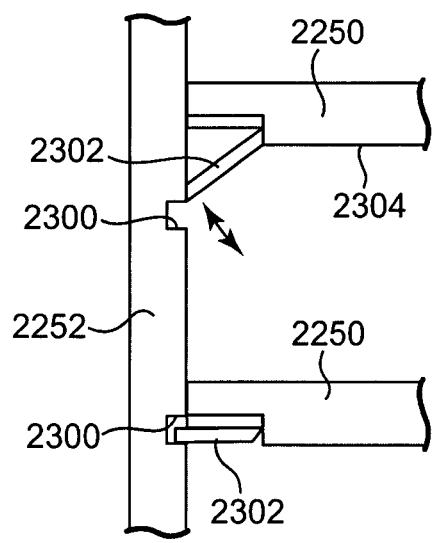

FIG. 113 illustrates one embodiment of a side wall 2252 to shelf 2250 connection. In one embodiment, side wall 2252 includes elongated grooves 2300 with generally rectangular cross-sections extending along a substantial portion of the width of side wall 2252. Each groove 2300 is positioned to receive a shelf 2250. More specifically, in one example, each shelf 2250 includes a coupling member 2302 at a lower end portion thereof. Each coupling member 2302 is biased to extend from a bottom 2304 of shelf 2250 with an angled orientation. However, each coupling member 2302 is rotatable to extend in a manner substantially planar with respect to bottom surface 2304 of shelf 2250 as generally illustrated in the lower shelf 2250 illustrated in FIG. 113. In this manner, in order to couple each shelf 2250 with a corresponding side wall 2252, each shelf 2250 is positioned just above a corresponding groove 2300 and lowered into place. As shelf is lowered into place, coupling member 2302 interacts with groove 2300 and slides therein.

Continued sliding of shelf 2250 in a downward manner either due to gravitational forces and/or a force applied by the consumer, causes coupling member 2302 to rotate upwardly as generally indicated by the bi-directional arrow in FIG. 113 into a generally horizontal orientation in which a bottom of coupling member 2302 is positioned substantially planar with bottom surface 2304 of shelf 2250 to present an aesthetically pleasing appearance to the consumer. As will be apparent to those of skill in the art, in one embodiment, the opposite sides of shelves 2250 similarly include coupling member 2302 to interact with grooves 2300 that are similarly formed in the opposite side of wall 2252.

Although a plurality of methods and devices for coupling shelves 2250 to side walls 2252 have been described herein, it will be apparent to those of skill in the art upon reading the present application that other suitable connections between shelves 2250 and side walls 2252 are also suitable. In one example, various connections described above or other suitable connections may be used in combination with one another to couple shelves 2250 with corresponding side walls 2252.

Other Shells

Although shells described above are generally described as being formed primarily of a plastic or other material, other shell assemblies are also contemplated. For example, shells may be formed of wood, laminate, metal, composite, or other suitable materials. In one example, use of other materials complicates formation of a living hinge in any such shell. Therefore, alternate assemblies are contemplated to allow for flat packing of such shells during storage, in-store display, transport, etc.

Figure 114:
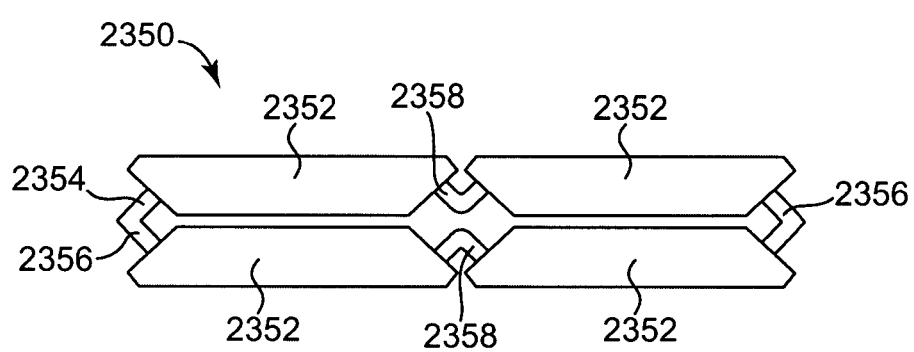

For example, FIG. 114 illustrates a shell 2350 in a flat packed position including side walls 2352 and a plurality of hinges 2354. Each hinge 2354 is positioned between and coupled to two adjacent side walls 2352. In order to allow shell 2350 to be flat packed by folding shell 2350 similar to the parallelogram shell 12a (e.g., FIGS. 4A-7), in one example, the plurality of hinges 2354 includes two hinges 2356 positioned opposite one another that are configured to rotate inwardly such that the corresponding two side walls 2352 coupled thereto fold toward each other when shell 2350 is in the flat packed position. In addition, in one example, the plurality of hinges 2354 includes two hinges 2358 positioned opposite one another and between hinges 2356 that are configured to rotate outwardly such that the corresponding two side walls 2352 coupled thereto fold away from each other when shell 2350 is in the flat packed position. In other words, two hinges 2356 cause side walls 2352 to pivot inwardly and two hinges 2358 to pivot outwardly. As such, hinges 2356 are positioned to fold in the opposite direction as the two hinges 2358. This placement of hinges 2354 allows shell 2350 to transition between an expanded, use position and a flat packed position similar to shell 12a.

Figure 115:
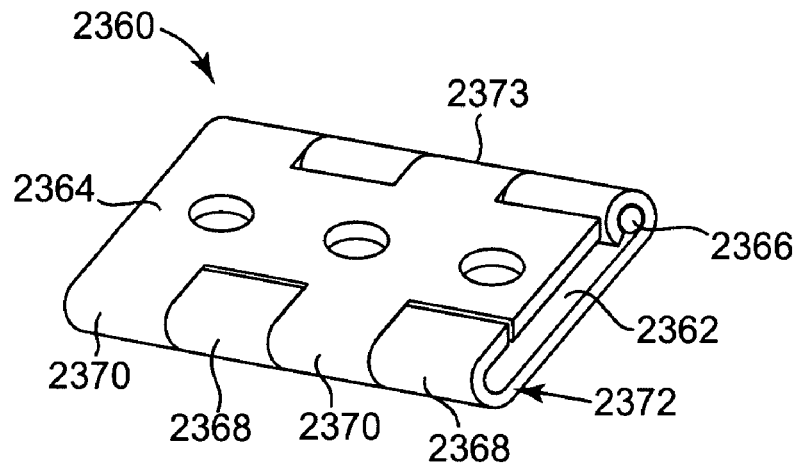
Figure 116:
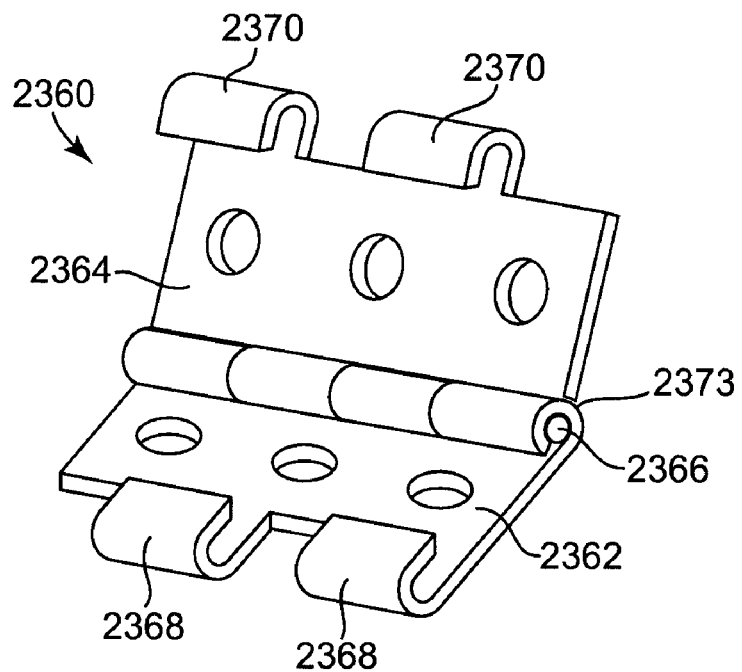

In one embodiment, use of typical hinges, such as hinges 2354, would create an incongruous appearance of shell 2350. More specifically, since hinges 2354 are positioned with different sides (e.g., the open side and the pivot side) toward the external surfaces of shell 2350 two of the corners of shell 2350 appear differently than the other two corners of shell 2350. In order to decrease the visible differentiation of the corners of shell 2350 to provide shell 2350 with a more uniform appearance, in one embodiment, a hinge 2360 as illustrated with additional reference to FIGS. 115 and 116 is used. Unlike conventional hinges, hinge 2360 provides a similar look at both the open and closed edges thereof. In particular, hinge 2360 includes a first plate 2362 and a second plate 2364 rotatably coupled relative to one another about pin 2366. Each plate 2362 and 2364 defines curved edges 2368 and 2370, respectively, opposite pin 2366. In particular, edges 2368 of first plate 2362 curve first toward second plate 2364 and then back toward pin 2366. Similarly, edges 2370 of second plate 2364 curve first toward first plate 2362 and then back toward pin 2366.

In one embodiment, edges 2368 and 2370 are formed intermittently such that when hinge 2360 is closed as illustrated in FIG. 115, edges 2368 and 2370 appear to alternate to collectively define an overall open edge of hinge 2360. In this manner, open edge of hinge 2360 appears as a fake pivot edge 2372 substantially similar to the opposite pivot edge of hinge 2360 when hinge 2360 is in the closed position. Fake pivot edge 2372 allows hinge 2360, when closed, to appear the same from either actual pivot edge 2373 or fake pivot edge 2372.

Figure 117:
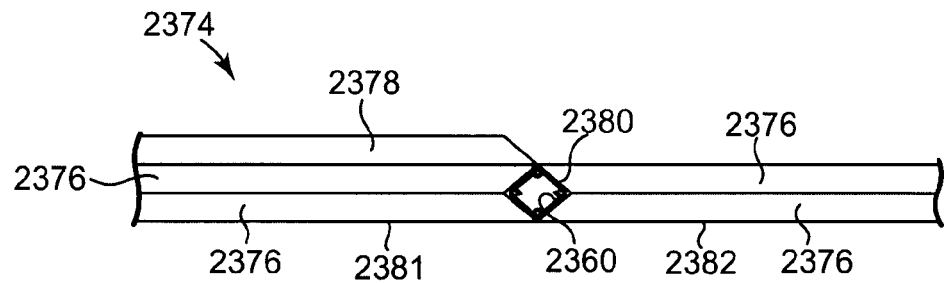
Figure 118:
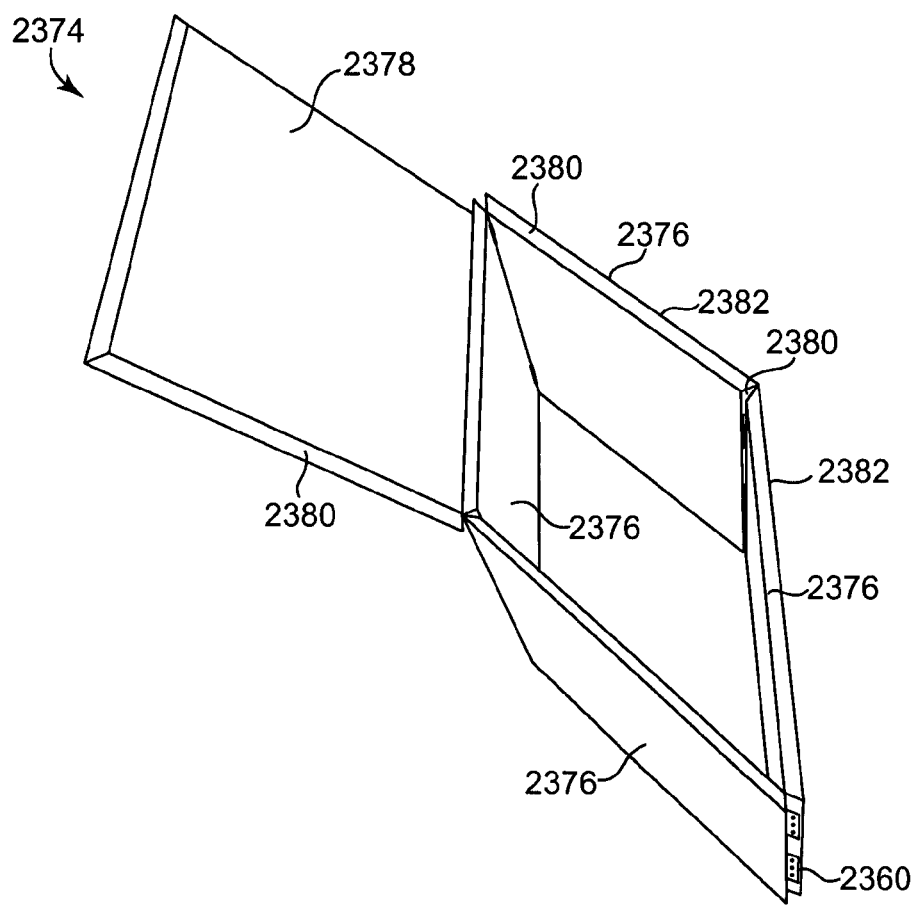

In embodiments where shells are configured in parallelogram construction for flat packing, various treatments of side wall edges may be utilized. For example, as illustrated in FIGS. 117 and 118, a shell 2374 is provided with a plurality of side walls 2376 having beveled edges 2380. For instance, beveled edges 2380 may be formed with an angle of approximately 45° relative to the surface of the respective side wall 2376. During flat packing, beveled edges 2380 permit hinges 2360 to be easily coupled thereto and shell 2374 to be completely flat packed such that outer surfaces 2381 of adjacent side walls 2352 are each substantially positioned in the same plane. In one example, a back wall 2378 of shell 2374 is also formed with beveled edges 2380 and sits on top of one of side walls 2384 when shell 2374 is flat packed.

Figure 119:
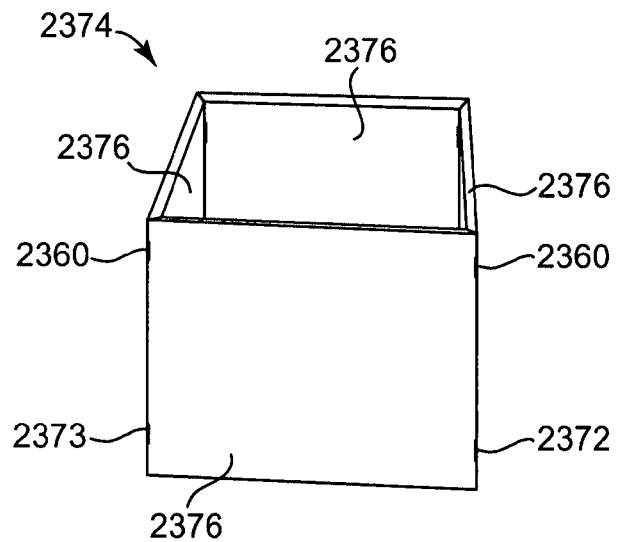

FIG. 118 illustrates shell 2374 in the process of being folded between a flat packed position (FIG. 117) and a fully assembled position (FIG. 119). Notably, beveled edges 2380 fit together as shell 2374 is assembled to provide assembled shell 2374 with neat and clean corners between adjacent side walls 2376 and back wall 2378.

Figure 120:
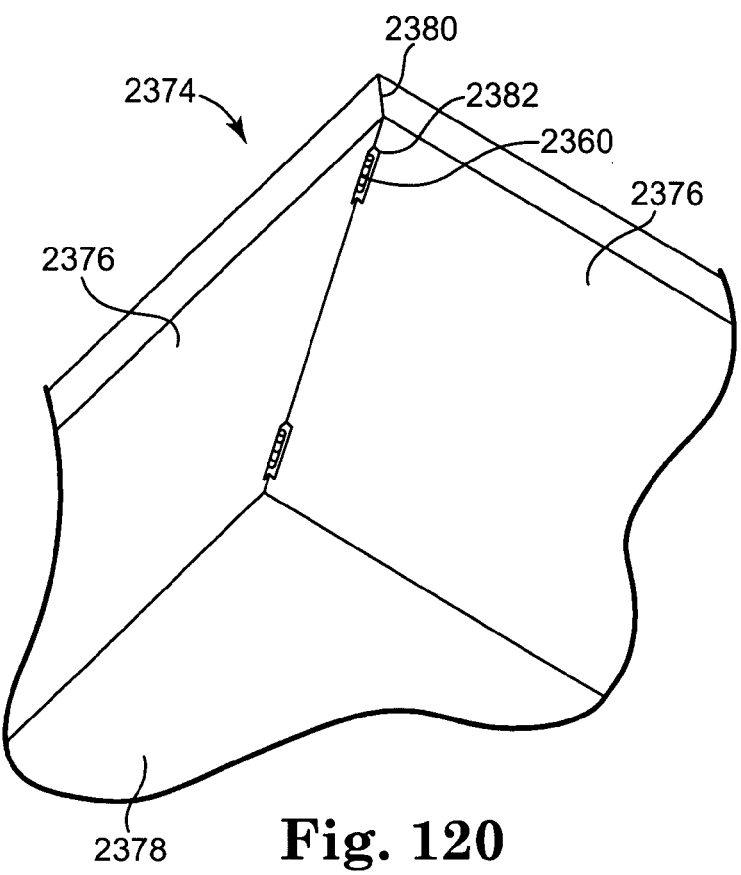

When shell 2374 is assembled for use as illustrated in FIG. 119, hinges 2360 are all in the closed position, shell 2374 is provided with a uniform appearance regardless of which corner of shell 2374 one is viewing. For example, the two outside corners shown in FIG. 119 appear the same even though one corner exposes fake pivot edge 2372 and one corner exposes actual pivot edge 2373 of the respective hinges 2360. Additionally referring to FIG. 120, in one embodiment, cutouts 2382 are formed along beveled edges 2380 of shell 2374 to received hinges 2360 in a manner permitting adjacent beveled edges 2380 of different side walls 2376 to abut one another while still allowing room for actual pivot edges 2373 (e.g., FIGS. 115, 116 and 119) to function. In one embodiment, hinges 2360 are otherwise configured to provide a substantially uniform appearance to shell 2374, while, in one embodiment, hinges 2360 are not configured to provide a substantially uniform appearance to shell 2374.

Figure 121:
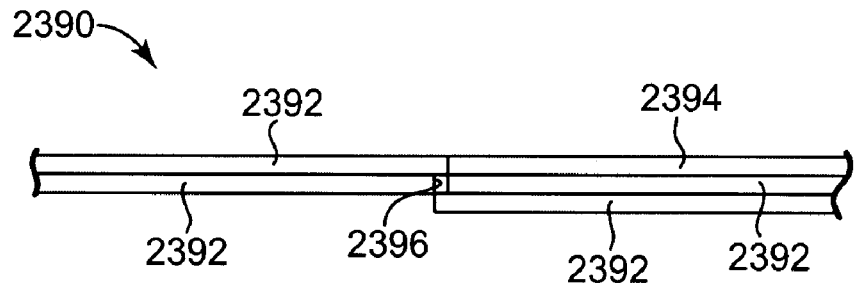
Figure 122:
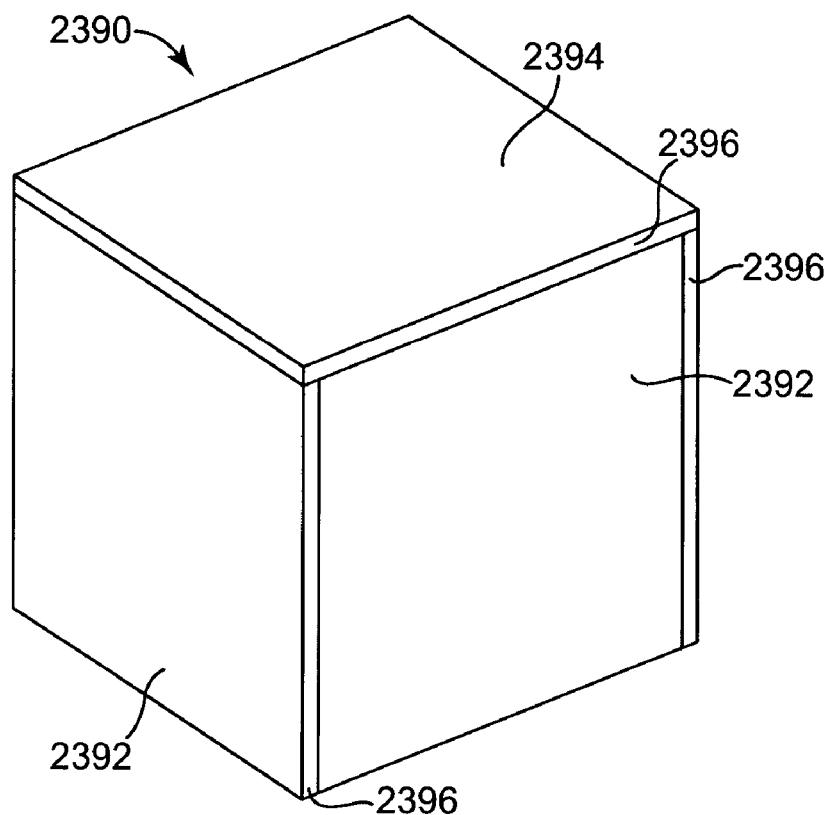

Another example of an edge treatment for side walls is illustrated in FIGS. 121 and 122. For example, shell 2390 is provided with a plurality of side walls 2392 each having square edges 2396 (notably, hinges 2360 are not illustrated in FIGS. 121 and 122 for clarity). During flat packing, square edges 2396 allow shell 2390 to be substantially flat packed, but not in as thinly packed as illustrated in FIG. 117 when beveled edges 2380 are used. In particular, outer surfaces 2398 of adjacent side walls 2392 are each offset from on another and are not substantially positioned in the same plane. In one example, a back wall 2394 of shell 2390 is also formed with square edges 2396 and sits on top of one of side walls 2392 when shell 2390 is flat packed. FIG. 122 illustrates shell 2390 in a fully assembled position. Notably, square edges 2396, unlike beveled edges 2380 of shell 2374 (FIGS. 117-120) do not abut one another, but rather form a butt joint leaving at least one edge 2396 of each side wall 2392 exposed to the outside of shell 2390.

Shells made of alternative materials may be formed with any desired cross-sectional shape and, in some examples, are formed to correspond with shells formed of plastic or other similar material. For instance, a top view of a plastic or similar shell 12 with side walls 52 and rails 62 is illustrated in FIG. 123. FIGS. 124-126 illustrate top views of example shells made of the same or alternative materials that are configured to correspond with shell 12 with varying degrees. For example, FIG. 124 illustrates a shell 1410 formed with side walls 2412 to have inside dimensions that are substantially identical to the inside dimensions of shell 12. As such, all components (e.g., bins, baskets, boxes, etc.) that are configured to fit within shell 12 will also fit within shell 2410. However, external accessories (e.g., trays, hangers, etc.) configured for use with shell 12 may not be compatible with shell 2410. In addition, in one embodiment, shell 12 and shell 2410 are not configured to be stacked with one another.

FIG. 125 illustrates shell 2420 formed with side walls 2424 similar to shell 2410 formed with side walls 2412, but shell 2420 also includes rails 2426. Shell 2420 has substantially similar inside dimensions as shell 12, but differing outside dimensions. As such, all components (e.g., bins, baskets, boxes, etc.) that are configured to fit within shell 12 will also fit within shell 2410. In addition, some external accessories (e.g., hangers, etc.) that are configured to hang from rails 62 may also be compatible and configured for use with rails 2426. However, other external accessories (e.g., pillows, etc.) configured for use with shell 12 may not be compatible with shell 2410 due to the differing outside dimensions. In addition, in one embodiment, shell 12 and shell 2420 are not configured to be stacked with one another.

FIG. 126 illustrates shell 2430 including side walls 2432 and rails 2434 and formed to have substantially identical inside and outside dimensions as compared to shell 12. As such, all accessories and parts configured for use with shell 12 are compatible for use with shell 2430, and shells 12 and 2430 may be stacked or otherwise used together. Although shell 2430 may be desirable for use with shell 12 for increased flexibility as compared to shells 2410 and 2420, in other embodiments, given cost constraints and other configurations, shells 2420 and 2430 may be used.

In one embodiment, shells may be formed in non-parallelogram constructions where side walls are separately provided and assembled to on another in the manufacturing center or when the consumer brings the corresponding shell home from the retail center. Once example, of a shell 2440 formed in non-parallelogram construction is illustrated in FIG. 127. Shell 2440 includes two adjacent side walls 2442 and 2444. Side walls 2442 and 2444 are generally configured to form a mitered corner at their intersection. Side wall 2442 defines a recess 2446 sized and shaped to receive a deformable clip 2452. In particular, clip 2452 is elongated and formed of any suitable deformable yet substantially rigid material such as sheet metal, plastic, etc. Clip 2452 is attached to side wall 2442 in any suitable manner, for example, by a rivet or other fastening device 2456 extending through clip 2452 and into side wall 2442. Clip 2452 extends beyond the intersection between side wall 2442 and 2444 to selectively interact with side wall 2444. To facilitate interaction, in one embodiment, clip 2452 includes an enlarged head 2458 formed at an end of clip 2452 configured to interact with side wall 2444. Side wall 2444 defines a recess 2448 extending from the intersection between side walls 2442 and 2444. Recess 2448 is defined to form a tab 2450 near an internal portion thereof.

In one embodiment, side walls 2442 and 2444 are initially provided as separate, non-assembled components. Upon purchase, the consumer assembles side walls 2442 and 2444 together by deforming clip 2452 as generally indicated by the arrow in FIG. 127 to slightly to force head 2458 of clip 2452 into recess 2448 of side wall 2444. Once in place, a biased nature of clip 2452 pushes head further into recesses 2448 such that clip 2452 grips tab 2450 of side wall 244. Since clip 2452 is provided clipped to side wall 2442, once clip 2452 is in place with respect to side wall 2444, side walls 2442 and 2444 are coupled to one another. If the consumer subsequently desires to disassemble side walls 2442 and 2444, he/she applies pressure to clip 2452 toward side wall 2442, which releases head 2458 from recess 2448 and tab 2450 and thereby releases side wall 2444 from side wall 2442. It will be apparent to those of skill in the art upon reading the present application, that a similar connection can be made along each corner of a shell 2440 and/or that more than one clip 2452 may be longitudinally spaced along each intersection between adjacent sides walls (e.g., between side walls 2442 an 2444). In one embodiment, clip 2452 is used to assemble shell 2440 in the manufacturing facility, and the consumer purchases shell 2440 at least partially assembled.

FIG. 128 illustrates a portion of one embodiment of a shell 2470. Shell 2470 includes two adjacent side walls 2472 and 2474. Side walls 2472 and 2474 are generally configured to form a butt joint along their intersection where side wall 2474 extends to the corner of shell 2470 while side wall 2472 abuts a side of side wall 2474. A tree clip 2478 or other suitable connection device is used to couple side walls 2472 and 2474 to on another. In one example, tree clip 2478 includes two opposing ends 2480 and 2482 each having a plurality of similarly sized and shaped conical tapered surfaces spaced longitudinally along tree clip 2478. Each tapered surface is smaller toward the corresponding end 2480 and 2482 of tree clip 2478. As such, each tree clip 2478 can be relatively easily pressed into the each side wall 2472 and 2474 to couple the side walls 2472 and 2474 together. In one embodiment, each side wall 2472 and 2474 may be pre-drilled with a small hole to facilitate placement of tree clip 2478 with respect to and insertion of tree clip 2478 into each side wall 2472 and 2474. Given the orientation of the conical tapered surfaces, tree clips 2478 are not easily removed from either side wall 2472 or 2474. As such, side walls 2472 and 2474 are coupled to one another via tree clips 2478. Tree clips 2478 may be used to assemble shell 2470 in the manufacturing facility and/or are provided to the consumer to use in assembling shell 2470 in their home or office. It will be apparent to those of skill in the art upon reading the present application, that a similar connection can be made along each corner of a shell 2470 and/or that more than one tree clip 2478 may be longitudinal spaced along each intersection between adjacent sides walls (e.g., between side walls 2472 an 2474).

FIG. 129 illustrates one embodiment of a shell 2490 having a slide-in back panel 2498. Shell 2490 includes side walls 2492 may be assembled in any suitable manner, for example, in any of the manners described or referenced above. Each side wall 2492 defines a groove or slot 2494 extending along a rear edge thereof. When side walls 2492 are assembled, slots 2494 of each side wall 2492 align with one another. One of side walls 2492 includes a cutout 2496 allowing side access to slots 2494. As such, back panel 2498 is slid through cutout 2496 and into slots 2492 to coupled back panel 2498 with side walls 2492. In one embodiment, back panel 2498 includes a thickened portion 2500 on an end thereof configured to fill cutout 2496, which presents the resultant shell 2490 with a neat and uniform appearance. In one embodiment, back panels 2498 may be offered for sale separately and/or may be offered in a plurality of colors or patterns such that back panels 2498 can be interchanged to alter the look of shell 2490 to fit a particular use, style, or whim of the consumer.

FIG. 130 illustrates one embodiment of a collapsed shell 2510. Shell 2510 includes a back panel 2512, which is generally rectangular, and a plurality of side walls 2514. Each side wall 2514 is hingeably coupled with a different edge of back panel 2512. In one example, each of back panel 2512 and side walls 2514 are formed with beveled edges 2516. As such, when it is desired to assembled shell 2510, side walls 2514 are each rotated upward (with respect to the orientation of FIG. 130) relative to there connection with back panel 2512 as generally indicated by the arrows of FIG. 130. Once rotated into position, each side wall 2514 extends substantially perpendicular to back panel 2512.

Adjacent side walls 2514 are then coupled to one another using any suitable fastener, adhesive or other agent(s). For example, in one embodiment, each side wall 2514 includes a cutout 2520 along an edge of each side wall 2514 opposite back panel 2512. Additionally referring to FIG. 131, when side walls 2514 are rotated to extend substantially perpendicularly relative to back panel 2512, cutouts 2520 collectively define a rectangular protrusions 2524 extending from shell 2510 opposite back panel 2512. In one example, a rectangular frame 2526 having inside dimensions slightly larger than protrusion 2524 and outside dimensions similar to the overall dimensions of shell 2510 is provided. Frame 2526 fits around protrusion 2524 to coupled adjacent side walls 1514 together via friction fit. Other fasteners or adhesives may be used in combination with frame 2526 to more robustly or permanently fasten frame 25256 to the remainder of shell 2510.

FIGS. 132-134 illustrate a shell 2530 with fabric hinges 2536 (FIG. 134). Shell 2530 includes a plurality of side walls 2532 positioned end to end. In one embodiment, each end of side walls 2532 is beveled. Fabric hinge 2536 is an elongated piece of fabric that extends over all of the plurality of side walls 2532. To assemble shell 2530, fabric hinge 2536 is placed face down on a support surface (as indicated in FIG. 132 where fabric hinge 2536 is hidden from view by side walls 2532). Side walls 2352 are then effectively "rolled up" or rotated relative to one another to form a main body of shell 2530 as illustrated in FIG. 134. When rotated into assembled position, fabric hinge 2536 is taught. The far ends of the outermost side walls 2532 when shell 2530 is collapsed as illustrated in FIG. 132 are coupled to one another in any suitable manner. In one example, each end includes a female portion 2538 and a mail portion 2540 of a snap-fit connection. Upon assembling shell 2530, female portion 2538 of one side wall 2532 is received by male portion of the opposite side wall 2532, and vice versa as illustrated with reference to FIGS. 132 and 133. Other members configured to facilitate the secure assembly of shell 2530 may additionally or alternatively be included. In one embodiment, L-shaped brackets or gusset plates 3542 may be pressed into two adjacent side walls 2532 at the corners thereof as illustrated in FIG. 134 to provide additional strength and stability to shell 2530.

FIG. 135 illustrates yet another example of means for coupling two side walls to one another. More specifically, FIG. 135 illustrates a portion of shell 2550 including two adjacent side walls 2552 and 2553 configured to form a butt-joint intersection therebetween. Each side wall 2552 and 2553 is pre-drilled or otherwise drilled with holes 2554 such that holes 2554 of side wall 2552 will align with holes 2554 of side wall 2553 when side walls 2552 and 2553 are positioned for assembly. Dowels or biscuits 2556 are provided and are sized to each at least partially fit within a corresponding hole 2554. In particular, one biscuit 2556 is placed partially within each hole 2554 of side wall 2552 such that a portion of each biscuit 2556 extends out of each hole 2554. Then, side wall 2553 is positioned such that each hole 2554 formed therein receives the portion of each biscuits 2556 extending from holes 2554 of side wall 2552. As such, side walls 2552 and 2553 are registered in place relative to one another and, in one embodiment, side wall 2552 is secured to side wall 2553 via friction fit of biscuit 2556 within each side wall 2552.

In one example, side walls 2552 and 2553 additionally or alternatively are coupled with a press-in fastener 2564. In one embodiment, press-in fastener 2564 includes an elongated plate 2566 with a prong 2568 extending from each end of plate 2566 is a manner substantially perpendicular to plate 2566. Each prong 2568 extends from plate 2566 in a similar direction and is formed with a series of tapered conical surfaces longitudinally spaced from one another along each prong. In one embodiment, each side wall 2552 and 2553 are prepared to receive press-in fastener 2564 and includes a recess 2560 extending from a front edge 2558 thereof, and a hole 2562 formed in recess 2560 and extending further into each side wall 2552 and 2553. Recesses 2560 are configured to be positioned adjacent one another when side walls 2552 and 2553 are positioned for assembly. As such, press-fit fastener 2564 is pressed into both side walls 2552 and 2553. In particular, one prong 2568 of press-fit fastener 2564 is pushed into hole 2562 of side wall 2552 and the other prong 2568 of press-fit fastener 2564 is pushed into hole 2562 of side wall 2553. In one embodiment, when prongs 2568 are fully pressed into holes 2562, plate 2566 of press-fit fastener 2564 is maintained within recesses 2560. Due in part to the orientation of the tapered conical surfaces of each prong 2568, once prongs 2568 are in place in each side wall 2552 and 2553, prongs 2568 are not readily removed, and therefore, side walls 2552 and 2553 are securely coupled together.

Other Pillows

As described above (e.g., with respect to FIGS. 123-126) shells may be formed without rails and or otherwise having outside dimensions that may discourage use of such shells with the pillows described and/or referenced above. FIG. 136 illustrates one embodiment, of a pillow 2572 configured to facilitate stacking such shells 2570. In particular, each shell 2570 is generally rectangular with planar side walls. Pillow 2572 defines a rectangular recess generally indicated at 2574 in a top and a bottom thereof. Each recess 2574 is slightly larger than outside dimensions of each shell 2570. As such, when pillow 2572 is placed on a bottom shell 2570 the bottom shell 2570 is partially received within the bottom recess 2574 of pillow 2572. Similarly, when top shell 2570 is placed on pillow 2572, top shell is partially received by top recess 2574 of pillow. In this manner, pillow 2572 is configured to decreases the likelihood of inadvertent toppling or separation of two stacked shells 2570. Other manners of decreasing the likelihood of inadvertent toppling or separation of two stacked shells 2570 are also contemplated.

Retail Display

In one embodiment, the various components of storage and organization systems described above (e.g., shells, pillows, accessories, etc.) are configured to be sold in a retail store. Due to the interchangeable nature of many of the components, components may be offered as pre-packaged kits offering the consumer a quick package of components to provide a particular configuration of components and/or as individual components allowing the consumer increased flexibility in creating customized configurations. FIG. 137 illustrates one example of a retail display 3000 for offering the components of the storage and organization system for sale to consumers. Retail display 3000 is illustrated as being a lane in a retail setting and as such includes decking 3002 and fixtures 3004 as will be apparent to those of skill in the art. In one example, retail display 3000 is visually divided into sections to facilitate the consumer in identifying how the storage and organization system components work together and are arranged to facilitate the consumer in making decisions about what components she wishes to purchase.

For example, retail display 3000 is divided into a solution section 3006, a frame section 3008, an additional component section 3010, an accessories section 3012, a bin section 3014 and a kit section 3016. Each section 3006, 3008, 3010, 3012, 3014 and 3016 includes signs generally illustrated at 3018 configured to further break down retail display 3000 into manageable sections and to instruct the consumer regarding how to assembly components and/or provide hints for selecting component for purchase. Solution section 3006 shows actual components arranged in configurations 3020 to illustrate to the consumer how the components can work together and to inspire the consumer with ideas.

Frame section 3008 includes basic building blocks of storage and organization system, for example, shells 12 and 160. Additional component section 3010 includes items useful in assembling shells to one another and/or for dividing shells for particular use. For example, additional component section 3010 includes pillows 210, pillows 20, other pillows, trays 1000, other trays, boxes 3022, etc. Accessory section 3012 provides a variety of accessories generally indicated at 3024 (e.g., including doors, drawers, hangers, inserts, etc.) configured to further personalized components that the consumer has already selected. Bin section 3014 includes bins such as bins 2000 and lids such as lids 2070 and other associated components. In this manner the consumer sequentially moving through sections 3006, 3008, 3010, 3012 and 3014 can select components to build any number of configurations.

Kit section 3016 provides the consumer with the components for pre-selected packaged configurations 3026. The pre-selected configurations 3026 provide the consumer with popular configurations and save the consumer the time of trying to locate each individual component in the pre-selected configuration. Rather, the consumer wishing to purchase one of pre-selected configurations merely grabs the box or other packaged configurations 3026, which already includes the necessary components to form an indicated configuration. In one embodiment, the consumer may purchase one of packaged configurations 3026 and other accessories to modify packaged configuration 3026 to fit their expected use, style, etc.

In one embodiment, retail display 3000 additionally includes hooks or shelf fixtures 3030 on end caps thereof for displaying additional components to the consumer. Other display systems and configurations for displaying various components of storage and organization systems will be apparent to those of skill in the art upon reading this application. In one embodiment, components are alternatively or additionally offered for sale via a retail web site.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A storage system comprising:
   a shell including:
   a plurality of walls coupled to one another to form a storage chamber therebetween and to define a plurality of intersection edges, each of the plurality of intersection edges being formed at a corresponding boundary of two adjacent ones of the plurality of walls; and
   a plurality of rails, each of the plurality of rails extending outwardly from a corresponding one of the plurality of intersection edges with an angled orientation relative to each of the two adjacent ones of the plurality of walls, wherein:
   a cross-sectional thickness of each of the plurality of rails increases as each of the plurality of rails extends away from one of the plurality of intersection edges,
   each of the plurality of rails is formed as a single piece of material and defines a free end opposite the corresponding one of the plurality of intersection edges, and
   the free end of one of the plurality of rails has a cross-sectional thickness that is larger than a cross-sectional thickness of any other portion of the one of the plurality of rails.

2. The storage system of claim 1, wherein each of the plurality of rails extends outwardly from the corresponding one of the plurality of intersection edges with an angle of between about 130° and about 140° relative to each of the two adjacent ones of the plurality of walls.

3. The storage system of claim 1, wherein an external recess is formed by one of the plurality of walls and four of the plurality of rails that are positioned adjacent the one of the plurality of walls, and the storage system further comprises a tray selectively maintained at least partially within the external recess.

4. The storage system of claim 3, wherein the tray is a first tray, and the storage system further comprises a second tray configured to at least partially nest within the first tray.

5. The storage system of claim 1, further comprising an insert selectively received within the storage chamber to divide the storage chamber into a plurality of compartments.

6. The storage system of claim 1, further comprising a drawer selectively maintained and slidably supported within the storage chamber of the shell.

7. The storage system of claim 1, further comprising a plurality of file boxes selectively maintained within the storage chamber, each of the plurality of file boxes being configured to receive hanging files.

8. The storage system of claim 1, wherein the corresponding boundary is a junction of two adjacent ones of the plurality of walls.

9. The storage system of claim 1, wherein each of the plurality of rails initially extends away from the corresponding one of the intersection edges as a single, solid portion defining a center line positioned at an obliquely angled orientation as measured from the at least two of the adjacent ones of the plurality of walls.

10. The storage system of claim 1, wherein:
    the plurality of rails is a first plurality of rails,
    the shell defines an open side opposite one of the plurality of walls providing access to the storage chamber,
    four of the plurality of walls each define a perimeter edge directly bordering the open side of the shell,
    the shell includes a second plurality of rails each extending outwardly from a different perimeter edge of a corresponding one of the four of the plurality of walls with an obliquely angled orientation relative to the corresponding one of the four of the plurality of walls,
    each of the second plurality of rails is formed as a single piece of material and defines a free end opposite a corresponding different perimeter edge, and
    the free end of one of the second plurality of rails has a cross-sectional thickness that is larger than a cross-sectional thickness of any other portion of the one of the second plurality of rails.

11. The storage system of claim 1, wherein each of the plurality of rails intersects at least two other ones of the plurality or rails forming a continuous corner with each of the two other ones of the plurality of rails, and the continuous corner radially extends outwardly from each of the plurality of walls immediately adjacent the continuous corner.

12. A storage system comprising:
    a shell including:
    a plurality of walls coupled to one another to form a storage chamber therebetween and to define a plurality of intersection edges, each of the plurality of intersection edges being formed at a corresponding boundary of two adjacent ones of the plurality of walls; and
    a plurality of rails, each of the plurality of rails extending outwardly from a corresponding one of the plurality of intersection edges with an angled orientation relative to each of the two adjacent ones of the plurality of walls, wherein a cross-sectional thickness of each of the plurality of rails increases as each of the plurality of rails extends away from one of the plurality of intersection edges;
    wherein:
    an external recess is formed by one of the plurality of walls and four of the plurality of rails that are positioned adjacent the one of the plurality of walls,
    the storage system further comprises a tray selectively maintained at least partially within the external recess, and
    the tray defines a lower extension portion which is at least partially tapered inwardly to fit within the external recess of the shell.

13. A storage system comprising:
    a shell including:
    a plurality of walls coupled to one another to form a storage chamber therebetween and to define a plurality of intersection edges, each of the plurality of intersection edges being formed at a corresponding boundary of two adjacent ones of the plurality of walls; and
    a plurality of rails, each of the plurality of rails extending outwardly from a corresponding one of the plurality of intersection edges with an angled orientation relative to each of the two adjacent ones of the plurality of walls, wherein a cross-sectional thickness of each of the plurality of rails increases as each of the plurality of rails extends away from one of the plurality of intersection edges;
    wherein an external recess is formed by one of the plurality of walls and four of the plurality of rails that are positioned adjacent the one of the plurality of walls, the storage system further comprising a pillow configured to be at least partially received within the external recess wherein the pillow defines a plurality of corner portions and a plurality of apertures, each of the plurality of apertures is positioned through one of the plurality of corner portions of the pillow, and the storage system further comprises one of a plurality of legs and a plurality of casters, wherein each of the one of the plurality of legs and the plurality of casters includes a peg, and each peg is received by one of the plurality of apertures to couple each of the one of the plurality of legs and the plurality of casters with the pillow.

14. The storage system of claim 13, wherein the pillow defines a hole extending thorough a center of the pillow.

15. The storage system of claim 13, wherein each of the one of the plurality of legs and the plurality of casters is configured to support the shell on a support surface.

16. A storage system comprising:
a first shell including five panels arranged to form the first shell as a parallelepiped with an open side, the first shell defining one of five external recesses adjacent each of the five panels;
a second shell formed as a parallelepiped;
a clip configured to extend between the first shell and the second shell to selectively couple the first shell to the second shell, wherein the clip is subsequently readily removable from interaction with each of the first shell and the second shell to allow uncoupling of the first shell from the second shell, and the clip is at least partially elastomeric such that the clip is configured for repeated use in selectively coupling and allowing uncoupling of the first shell and the second shell; and
a pillow selectively received by one of the five external recesses, the pillow including one of a plurality of legs and a plurality of casters wherein the first shell includes twelve rails, each of a first portion of the twelve rails extends from a different corresponding one of a plurality of intersection edges, which are each defined between two different corresponding adjacent ones of the five panels, and each of a second portion of the twelve rails extends from a different corresponding one of a plurality of open edges, which are each defined by a different corresponding one of the five panels positioned adjacent the open side of the first shell, such that each of the five external recesses is collectively defined by one of the five panels and four of the twelve rails that are positioned adjacent the one of the five panels; and wherein each of the twelve rails increases in thickness as each of the twelve rails extends from one of the different corresponding one of the plurality of intersection edges and the different corresponding one of the plurality of open edges.

17. The storage system of claim 16, wherein the first shell includes a rail extending outwardly from an intersection between two of the five panels, the second shell includes at least one rail, and the clip is configured to extend between the rail of the first shell and the at least one rail of the second shell to selectively couple the first shell to the second shell.

18. The storage system of claim 16, wherein each of the twelve rails extends from a different adjacent side panel to define an angle of between about 130° and about 140° between a centerline of each of the twelve rails and the different adjacent side panel.

19. The storage system of claim 16, wherein the clip is a single-piece clip.

20. A method of arranging a storage and organizational system, the method comprising:
providing a first shell including four panels and four rails, the four panels being coupled to one another to define a first storage cavity therebetween, one of the four panels being substantially rectangular and defining four perimeter edges, each of the four rails being angled outwardly from a different corresponding one of the four perimeter edges, and wherein:
a first external recess is collectively defined by the one of the four panels and the four rails,
each of the four rails extends away from the different corresponding one of the four perimeter edges initially as a single, solid portion,
each of the four rails defines a free end opposite the different corresponding one of the four perimeter edges, and
each of the four rails defines an overall cross-sectional shape that is wider at the free end than at any other part of the respective one of the four rails;
providing a second shell; and
positioning the first shell and the second shell adjacent one another and selectively coupling the first and second shell to one another with a reusable clip.

21. The method of claim 20, wherein the second shell defines a second external recess and positioning the first and the second shell adjacent one another positions the first external recess adjacent the second external recess.

22. The method of claim 20, further comprising uncoupling the first shell from the second shell, reconfiguring a position of the first shell and the second shell relative to one another, and recoupling the first shell to the second shell.

23. The method of claim 20, further comprising positioning a pillow within the first external recess, coupling one of casters and legs to the pillow, wherein the pillow and the one of casters and legs are configured to collectively support the first shell on and space the first shell from a support surface.

24. The method of claim 20, wherein the reusable clip is a single-piece clip.

25. The method of claim 20, wherein the reusable clip is at least partially elastomeric such that the step of selectively coupling the first and the second shell to one another with the reusable clip includes selectively deforming the reusable clip to position the reusable clip to interact with each of the first and second shell.

26. The method of claim 20, wherein providing the first shell includes providing each of the four rails such that the as the single, solid portion defining an angle of about 135° from the one of the four panels defining the different corresponding one of the four perimeter edges.

27. A storage system comprising:
a shell including five panels and a plurality of rails, wherein:
the five panels are arranged to form the shell as a parallelepiped with an open side,
each of the five panels joins with an adjacent one of the five panels to collectively define one of a plurality of intersection edges,
each of the plurality of rails extends outwardly from a corresponding one of the plurality of intersection edges to define a free end opposite the corresponding one of the plurality of intersection edges,
each of the plurality of rails initially extends from the corresponding one of the plurality of intersection edges with a single, linear cross-sectional shape,
each of the plurality of rails defines an overall cross-sectional thickness that is greatest at the free end of a respective one of the plurality of rails than at any other portion of the respective one of the plurality of rails; and
a door movably coupled with the shell to selectively cover the open side of the shell, the door including a white board surface facing away from the shell, wherein the white board surface is configured to allow indicia to be selectively written to and later removed from the white board surface.

28. The storage system of claim 27, wherein the door is readily removably coupled with the shell such that the door can be coupled with and uncoupled from the shell without the use of tools when the shell is fully assembled.

29. The storage system of claim 27, each of the plurality of rails initially extends outwardly from a corresponding one of the plurality of intersection edges with a substantially identical angle of orientation relative to each of the five panels collectively defining the corresponding one of the plurality of intersection edges.

30. The storage system of claim 27, wherein the plurality of rails is a first plurality of rails, the shell includes a second plurality of rails each extending from one of the five panels directly bordering the open side, the second plurality of rails each extending radially outwardly from the shell to collectively surround the open side in a non-parallel orientation relative to any of the five panels.

31. A storage system comprising:
a shell including:
 a plurality of walls coupled to one another to form a storage chamber therebetween and to define a plurality of intersection edges, each of the plurality of intersection edges being formed at a corresponding boundary of two adjacent ones of the plurality of walls, wherein a recess is defined by at least one of the plurality of walls on a side of the at least one of the plurality of walls opposite the storage chamber, and
 a plurality of rails, each of the plurality of rails extending outwardly from a corresponding one of the plurality of intersection edges; and
an accessory component defining at least one compartment for storing items and including a lower panel and a lower extension portion, wherein the at least one compartment is defined on a first side of the lower panel, the lower extension portion extends away from a second side of the lower panel, which is opposite the first side of the lower panel, and the lower extension portion at least partially nests securely within the recess of the shell;
wherein each of the plurality of rails is formed as a single piece of material and extends outwardly from the corresponding one of the plurality of intersection edges to define a free end opposite the corresponding one of the plurality of intersection edges, and each of the plurality of rails defines an overall cross-sectional thickness that is greatest at the free end.

32. The storage system of claim 31, wherein the lower extension portion is radially inset from an outer perimeter of the lower panel of the accessory component.

33. The storage system of claim 31, wherein each of the plurality of rails extends outwardly from the corresponding one of the plurality of intersection edges with an obliquely angled orientation relative to ones of the plurality of side walls adjacent the corresponding one of the plurality of intersection edges.

34. A storage system comprising:
a shell including:
 a plurality of walls coupled to one another to form a storage chamber therebetween and to define a plurality of intersection edges, wherein:
  each of the plurality of intersection edges is formed at a corresponding boundary of two adjacent ones of the plurality of walls,
  an open side of the shell is defined opposite one of the plurality of walls, and
  a perimeter edge immediately adjacent the open side is defined by each of four of the plurality of walls surrounding the open side;
 a first plurality of rails extending outwardly from a corresponding one of the plurality of intersection edges with an obliquely angled orientation relative to each of the two adjacent ones of the plurality of walls, wherein a cross-sectional thickness of each of the plurality of rails increases as each of the plurality of rails extends away from one of the plurality of intersection edges; and
 a second plurality of rails each extending outwardly from the perimeter edge of a different corresponding one of the four plurality of walls with an obliquely angled orientation relative to the different corresponding one of the four plurality of walls away from the one of the plurality of walls opposite the open side;
wherein each of the first plurality of rails intersects at least two other ones of the first plurality or rails forming a continuous corner with each of the two other ones of the first plurality of rails, and the continuous corner radially extends outwardly from each of the plurality of walls immediately adjacent the continuous corner.

* * * * *